United States Patent
Iijima et al.

[11] Patent Number: 6,081,087
[45] Date of Patent: Jun. 27, 2000

[54] MOTOR CONTROL APPARATUS

[75] Inventors: Tomokuni Iijima, Moriguchi; Kazushige Narazaki, Katano; Yoshiaki Igarashi, Ikoma; Taro Kishibe, Nishinomiya; Yukinori Maruyama, Kadoma, all of Japan

[73] Assignee: Matsushita Electric Industrial Co., Ltd., Osaka-fu, Japan

[21] Appl. No.: 09/178,664

[22] Filed: Oct. 26, 1998

[30] Foreign Application Priority Data

Oct. 27, 1997 [JP] Japan ................................. 9-311351

[51] Int. Cl.[7] ....................................... H02P 6/14
[52] U.S. Cl. ............................. 318/439; 318/721
[58] Field of Search ........................... 318/138, 254, 318/439, 602, 720, 721–724

[56] References Cited

U.S. PATENT DOCUMENTS 5,384,527  1/1995  Rozman et al. ...................... 322/10
5,569,994  10/1996  Taylor et al. ...................... 318/700
5,729,102  3/1998  Gotou et al. ...................... 318/254

*Primary Examiner*—Bentsu Ro
*Attorney, Agent, or Firm*—Akin, Gump, Strauss, Hauer & Feld, L.L.P.

[57] ABSTRACT

A motor controller according to the present invention is so configured that time interval measuring means measures the time interval of a rotational position signal indicating the rotational position of a rotor based on said rotational position signal, correction coefficient storage means stores the correction coefficient indicating the inaccuracy of said rotational position signal, estimated rotational angle production means produces an estimated rotational angle providing an estimated value of the rotational angle by extrapolating the rotational angle based on said time interval and said correction coefficient, and command production means produces a current command or a voltage command based on said estimated rotational angle and outputs it to driving means for driving a motor.

21 Claims, 33 Drawing Sheets

FIG. 6

| i | 0 | 1 | 2 | 3 | 4 | 5 |
|---|---|---|---|---|---|---|
| Steady state average time interval | 30 | 30 | 30 | 30 | 30 | 30 |
| Steady state time interval | 28 | 32 | 33 | 27 | 31 | 29 |
| Correction coefficient StrCor[i] | 30/28 | 30/32 | 30/33 | 30/27 | 30/31 | 30/29 |
| Time interval CssCnt | 112 | 128 | 132 | 108 | 124 | 116 |
| Corrected time interval | 112·30/28 =120 | 128·30/32 =120 | 132·30/33 =120 | 108·30/27 =120 | 124·30/31 =120 | 116·30/29 =120 |
| Rotational angle | 0 | 60° | 120° | 180° | 240° | 300° |
| Corrected rotational angle (absolute angle) StrθCss[i] | 0 | 64° | 130° | 184° | 246° | 304° |

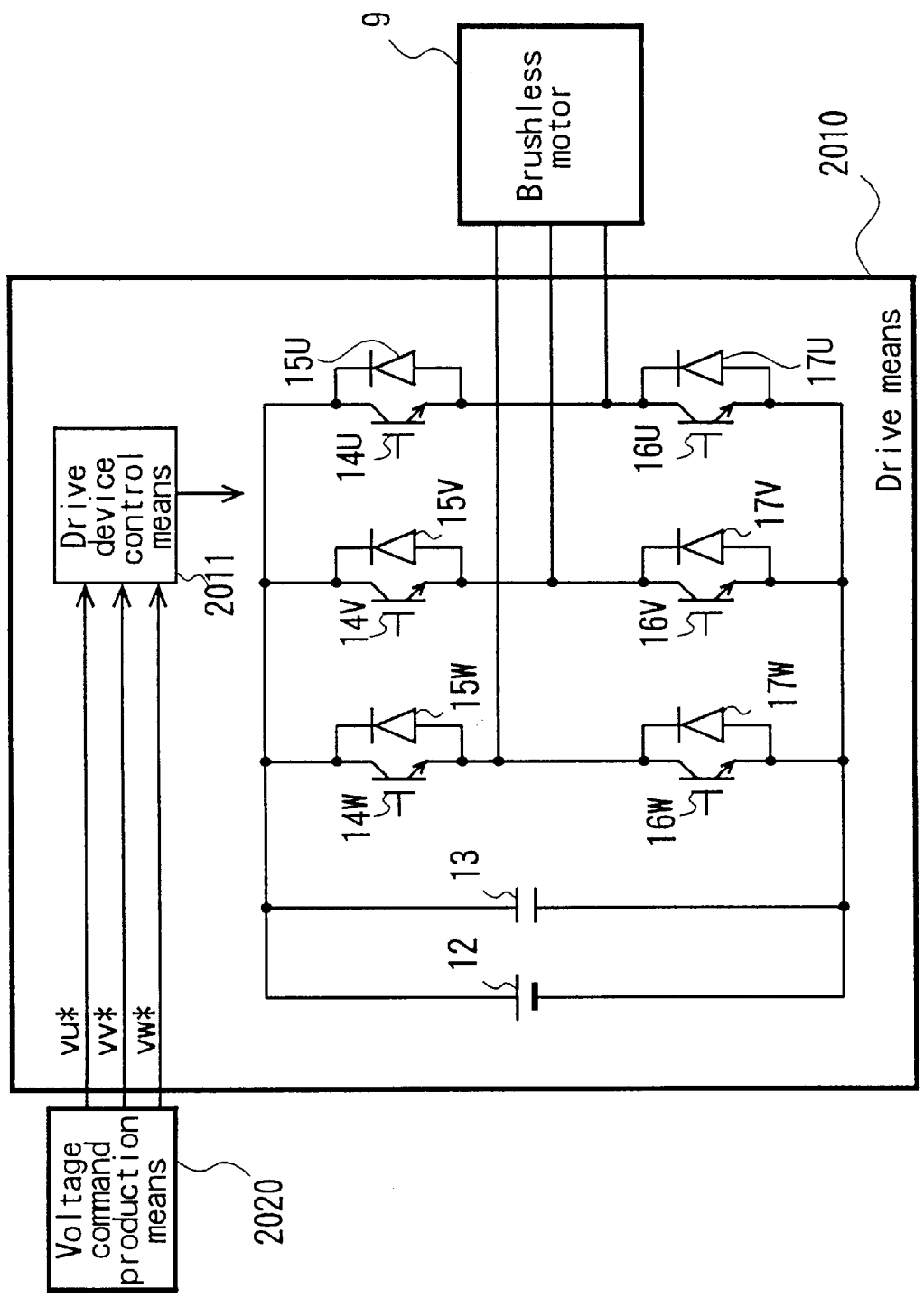
F I G. 1 8

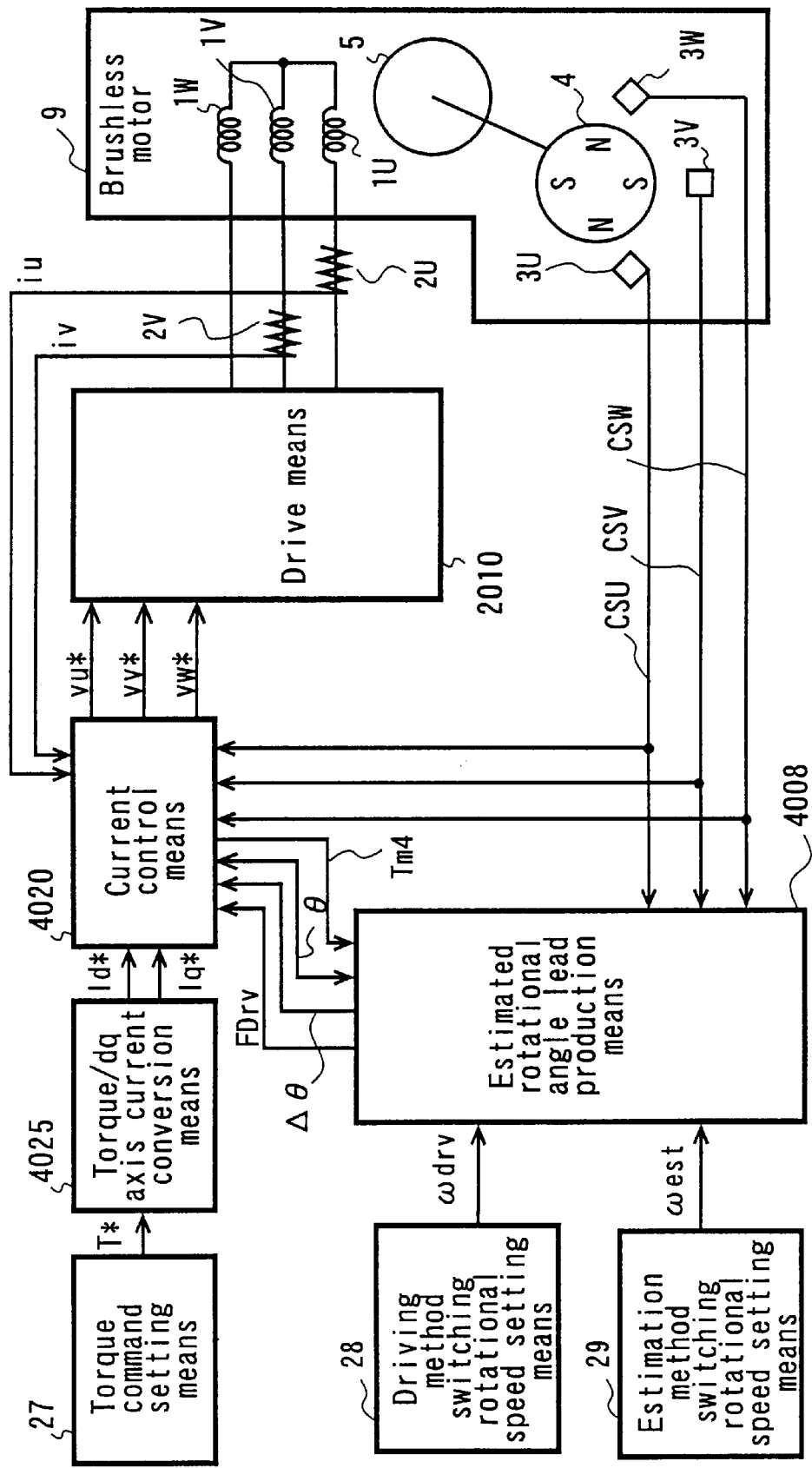
F I G. 24

MOTOR CONTROL APPARATUS

BACKGROUND OF THE INVENTION

The present invention relates to a motor controller in which the rotational angle of the rotor of a motor is estimated from a rotational position signal of a low resolution, and the current and the voltage changing in a waveform such as a substantially sinusoidal waveform is supplied to the stator windings.

For controlling the drive of a brushless motor having no commutation mechanism such as a commutator and brushes, it has hitherto been necessary to detect the position of the rotating rotor always accurately.

There is a conventional motor controller called the 120-degree conduction type rectangular wave-driven system based on the rotational signal position of a low resolution. In this motor controller, power is supplied to the stator windings with a voltage of rectangular waveform. For this reason, the current flowing to the stator windings is considerably distorted, and therefore the torque generated is subjected to a large fluctuation, thereby causing the brushless motor to vibrate and generate noises.

In a conventional motor controller for solving the problem described above, the rotational angle of the rotor of a brushless motor is estimated and the drive of the brushless motor is controlled by supplying a voltage changing with a substantially sinusoidal waveform to the stator windings of the brushless motor. As such conventional motor controllers there are known those disclosed in the Japanese published unexamined patent applications, publication Nos. Hei 1-12619 and Hei 4-304191.

Now, the brushless motor drive unit disclosed in the Japanese published unexamined patent application, publication No. Hei 4-304191 will be explained.

First, the configuration of the brushless motor drive unit will be described.

FIG. 32 is a block diagram showing a configuration of a conventional brushless motor drive unit. In FIG. 32, a brushless motor 9 includes a stator (not shown) wound with stator windings 1U, 1V, 1W and a rotor 5 arranged in the vicinity of the stator (not shown) and supported rotatably. Also, the brushless motor 9 includes rotational position detection means for detecting the rotational position of the rotor 5.

This rotational position detection means includes a rotational position detecting disk 4 having the same center of rotation as the rotor 5 and having the outer peripheral surface thereof magnetized to the same number of magnetic poles as the rotor 5, and three rotational position signal generators 3U, 3V, 3W arranged apart from each other by a mechanical angle of 60 degrees (electrical angle of 120 degrees since the number of magnetic poles is four) in the vicinity of the outer peripheral surface of the rotational angle detecting disk 4. The rotational position signal generators 3U, 3V, 3W are configured of Hall ICs and output rotational position signals CSU, CSV, CSW, respectively.

The motor controller shown in FIG. 32 comprises edge detection means 1030 supplied with the rotational position signals CSU, CSV, CSW from the rotational position signal generators 3U, 3V, 3W for outputting a rotational position signal interrupt signal IntCss, multiplier means 1040 supplied with the rotational position signal interrupt signal IntCss for outputting a first timer interrupt signal IntTm1, and a counter 1071 supplied with the rotational position signal interrupt signal IntCss and the first timer interrupt signal IntTm1 for outputting an estimated rotational angle low-order address signal θlow.

Also, the conventional motor controller comprises a memory 1020 and drive means 1010. The memory 1020 is supplied with the rotational position signals CSU, CSV, CSW from the rotational position signal generators 3U, 3V, 3W and the estimated rotational angle low-order address θlow from the counter 1071 for outputting stator voltage commands vu*, vv*, vw* to the drive means 1010. The drive means 1010 is connected with the stator windings 1U, 1V, 1W. Incidentally, the symbol * in the stator voltage commands vu*, vv*, vw* indicates a command.

Next, an explanation will be given of the operation of the conventional motor controller configured as described above.

The edge detection means 1030 generates the rotational position signal interrupt signal IntCss at a timing of the rise and the fall of the rotational position signals CSU, CSV, CSW of rectangular waveform, respectively. The multiplier means 1040 multiplies the rotational position interrupt signal IntCss by a method described later and outputs the first timer interrupt signal IntTm1 to the counter 1071.

The counter 1071 counts up the count each time the first timer interrupt signal IntTm1 is input thereto, and outputs the count as the estimated rotational angle low-order address signal θlow. Also, the counter 1071 resets the count to 0 upon input thereto of the rotational position interrupt signal IntCss.

The memory 1020 produces the stator voltage commands vu*, vv*, vw* based on the rotational position signals CSU, CSV, CSW and the estimated rotational angle low-order address signal θlow.

The drive means 1010 supplies power to the stator windings 1U, 1V, 1W based on the stator voltage commands vu*, vv*, vw*.

Next, an explanation will be given of the configuration and operation of the multiplier means 1040 of the conventional motor controller.

FIG. 33 is a block diagram showing a configuration of the multiplier means 1040. In FIG. 33, the multiplier means 1040 includes a clock generator 1041, a frequency divider 1042, a first timer 1046, a second timer 1043, a latch 1044 and a comparator 1045.

The clock generator 1041 generates a first clock signal ck1 having a frequency fck1 and outputs this first clock signal ck1 to the frequency divider 1042 and the first timer 1046.

The frequency divider 1042 is supplied with the first clock signal ck1 and the rotational position signal interrupt signal IntCss and outputs a second clock signal ck2.

The second timer 1043 is supplied with the second clock signal ck2 and the rotational position signal interrupt signal IntCss and outputs a second timer value signal Tm2. The latch 1044 is supplied with the second timer value signal Tm2 and the rotational position signal interrupt signal IntCss and outputs a time interval CssCnt.

The first timer 1046 is supplied with the first clock signal ck1, the rotational position signal interrupt signal IntCss and a first timer interrupt signal IntTm1 and outputs the first timer value signal Tm1 to the comparator 1045.

The comparator 1045 is supplied with the time interval CssCnt and the first timer value signal Tm1 and outputs the first timer interrupt signal IntTm1.

The operations of the multiplier means 1040 of the conventional motor controller configured as described above will be explained.

The frequency divider 1042 supplied with the first clock signal ck1 having the frequency fck1 from the clock generator 1041 divides the frequency of the first clock signal ck1 and produces a second clock signal ck2 of a frequency fck2 lower than the frequency of the first clock signal ck1. Here, fck1/fck2 is called the frequency division number.

The frequency divider 1042 is configured of a timer, and upon input thereto of the first clock signal ck1, counts up the timer value, and when the timer value reaches the frequency division number (fck1/fck2), outputs the second clock signal ck2 and resets the timer value to 0. Also, the timer value is reset to 0 when the rotational position interrupt signal IntCss is inputted to the frequency divider 1042.

The second timer 1043 counts up the second timer value signal Tm2 each time the second clock signal ck2 is input thereto, and resets the second timer value signal Tm2 to 0 each time the rotational position signal interrupt signal IntCss is input thereto.

The latch 1044 stores as the time interval CssCnt the second timer value signal Tm2 when the rotational position signal interrupt signal IntCss is input thereto.

The first timer 1046 counts up the first timer value signal Tm1 each time the fist clock signal ck1 is inputted thereto, and resets the first timer value signal Tm1 to 0 each time the rotational position signal interrupt signal IntCss or the first timer interrupt signal IntTm1 is inputted thereto.

The comparator 1045 compares the time interval CssCnt with the first timer value signal Tm1 and when they are equal to each other, outputs the first timer interrupt signal IntTm1.

As a result of the operations of the first timer 1046 and the comparator 1045, the first timer interrupt signal IntTm1 is output and the first timer value signal Tm1 is reset to 0 each time the first timer value signal Tm1 becomes the time interval CssCnt.

As described above, the multiplier means 1040 produces the first timer interrupt signal IntTm1 which is the result of multiplying the rotational position signal interrupt signal IntCss by [fck1/fck2].

With the above-mentioned configuration, the conventional motor controller multiplies the rotational position signal interrupt signal IntCss providing each edge of the rotational position signals CSU, CSV, CSW with a resolution of 60 degree, and thus produces the first timer interrupt signal IntTm1 with a higher resolution. This motor controller produces the stator voltage commands vu*, vv*, vw* of a substantially sinusoidal waveform, applies a sinusoidal waveform voltage to the stator windings 1U, 1V, 1W, and supplies stator currents iu, iv, iw of substantially sinusoidal waveform to the stator windings 1U, 1V, 1W. By configuring this way, a motor controller has been realized with a small output torque fluctuation and small motor vibrations and noises.

In the conventional motor controller configured as described above, the rotational position signals CSU, CSV, CSW sometimes generate variations due to the variations of the offset voltage or the mounting error of the Hall elements or the variations in the magnetization of the rotational position detecting disk 4. These variations poses the problem of the variations of the time interval CssCnt, the fluctuation of the estimated rotational angle θ and the torque ripple generated in the conventional motor controller.

SUMMARY OF THE INVENTION

The present invention solves the problems described above, and the object thereof is to provide a motor controller in which a brushless motor can be driven and controlled with high accuracy without any torque ripple by eliminating the fluctuation of the estimated rotational angle θ even in the case where the rotational position signals CSU, CSV, CSW are inaccurate.

In order to achieve the object described above, a motor controller according to the present invention comprises:

time interval measuring means for measuring the time interval of a rotational position signal based on the rotational position signal indicating the rotational position of the rotor, correction coefficient storage means for storing a correction coefficient indicating the inaccuracy of the rotational position signal, estimated rotational angle producing means for producing an estimated rotational angle providing an estimated value of the rotational angle by extrapolating the rotational angle based on the time interval and the correction coefficient, command producing means for producing a current command supplied to the stator windings or a voltage command applied to the stator windings based on the estimated rotational angle, and drive means for applying power to the stator windings based on the current command or the voltage command.

With this configuration, according to the present invention, a motor controller can be realized with a small output torque variation and a small motor vibration and noise, in which the inaccuracy of the rotational position signal can be corrected.

According to another aspect of the invention, a motor controller comprises:

time interval measuring means for measuring the time intervals of the rotational position signal based on the rotational position signal indicating the rotational position of the rotor, rotation time interval measuring means for measuring the rotation time interval providing the time required for one rotation of the rotor based on the rotational position signal, estimation method switching rotational speed setting means for setting an estimation method switching rotational speed providing a threshold valve for switching the estimation method of the rotational angle, estimated rotational angle production means for producing an estimated rotational angle providing an estimated value of the rotational angle by extrapolating the rotational angle based on the time interval when the rotational speed of the rotor is lower than the estimation method switching rotational speed, and producing the estimated rotational angle by extrapolating the rotational angle based on the rotation time interval when the rotational speed of the rotor is higher than the estimation method switching rotational speed, command production means for producing a current command applied to the stator windings or a voltage command applied to the stator windings based on the estimated rotational angle, and drive means for supplying power to the stator windings based on the current command or the voltage command.

With this configuration, according to the present invention, the number of arithmetic operations can be reduced when the rotational speed is high, and thereby a motor controller can be realized which accurately drives the motor even at a high rotational speed.

A motor controller according to another aspect of the invention comprises:

time interval measuring means for measuring the time interval of the rotational position signal based on the rotational position signal indicating the rotational position of the rotor, lead production means for producing a lead indicating the degree to which the estimated rotational angle providing an estimated value of the rotational angle is to be advanced based on the time interval, estimated rotational angle production means for producing the estimated rotational angle for each control period based on the lead, and control means for controlling the current supplied to the stator windings or the voltage applied to the stator windings for each of the control periods based on the estimated rotational angle.

With this configuration, according to the present invention, the resolution of the estimated rotational angle can be improved and a motor controller with a small torque ripple can be realized.

A motor controller according to another aspect of the invention comprises:

rotation time interval measuring means for measuring the rotation time interval providing the time required for one rotation of the rotor based on a rotational position signal indicating the rotational position of the rotor, lead production means for producing the lead of the estimated rotational angle providing an estimated value of the rotational angle based on the rotation time interval, estimated rotational angle production means for producing the estimated rotational angle for each control period based on the lead, and control means for controlling the current supplied to the stator windings or the voltage applied to the stator windings for each of the control periods based on the estimated rotational angle.

With this configuration, according to the present invention, the resolution of the estimated rotational angle can be improved and a motor controller with a small torque ripple can be realized.

A motor controller according to another aspect of the present invention comprises:

time interval measuring means for measuring the time interval of the rotational position signal based on a rotational position signal indicating the rotational position of the rotor, deviation calculation means for calculating the deviation of the estimated rotational angle providing an estimated value of the rotational angle from the actual rotational angle, estimated rotational angle production means for producing the estimated rotational angle based on the time interval applied through a low-pass filter and the deviation, and control means for controlling the current supplied to the stator windings or the voltage applied to the stator windings based on the estimated rotational angle.

With this configuration, according to the present invention, the estimated rotational angle can be continuously changed, and a motor controller with a small torque ripple can be realized.

A motor controller according to another aspect of the invention comprises:

rotation time interval measuring means for measuring the rotation time interval providing the time required for one rotation of the rotor based on the rotational position signal indicating the rotational position of the rotor, deviation calculation means for calculating the deviation of the estimated rotational angle providing an estimated value of the rotational angle from the actual rotational angle, estimated rotational angle production means for producing the estimated rotational angle based on the rotation time interval applied through a low-pass filter and the deviation, and control means for controlling the current supplied to the stator windings or the voltage applied to the stator windings based on the estimated rotational angle.

With this configuration, according to the present invention, the estimated rotational angle can be continuously changed, and a motor controller with a small torque ripple can be realized.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 6 is a table for explaining a method of correcting the inaccuracy of the rotational position signal.

FIG. 18 is a diagram showing a circuit configuration of the drive means for the motor controller in embodiment 2.

FIG. 24 is a block diagram showing a configuration of the motor controller in embodiment 4 of the present invention.

It will be recognized that some or all of the figures are schematic representations for purposes of illustration and do not necessarily depict the actual relative sizes or locations of the elements shown.

DETAILED DESCRIPTION OF THE INVENTION

A specific example constituting a motor controller according to an embodiment of the present invention will be explained below with reference to the accompanying drawings.

<<Embodiment 1>>

A motor controller according to embodiment 1 of the present invention will be described below. The motor controller according to embodiment 1 is configured in such a manner that a rotational position signal with a resolution of an electrical angle of 60 degree is multiplied to improve the resolution, and the rotational angle is estimated to supply a current of a substantially sinusoidal waveform to the stator windings. The motor controller according to embodiment 1 is configured to control a three-phase four-pole brushless motor.

[General Configuration of Embodiment 1]

First, a general configuration of a motor controller according to embodiment 1 of the present invention will be explained.

Figure 1:
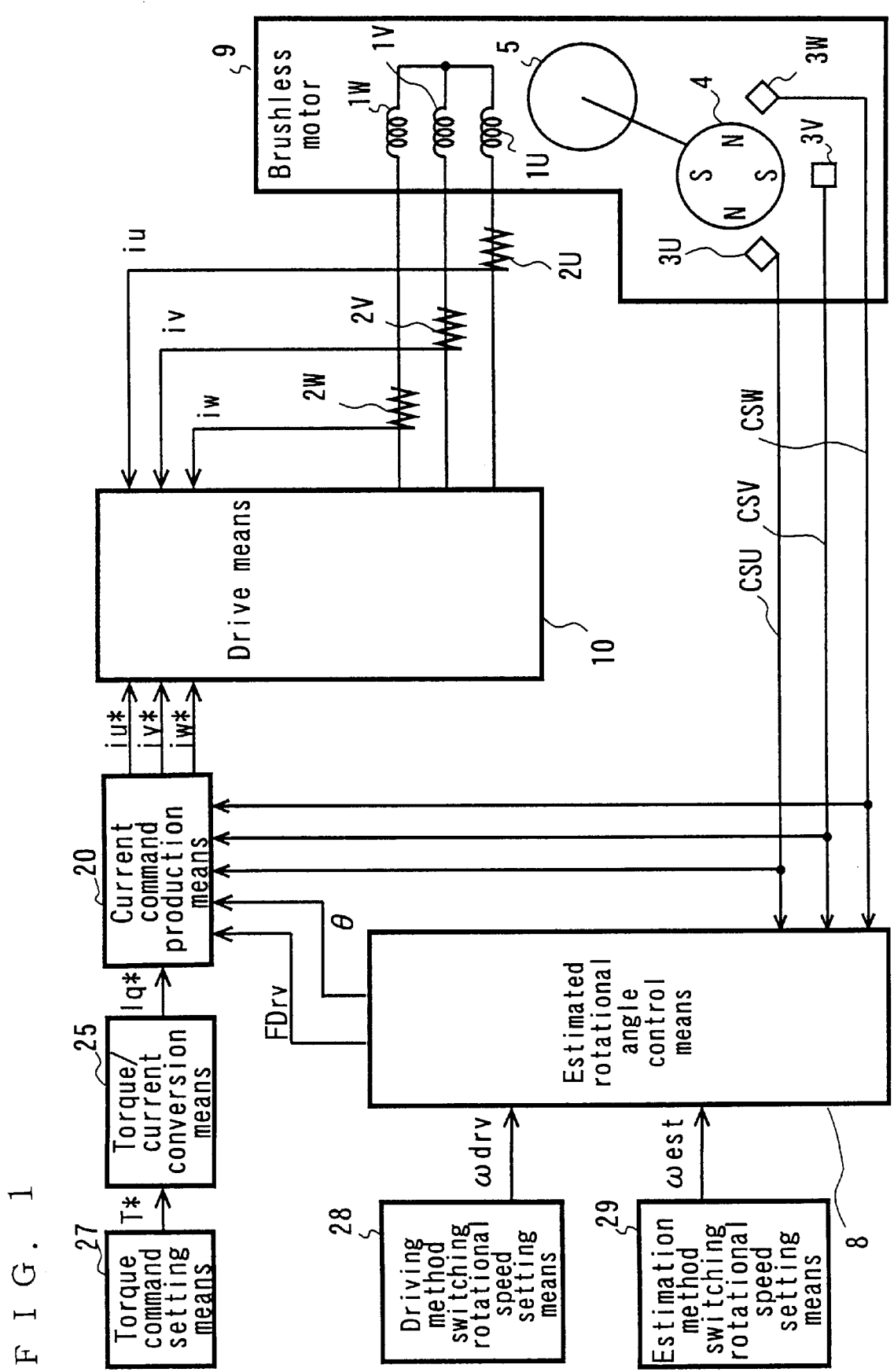
FIG. 1 is a block diagram showing a configuration of a motor controller according to embodiment 1 of the present invention.

FIG. 1 is a block diagram showing a configuration of a motor controller according to embodiment 1. In FIG. 1, a brushless motor 9 includes a stator (not shown) wound with the stator windings 1U, 1V, 1W and a rotor 5 magnetically coupled with, arranged in proximity to and supported rotatably. Also, the brushless motor 9 includes rotational position detection means for detecting the rotational position of the rotor 5.

This rotational position detection means includes a rotational position detection disk 4 having the same center of rotation with the rotor 5 and having the outer peripheral surface thereof magnetized to the same number of magnetic poles as the rotor 5, and three rotational position signal generators 3U, 3V, 3W arranged 60 degree apart from each other in mechanical angle (120 degree in electrical angle since the number of magnetic poles is four) in proximity to the outer peripheral surface of the rotational position detection disk 4. The rotational position signal generators 3U, 3V, 3W are configured of Hall ICs and output rotational position signals CSU, CSV, CSW, respectively.

The motor controller according to embodiment 1 includes three setting means, i.e. torque command setting means 27 for outputting a torque command T*, driving method switching rotational speed setting means 28 for outputting a driving method switching rotational speed ωdr v and estimation method switching rotational speed setting means 29 for outputting an estimation method switching rotational speed ωest. Also, the motor controller according to embodiment 1 includes torque/current conversion means 25, current command production means 20, driving means 10, estimated rotational angle control means 8 and current sensors 2U, 2V, 2W for detecting the current flowing in the stator windings 1U, 1V, 1W and outputting the stator current value signals iu, iv, iw to the driving means 10.

The estimated rotational angle control means 8 is supplied with the rotational position signals CSU, CSV, CSW, the driving method switching rotational speed ωdrv and the estimation method switching rotational speed ωest and outputs the driving method switching signal FDrv and the estimated rotational angle θ.

The torque/current conversion means 25 is supplied with a torque command T* and outputs a q-axis current command Iq*. In the process, the direction of the q axis indicates the direction of a current for generating a magnetic flux in the direction perpendicular to that of the magnetic flux generated by the permanent magnet of the rotor.

The current command production means 20 is supplied with the rotational position signals CSU, CSV, CSW, the q-axis current command Iq*, the driving method switching signal FDrv and the estimated rotational angle θ and outputs the stator current commands iu*, iv*, iw* to the drive means 10.

The drive means 10 is supplied with the stator current value signals iu, iv, iw and the stator current commands iu*, iv*, iw* and supplies appropriate power to the stator windings 1U, 1V, 1W.

Figure 2:
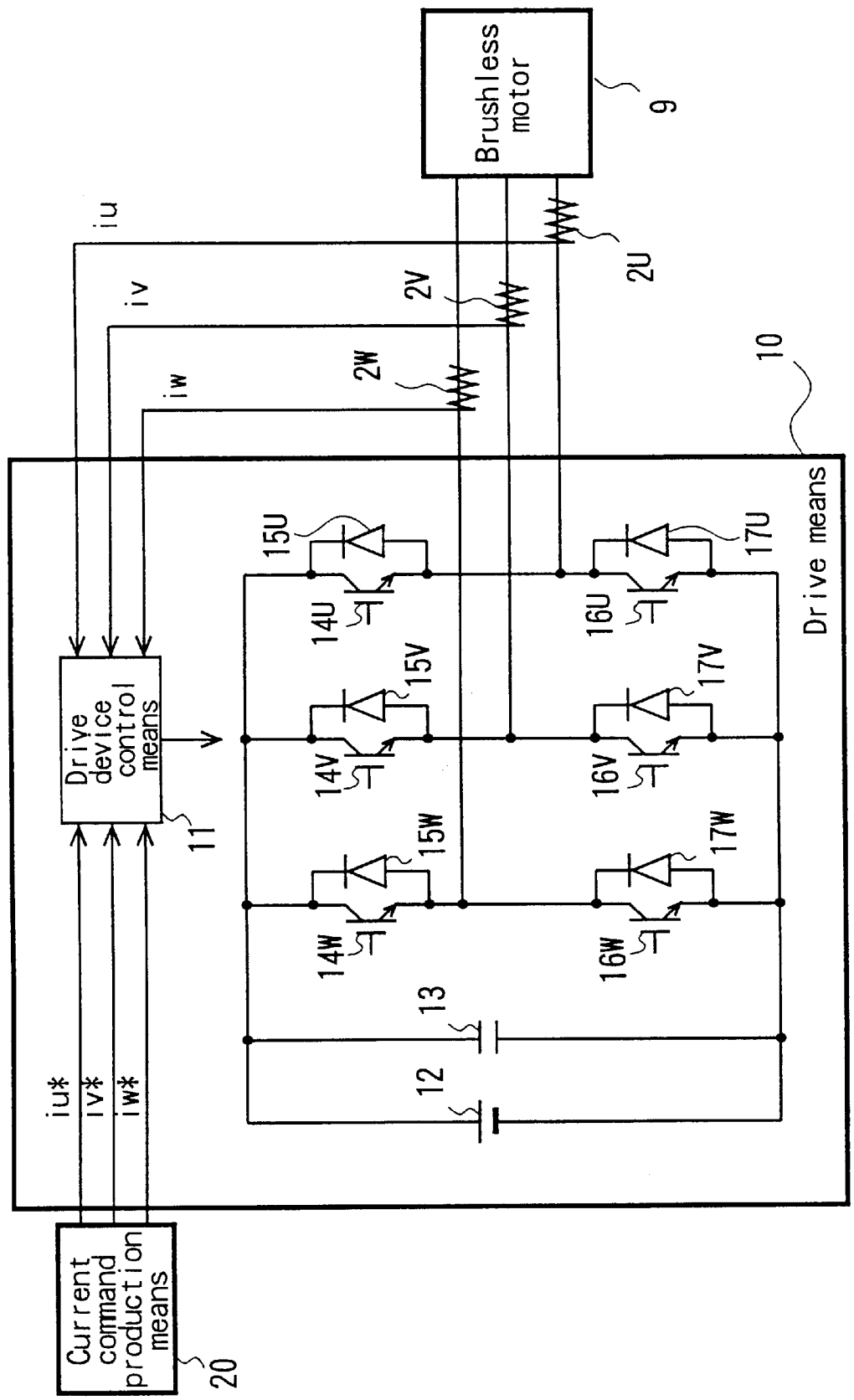
FIG. 2 is a diagram showing a circuit configuration of the drive means for the motor controller according to embodiment 1.

FIG. 2 is a diagram showing a circuit configuration of the drive means 10 of the motor controller according to embodiment 1.

As shown in FIG. 2, the drive means 10 includes drive device control means 11, a power supply 12, a capacitor 13 providing an electrolytic capacitor connected in parallel to the power supply 12, upper IGBTs (IGBT is an abbreviation of an insulated gate bipolar transistor) 14U, 14V, 14W, upper diodes 15U, 15V, 15W, lower IGBTs 16U, 16V, 16W and lower diodes 17U, 17V, 17W.

The drive device control means 11 is supplied with the stator current value signals iu, iv, iw and the stator current command iu*, iv*, iw* and controls the activation and deactivation of the upper IGBTs 14U, 14V, 14W and the lower IGBTs 16U, 16V, 16W by the method described later.

Each collector of the upper IGBTs 14U, 14V, 14W is connected to the positive terminal of the power supply 12, and the collectors of the lower IGBTs 16U 16V, 16W are connected to the emitters of the upper IGBTs 14U, 14V, 14W and the stators 1U, 1V, 1W, respectively. Also, the emitters of the lower IGBTs 16U, 16V, 16W are connected to the negative terminal of the power supply 12.

The upper diodes 15U, 15V, 15W are connected in reverse parallel to the upper IGBTs 14U, 14V, 14W, respectively. The lower diodes 17U, 17V, 17W, on the other hand, are connected in reverse parallel to the lower IGBTs 16U, 16V, 16W, respectively.

Figure 3:
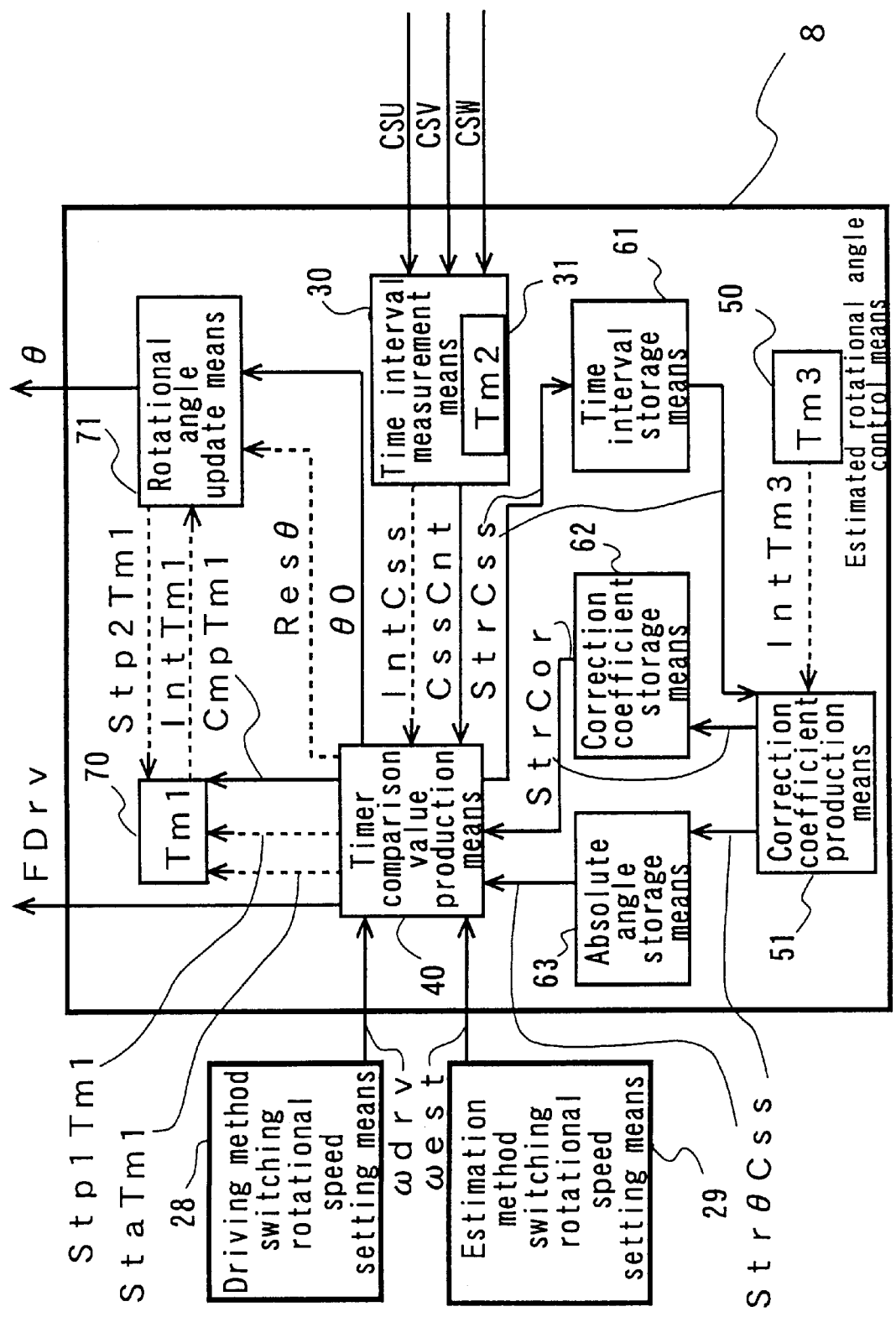
FIG. 3 is a block diagram showing a configuration of the estimated rotational angle control means of the motor controller according to embodiment 1.

FIG. 3 is a block diagram showing a configuration of the estimated rotational angle control means 8 of the motor controller according to embodiment 1.

In FIG. 3, time interval measuring means 30 of the estimated rotational angle control means 8 has a second timer 31 which is inputted with rotational position signals CSU, CSV, CSW and outputs a rotational position signal interrupt signal IntCss and a time interval CssCnt to timer comparison value production means 40.

Time interval storage means 61 stores the time interval storage value StrCss applied thereto from the timer comparison value production means 40.

The third timer 50 outputs a third timer interrupt signal IntTm3 to the correction coefficient production means 51 at preset intervals.

The correction coefficient production means 51 is activated by the third timer interrupt signal IntTm3 of the third timer 50, supplied with the time interval storage value StrCss and outputs the correction coefficient storage value StrCor and the absolute angle storage value StrθCss.

The correction coefficient storage means 62 stores the correction coefficient storage value StrCor, and the absolute angle storage means 63 stores the absolute angle storage value StrθCss.

The timer comparison value production means 40 is activated by the rotational position signal interrupt signal IntCss, and is supplied with the driving method switching rotational speed ωdrv, the estimation method switching rotational speed ωest, the time interval CssCnt, the correction coefficient storage value StrCor and the absolute angle storage value StrθCss. The timer comparison value production means 40 outputs the driving method switching signal FDrv, the time interval storage value StrCss, the first start interrupt signal StaTm1, the first stop interrupt signal Stp1Tm1, the timer comparison value CmpTm1, the rotational angle update reset interrupt signal ReθS and the absolute rotational angle θ0.

The first timer 70 starts counting up the timer value in response to the first start interrupt signal StaTm1, and stops the operation in response to the first stop interrupt signal Stp1Tm1 or the second stop interrupt signal Stp2Tm1. Also, the first timer 70 is supplied with the timer comparison value CmpTm1 and outputs the first timer interrupt signal IntTm1.

The rotational angle updating means 71 is activated by the first timer interrupt signal IntTm1 or the rotational angle update reset interrupt signal Resθ, supplied with the absolute rotational angle θ0, and outputs the second stop interrupt signal Stp2Tm1 and the estimated rotational angle θ. In embodiment 1, the timer comparison value production means 40, the first timer 70 and the rotational angle updating means 71 make up the estimated rotational angle production means.

[Brief Description of the Operation of Embodiment 1]

Figure 4:
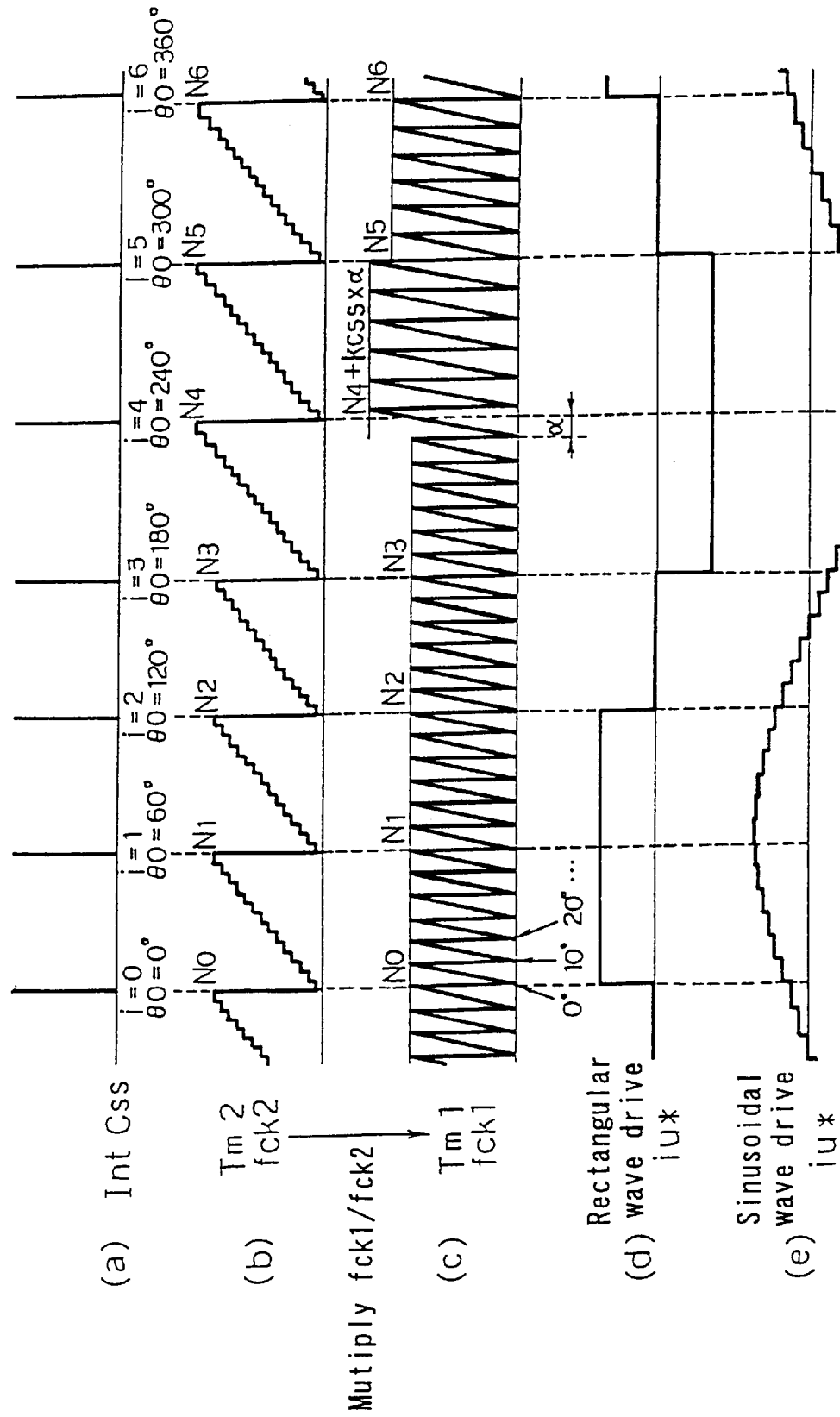
FIG. 4 is a schematic diagram for explaining a multiplication method and a deviation correction method for the estimated rotational angle.

Next, an explanation will be given briefly of the operation of the motor controller according to embodiment 1. FIG. 4 is a waveform diagram for schematically explaining a multiplication method and a method of correcting the deviation of the estimated rotational angle for the motor controller. (a) of FIG. 4 shows the rotational position signal interrupt signal IntCss indicating each edge of the rotational position signals CSU, CSV, CSW. (b) of FIG. 4 shows the timer value Tm2 of the second timer 31, and (c) of FIG. 4 shows the timer value Tm1 of the first timer 70. (d) of FIG. 4 shows a waveform of the stator current commands iu* at the time of 120-degree conduction type rectangular wave drive based on the rotational position signals CSU, CSV, CSW. (e) of FIG. 4 shows a waveform of the stator current commands iu* at the time of sinusoidal wave drive based on the estimated rotational angle θ.

First, the multiplication method of the motor controller will be explained.

Figure 7:
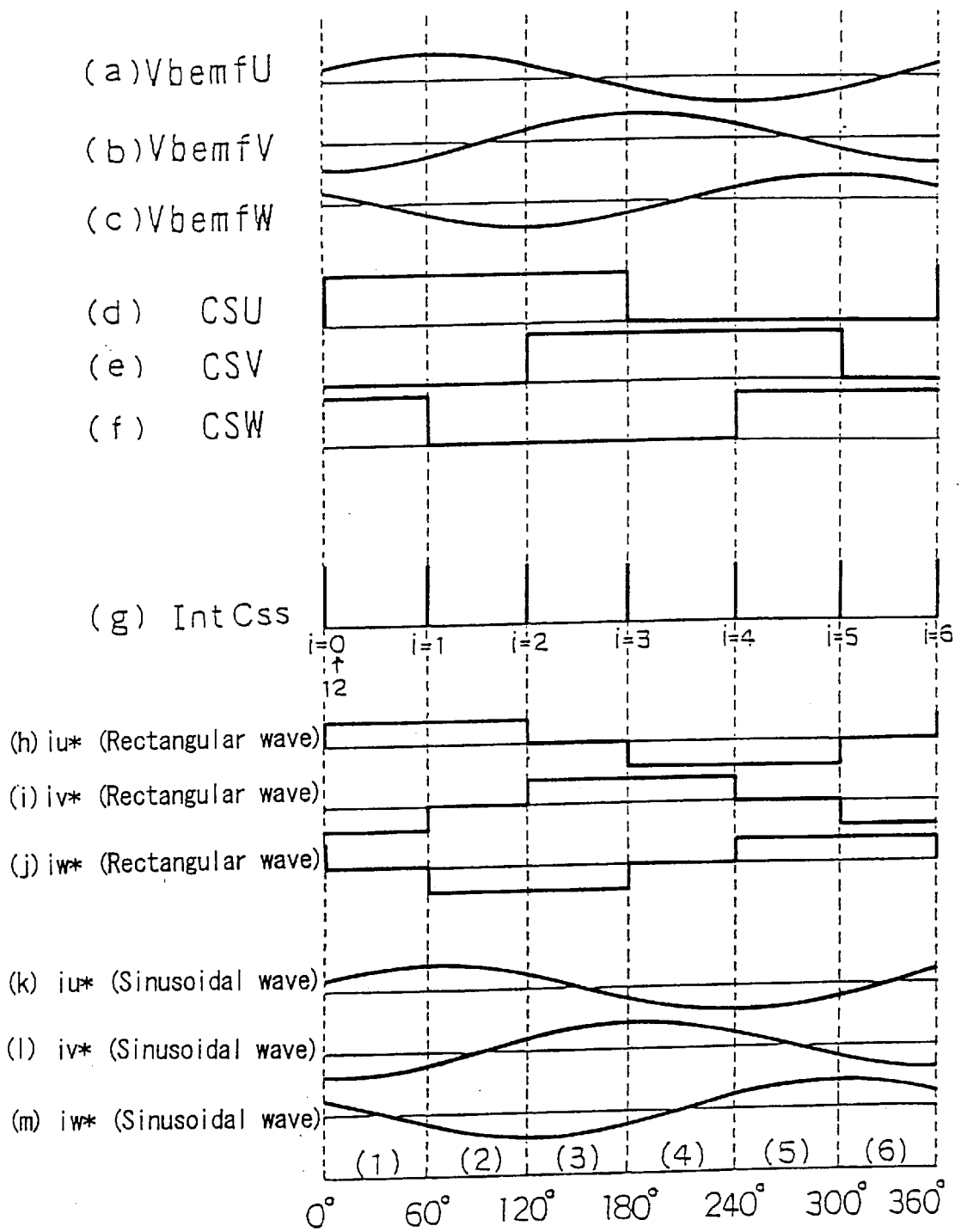
FIG. 7 is a waveform diagram showing the relation between the induced voltage induced in the stator windings, the rotational position signal, the rotational position signal interrupt signal, the stator current command for drive with a rectangular wave and the stator current command for drive with a sinusoidal wave in embodiment 1.

The rotational position signal interrupt signal IntCss shown in (a) of FIG. 4 is a combination of each rising edge and each falling edge of the rotational position signals CSU, CSV, CSW (shown in (d), (e) and (f) of FIG. 7, respectively) and has a resolution of 60 degree in electrical angle. For this reason, in the conventional motor controller, the driving of the brushless motor has been controlled by the stator current commands iu*, iv*, iw* for the 120-degree conduction type rectangular wave drive as shown in (d) of FIG. 4.

The second timer 31 of a frequency fck2 counts up the timer value Tm2 thereby to measure the count (N0, N1, . . . ,: hereinafter called the time interval) between the rotational position signal interrupt signals IntCss.

As shown in (c) of FIG. 4, the timer value Tm1 is counted up by the first timer 70 having the frequency fck1 higher than that of the second timer 31 by an integer multiple. In the process, the time intervals N0, N1, . . . are used as reference values (hereinafter referred to as the timer comparison values) for comparison. Each time the timer value Tm1 assumes the timer comparison values N0, N1, . . . , the timer value Tm1 is reset to zero and counted up again. In this way, a signal multiplied by (fck1/fck2) is produced.

In FIG. 4, (fck1/fck2)=6, and the resolution of the multiplied rotational angle is 10 degree. Based on this multiplied rotational angle, the stator current commands iu*, iv*, iw* in sinusoidal waveform as shown in (e) of FIG. 4 are produced.

As described above, in a multiplication method for the motor controller, the rotational position signal is multiplied to improve resolution and the rotational angle is estimated by extrapolation, thus realizing the stator currents iu, iv, iw in sinusoidal waveform.

Next, an explanation will be given of a method of correcting the deviation of the estimated rotational angle in a motor controller.

Considering the case in which the rotational speed is decreased in steps at time point i=3 in (a) of FIG. 4, the time interval up to i=3 is N0=N1=N2=N3, and the time interval for i=4 or after is N4=N5=N6= . . . , and N3<N4. As a result, at time point i=4, the estimated rotational angle leads the actual rotational angle (absolute angle) by α. If the time interval N4 is directly used as the timer comparison value of the timer value Tm1, the deviation is not eliminated. Therefore, at time point i=4, kcss×α is added to the timer comparison value to make N4+kcss×α, and the deviation is eliminated at time point i=5.

In this way, the deviation is measured, and when the estimated rotational angle is advanced, the timer comparison value is corrected upward, while when the estimated rotational angle is lagging, the timer comparison value is corrected downward, thereby eliminating the deviation. In this correction process, kcss is a gain for deviation correction.

In this case, as shown in FIG. 4, the deviation correction gain kcss can be set to eliminate the deviation at one time by the rotational position signal interrupt signal IntCss, or the deviation correction gain kcss can be reduced so that the rotational position signal interrupt signal IntCss is received a plurality of times thereby to eliminate the deviation.

Next, an explanation will be given of a method of evaluating the magnitude of the deviation of the estimated rotational angle from the actual rotational angle.

Figure 5:
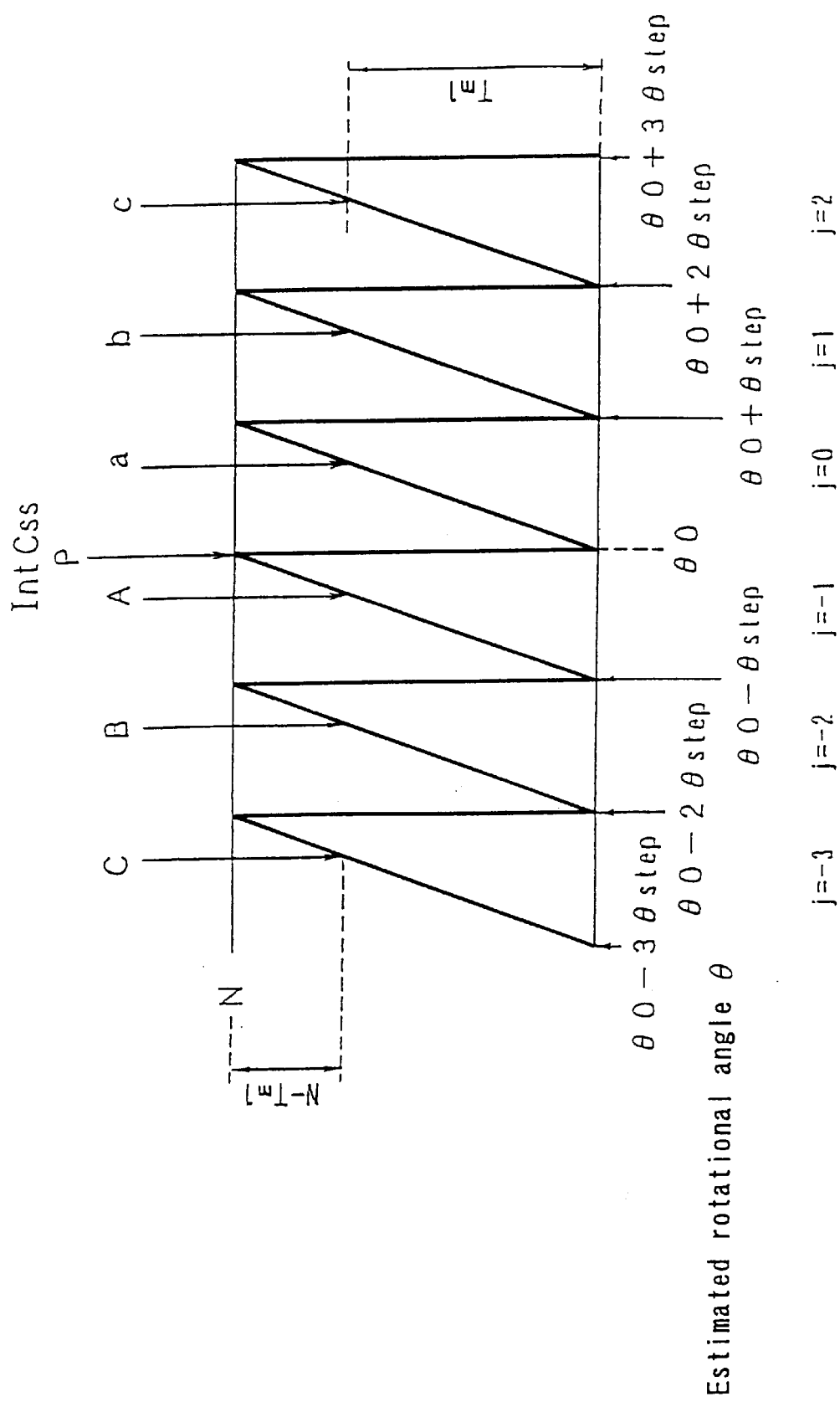
FIG. 5 is a schematic diagram for explaining a method of evaluating the amount of the deviation of the estimated rotational angle from the actual rotational angle.

FIG. 5 is a schematic diagram for explaining a method of evaluating the deviation. In FIG. 5, the triangular wave represents the behavior of the timer value Tm1, which continues to be counted up. When the timer value Tm1 reaches the timer comparison value N (produced from the time intervals N0, N1, . . . ), the timer value is reset to zero and the count-up is restarted. Each time the timer value Tm1 is reset, the estimated rotational angle θ advances by θstep (10 degree in (c) of FIG. 4).

As shown in FIG. 4, assume that the actual rotational angle is θ0 when the rotational position signal interrupt signal IntCss is generated (θ0=0 degree when i=0, θ0=60 degree when i=1, . . . θ0 is hereinafter called the absolute rotational angle). To facilitate the understanding, consider the case in which the estimated rotational angle θ includes the absolute rotational angle θ0 and is estimated as shown in FIG. 5.

In FIG. 5, when the rotational position signal interrupt signal IntCss is generated at time point P, the angle estimation has no deviation so that the estimated rotational angle θ coincides with the absolute rotational angle θ0 and the timer value Tm1 is zero. At time points indicated by arrows a, b, c in FIG. 5, i.e. when the rotational position signal interrupt signal IntCss is generated later than the time point P, the angle estimation leads the actual rotational angle. Also, when the rotational position signal interrupt signal IntCss is generated at the time points indicated by arrows A, B, C in FIG. 5, i.e. earlier than the time point P, the angle estimation is lagging behind the actual rotational angle.

This difference between the angle estimation and the actual rotational angle constitutes the time lag between the time point P and the time of actual generation of the rotational position signal interrupt signal IntCss, and is evaluated using the count on the first timer 70.

In the case where the rotational position signal interrupt signal IntCss is generated at the time point indicated by arrow a (hereinafter referred to as time point a), the time lag is the timer value Tm1 indicated by the first timer 70. Specifically, at time point a, α=Tm1. Here, α is the time lag measured by the first timer 70, and is positive when the angle estimation is advanced, while it is negative when the angle estimation is lagging.

Also, when the rotational position signal interrupt signal IntCss is generated at the time point indicated by arrow b (hereinafter referred to time point b), the time lag is given as the timer value Tm1 indicated by the first timer 70 plus one timer comparison value N since the first timer 70 is reset once from the time point P. In other words, at time point b, α=N×1+Tm1.

Also, when the rotational position signal interrupt signal IntCss is generated at the time point indicated by arrow c (hereinafter referred to as time point c), the time lag is the timer value Tm1 indicated by the first timer 70, plus twice the timer comparison value N, since the first timer 70 is reset twice from the time point P. In other words, at time point c, α=N×2+Tm1.

In the case where the rotational position signal interrupt signal IntCss is generated at the time point indicated by arrow A (hereinafter referred to as time point A), the time lag from the time point P is the timer comparison value N less the timer value Tm1 indicated by the first timer 70. In other words, at time point A, α=−(N−Tm1)=N×(−1)+Tm1. The time lag is expressed by a negative sign.

Also, in the case where the rotational position signal interrupt signal IntCss is generated at the time point indicated by arrow B (hereinafter referred to as time point B), the time lag is the timer comparison value N less the timer value Tm1 indicated by the first timer 70, plus one timer comparison value N, since the first timer 70 is reset once before the time point P from the time of generation of the rotational position signal interrupt signal IntCss. In other words, at time point B, α=−(N−Tm1+N)=N×(−2)+Tm1.

Also, in the case where the rotational position signal interrupt signal IntCss is generated at time point C, the lag is the timer comparison value N less the timer value Tm1 indicated by the first timer 70, plus twice one timer comparison value N, since the first timer 70 is reset twice before time point P from the time point of generation of the rotational position signal interrupt signal IntCss. In other words, at time point C, α=−(N−Tm1+N×2)=N×(−3)+Tm1.

As described above the lag α can be expressed as α=N×j+Tm1 (j: integer).

Hereupon, the estimated rotational angle θ is equal to the absolute rotational angle θ0 at time point a, larger by θstep than the absolute rotational angle θ0 at time point b, and larger by 2×θstep than the absolute rotational angle θ0 at time point c. Also, it is smaller by θstep than the absolute rotational angle θ0 at time point A, smaller by 2×θstep than the absolute rotational angle θ0 at time point B, and smaller by 3×θstep than the absolute rotational angle θ0 at time point C.

In this relation, when the difference between the estimated rotational angle θ and the absolute rotational angle θ0 is divided by θstep, an integer indicated by j is obtained in the equation indicating the lag α, i.e. α=N×j+Tm1. Therefore, the lag α is expressed by equation (1) below. In equation (1), the timer comparison value N is approximately equal to the time interval, and therefore, is replaced by the time interval.

$$\alpha = (\text{time interval})/\theta\text{step} \times (\theta - \theta 0) + Tm1 \qquad (1)$$

By the way, in the foregoing description, the absolute rotational angle θ0 is included in the estimated rotational angle θ. The same relation generally holds, however, also when the absolute rotational angle θ0 is not included in the estimated rotational angle θ (for example, when the absolute rotational angle θ0 is 0 degree, 64 degree, 130 degree, . . . , as described below).

Next, a method of correcting inaccuracy of the rotational position signal in embodiment 1 will be explained with reference to FIG. 6. FIG. 6 is a table for explaining a method of correcting the inaccuracy of the rotational position signal.

The rotational position signal interrupt signal IntCss representing each edge of the rotational position signals CSU, CSV, CSW is ideally generated at intervals of 60 degree of electrical angle. The rotational position signals CSU, CSV, CSW may develop a lag, however, due to the variations in the offset voltage or the mounting position of the Hall elements in the Hall ICs making up the rotational position signal generators 3U, 3V, 3W (FIG. 1) for generating the rotational position signals CSU, CSV, CSW or due to variations in the magnetization of the rotational position detecting disk 4.

Let us consider the case in which a lag generated in the situation described above has caused the steady state time interval shown in FIG. 6, for example, as measured by the second timer 31 during the steady rotation. The steady state average time interval providing an average time interval under this condition is 30, and the correction coefficient (StrCor[i]) is stored as a ratio between the steady state average time interval and the steady state time interval. Under this condition, the rotation of the motor at an equal speed of one fourth, the time interval (CssCnt) changes as 112, 128, 132, 108, 124, 116. By correcting it according to the correction coefficient (StrCor[i]), however, the corrected time interval assumes a constant value of 120.

In other words, the correction coefficient (StrCor[i]) is determined based on the time interval measured at the time of steady rotation, and during ordinary operation, the time interval is corrected by the correction coefficient. In this way, even when the rotational position signal interrupt signal IntCss is not generated exactly at intervals of 60 degree, a time interval can be determined the same way as if it is generated at intervals of 60 degree. Thus, an accurate multiplication is accomplished.

Also, when the rotational position signal interrupt signal IntCss is generated, the rotational angle is used by being corrected instead of at intervals of 60 degree (corrected rotational angle: absolute angle Strθcss[i]). In other words, the rotational angle is corrected based on the time interval measured at the time of normal rotation, and the corrected rotational angle is set to 64 degree when i=1, 130 degree when i=2, 184 degree when i=3, 246 degree when i=4 and 304 degree when i=5, with reference to the value (0 degree when i=0) obtained in the case where the rotational position signal interrupt signal IntCss of i=0 is generated.

In the description of FIG. 6, only the inaccuracy of the rotational position signals CSU, CSV, CSW changing per rotation in electrical angle were taken into consideration. The variations of the magnetization of the rotational position disk 4 (FIG. 1), however, cause the inaccuracy of the rotational position signals CSU, CSV, CSW changing per rotation in mechanical angle. Therefore, the accuracy can be further improved by the correction made by determining the correction coefficient StrCor and the absolute angle StrθCss per rotation in mechanical angle. In the motor controller of embodiment 1, the correction is made per rotation in mechanical angle.

[Detailed Operation of Embodiment 1]

Next, the general operation of the motor controller according to embodiment 1 will be explained with reference to FIG. 7. FIG. 7 is a waveform diagram showing the relation between the induced voltages VbemfU, VbemfV, VbemfW induced in the stator windings 1U, 1V, 1W, respectively, the rotational position signals CSU, CSV, CSW, the rotational position signal interrupt signal IntCss, the stator current commands iu*, iv*, iw* for driving with a rectangular wave and the stator current commands iu*, iv*, iw* for driving with a sinusoidal wave, according to embodiment 1.

With the rotation of the rotor 5, the rotational position detecting disk 4 connected to the rotor 5 is rotated, so that the magnetic fluxes interlinking with the rotational position signal generators 3U, 3V, 3W undergo a change. The rotational position signal generator 3U, 3V, 3W constituting Hall ICs amplify the magnetic flux amount and output the rotational position signals CSU, CSV, CSW, respectively, shaped as shown in FIG. 7. In FIG. 7, the angle is an electrical one, and the rising position of the rotational position signal CSU is assumed to be 0 degree for convenience sake. Unless expressly indicated hereinafter, the angle is an electrical angle. The brushless motor in embodiment 1 has four poles, and therefore the mechanical angle of 180 degree corresponds to the electrical angle of 360 degree (electrical angle=mechanical angle×(number of magnetic poles/2)).

In embodiment 1, the rotational position signal generators 3U, 3V, 3W are arranged 120 degree in electrical angle apart from each other, and therefore the rotational position signals CSU, CSV, CSW are displaced by 120 degree in electrical angle from each other. Also, the rotational position signal generators 3U, 3V, 3W are arranged in such positions that the zero-crossing points of the rotational position signals CSU, CSV, CSW are delayed 30 degree behind the induced voltages VbemfU, VbemfV, VbemfW, respectively, induced in the stator windings 1U, 1V, 1W.

The driving method switching rotational speed setting means 28 sets the driving method switching rotational speed ωdrv, which is output to the estimated rotational angle control means 8. The estimation method switching rotational speed setting means 29 sets the estimation method switching rotational speed ωest, which is output to the estimated rotational angle control means 8.

The estimated rotational angle control means 8, by the method described later, outputs the driving method switching signal FDrv and the estimated rotational angle θ based on the rotational position signals CSU, CSV, CSW, the driving method switching rotational speed ωdrv and the estimation method switching rotational speed ωest.

The torque command setting means 27 sets a torque command T* and outputs it to a torque/current conversion means 25.

The torque/current conversion means 25 produces a q-axis current command Iq* based on the torque command T* as shown in equation (2). In equation (2), K1 is a constant arbitrarily set.

$$Iq^* \leftarrow K1 \times T^* \qquad (2)$$

The current command production means 20 produces the stator current commands iu*, iv*, iw* of rectangular waveform when the driving method switching signal FDrv is at low level (FDrv=0), and produces the stator current commands iu*, iv*, iw* of sinusoidal waveform when the driving method switching signal FDrv is at high level (FDrv=1).

The operation of the current command production means 20 will be explained in detail below.

When the driving method switching signal FDrv=0, the current command production means 20 produces the stator current commands iu*, iv*, iw* of rectangular waveform shown in (h), (i) and (j) of FIG. 7 based on the rotational position signals CSU, CSV, CSW and the q-axis current command Iq*. The stator current commands iu*, iv*, iw* of rectangular waveform have a conduction period of 120 degree and a crest value equal to the q-axis current command Iq*, and have the relation with the induced voltages VbemfU, VbemfV, VbemfW induced in the stator windings 1U, 1V, 1W as shown in FIG. 7.

As shown in FIG. 7, assume that when the rotational position signals (CSU, CSV, CSW)=(1, 0, 1) in section (1), the stator current commands of rectangular waveform (iu*, iv*, iw*)=(Iq*, −Iq*, 0). Also, assume that when the rotational position signals (CSU, CSV, CSW)=(1, 0, 0) in section (2), the stator current commands of rectangular waveform (iu*, iv*, iw*)=(Iq*, 0, −Iq*). The situation in sections including and subsequent to section (3) is as shown in FIG. 7. This conduction method is called the 120 degree conduction type rectangular waveform drive.

When the driving method switching signal FDrv=1, on the other hand, the current command production means 20 produces the stator current commands iu*, iv*, iw* to be supplied to the stator windings 1U, 1V, 1W, respectively, based on the estimated rotational angle θ and the q-axis current command Iq*. The stator current commands iu*, iv*, iw* are assumed to be sinusoidal in waveform, in phase with the induced voltages VbemfU, VbemfV, VbemfW, respectively, induced in the stator windings 1U, 1V, 1W, and have a crest value of the q-axis current command Iq*. Specifically, they are produced as shown in equation (3) to (5) below.

$$iu^* \leftarrow Iq^* \times \sin(\theta+30 \text{ degree}) \quad (3)$$

$$iv^* \leftarrow Iq^* \times \sin(\theta-90 \text{ degree}) \quad (4)$$

$$iw^* \leftarrow Iq^* \times \sin(\theta-210 \text{ degree}) \quad (5)$$

Now, an explanation will given of the detailed operation of the driving means 10 for supplying an appropriate current to the stator windings 1U, 1V, 1W based on the stator current commands iu*, iv*, iw*.

As shown in FIG. 2 above, in the driving means 10, power is supplied from the power supply 12 and the supplied power is smoothed by a capacitor 13.

Figure 8:
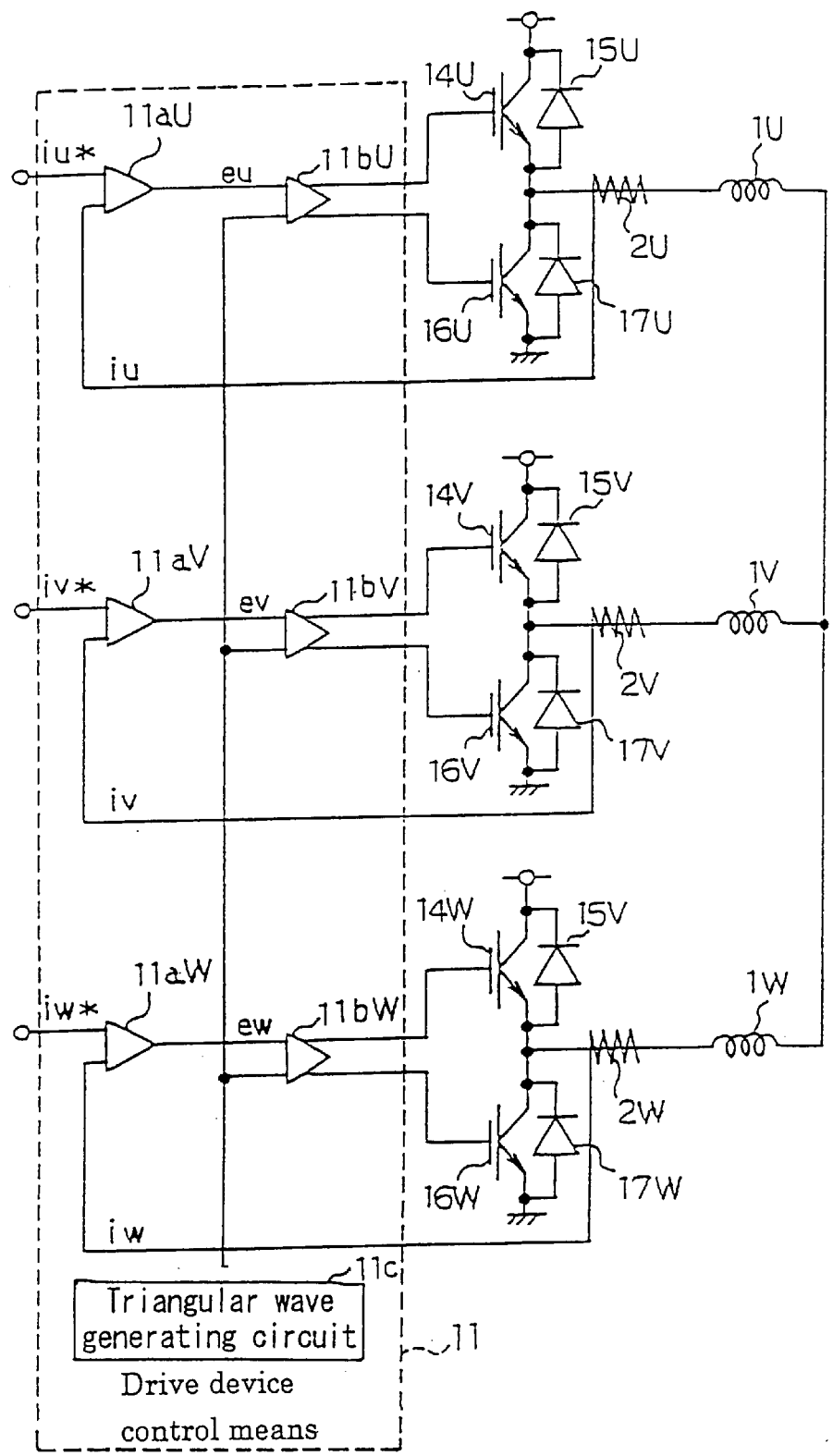
FIG. 8 is a diagram showing a circuit configuration of the drive device control means in embodiment 1.

FIG. 8 is a circuit diagram showing a configuration of the driving device control means 11 of the driving means 10 according to embodiment 1. The driving element control means 11 includes differential amplifiers 11aU, 11aV, 11aW, comparators 11bU, 11bV, 11bW and a triangular wave generating circuit 11c.

The differential amplifiers 11aU, 11aV, 11aW produce PWM current errors eu, ev, ew, which are the results of subtracting the stator currents iu, iv, iw from the stator current commands iu*, iv*, iw*, respectively, multiplied by the current minor gain Ke, a constant. This production method is shown in equations (6) to (8) below. In equations (6) to (8), only the proportional operation is performed. As an alternative, the proportional integral operation or the proportional plus integral plus derivative operation can be performed. Especially, when the resolution of the stator current commands iu*, iv*, iw* is so low that the waveform is stepped, the inclusion of the integral operation has a similar effect to smoothing the waveform of the stator current commands iu*, iv*, iw*.

$$eu \leftarrow Kex(iu^*-iu) \quad (6)$$

$$ev \leftarrow Kex(iv^*-iv) \quad (7)$$

$$ew \leftarrow Kex(iw^*-iw) \quad (8)$$

The triangular wave generating circuit 11c generates a triangular wave (several kHz to several tens of kHz).

The comparator 11bU compares the PWM current error eu with the triangular wave, and when the PWM current error eu is larger, energizes the upper IGBT14U and deenergizes the lower IBGT16U. When the PWM current error eu is smaller, on the other hand, the upper IBGT14U is deenergized, and the lower IGBT16U is energized. At the time of transfer of the conduction state of the upper IGBT and the lower IGBT, a short transfer time (dead time) for preventing the shorting of the drive power supply 12 is provided during which both the upper IGBT and the lower IGBT are deenergized. A similar operation is performed also for the remaining phases.

[Operation of Estimated Rotational Angle Control Means 8]

Now, an explanation will be given of the operation of the estimated rotational angle control means 8 shown in FIG. 3.

The time interval measuring means 30 includes a rotational position signal interrupt production section for producing a rotational position signal interrupt signal IntCss and a second timer 31 constituting a time interval measuring section for measuring the time interval CssCnt.

The rotational position signal interrupt production section of the time interval measuring means 30, as shown in (g) of FIG. 7, generates a rotational position signal interrupt signal IntCss at timings of rise and fall of the rotational position signals CSU, CSV, CSW, respectively. In this rotational position signal interrupt signal IntCss, the high level represents an interrupt.

Figure 9:
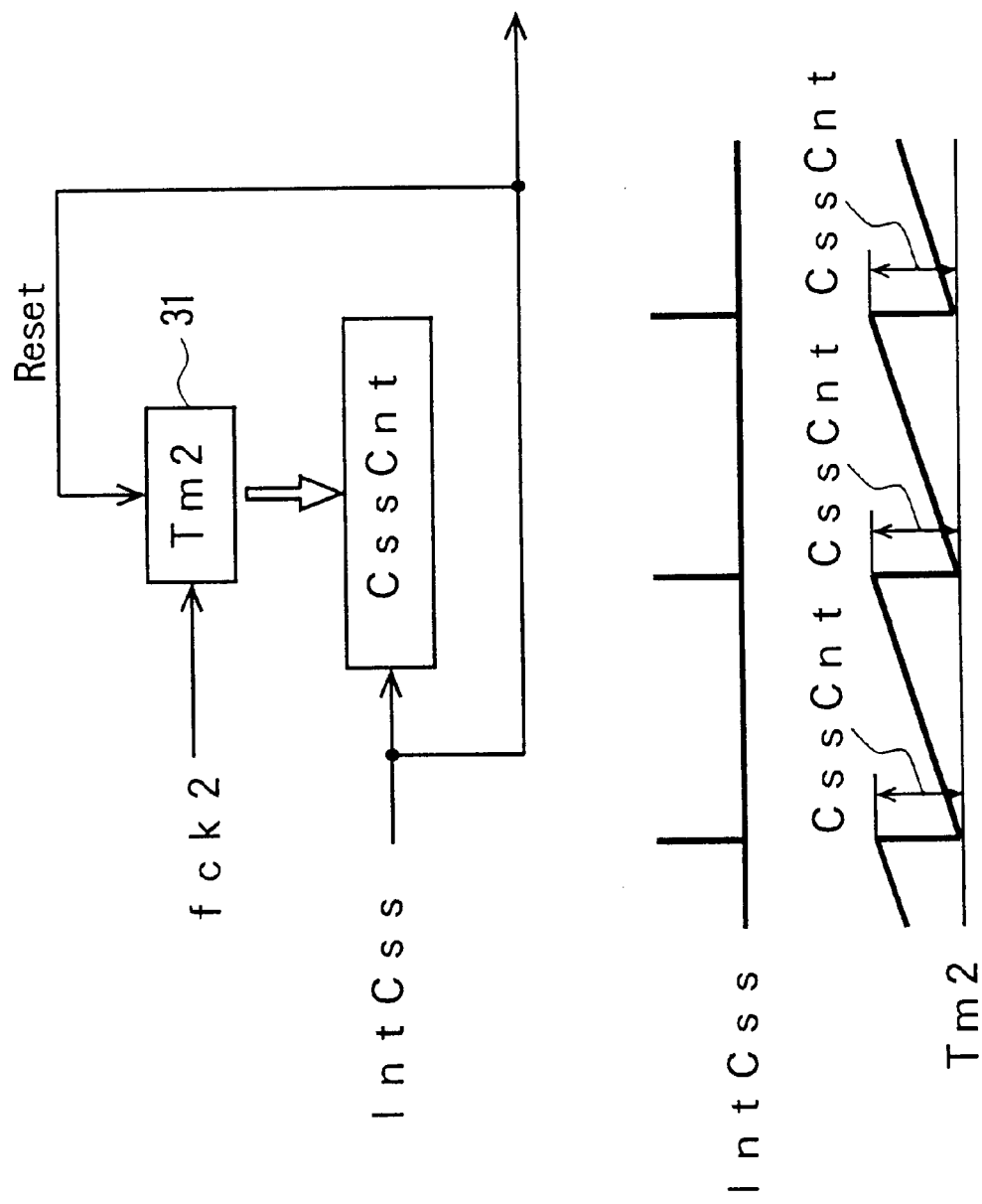
FIG. 9 is a schematic diagram showing the operation of the second timer in embodiment 1.

FIG. 9 is a diagram for explaining the operation of the time interval measuring section of the time interval measuring means 30 of the motor controller according to embodiment 1.

The second timer 31 making up the time interval measuring section of the time interval measuring means 30, as shown in FIG. 9, counts up the timer value Tm2 of the second timer 31 at a frequency fck2. And, each time the rotational position signal interrupt signal IntCss is applied thereto, the timer value Tm2 of the second timer 31 is set as the time interval CssCnt, while at the same time resetting the timer value Tm2 of the second timer 31.

The time interval storage means 61 of the estimated rotational angle control means 8 is a RAM area for storing the time interval storage value StrCss and has a storage area corresponding to one rotation interrupt number NCss. This one rotation interrupt number NCss is the number of interrupts of the rotational position signal interrupt signal IntCss per rotation in mechanical angle, and in embodiment 1 where the number of magnetic poles is four, is 12 (NCss= 6×(number of magnetic poles/2)).

The correction coefficient storage means 62 is a RAM area for storing the correction coefficient storage value StrCor and has a storage area corresponding to one rotation interrupt number NCss. All the correction coefficient storage values StrCor are initialized to 1.

The absolute angle storage means 63 is a RAM area for storing the absolute angle storage value StrθCss, and has a storage area corresponding to one rotation interrupt number NCss. In the absolute angle storage means 63, the 0th absolute angle storage value StrθCss[0]=0 degree, the 1st absolute angle storage value StrθCss[1]=60 degree, the 2nd absolute angle storage value StrθCss[2]=120 degree, and so forth. In this way, the absolute angle storage value StrθCss is increased 60 degree at a time for initialization.

Figure 10:
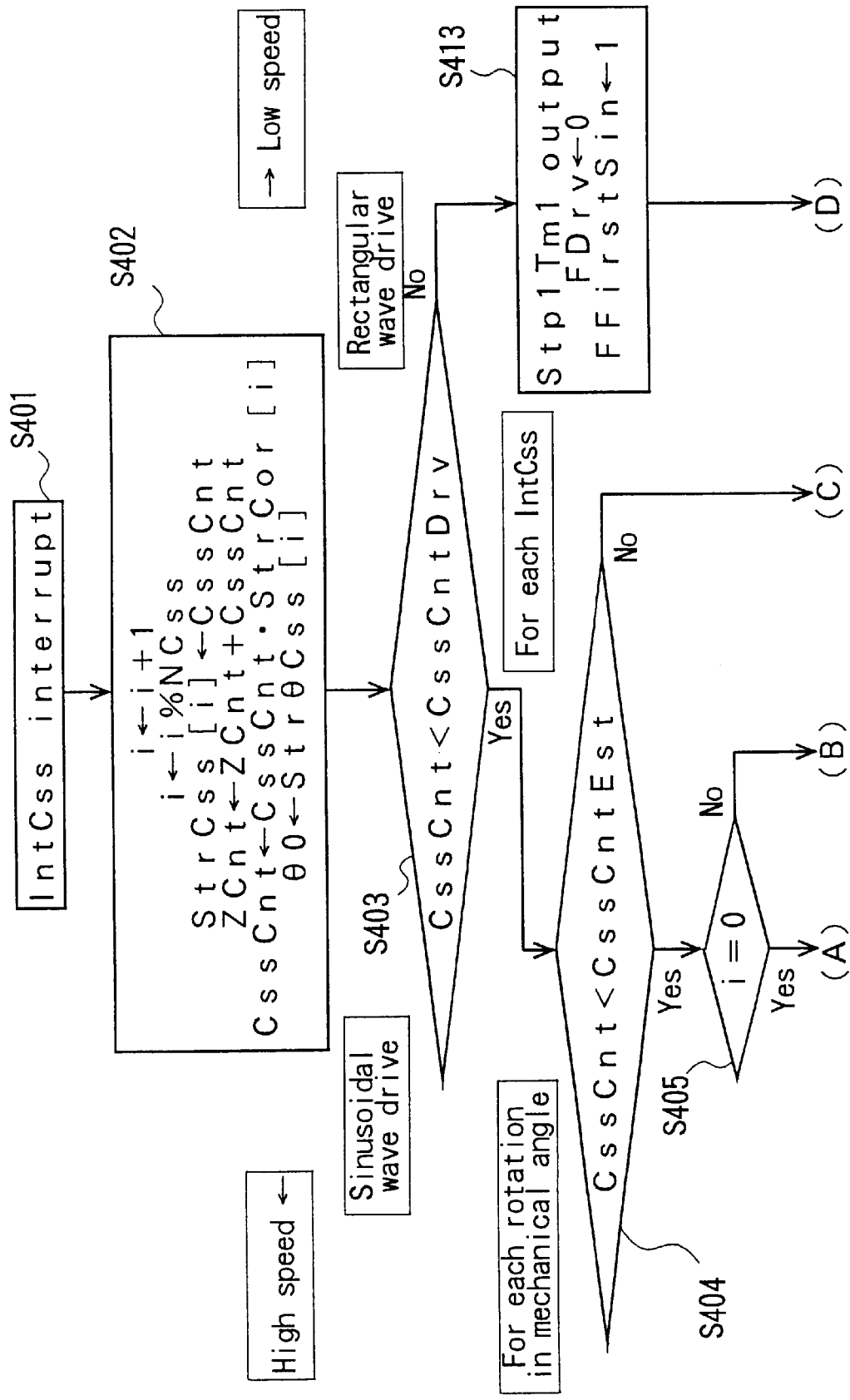
FIG. 10 is a flowchart showing the operation of the timer comparison value production means in embodiment 1.
Figure 11:
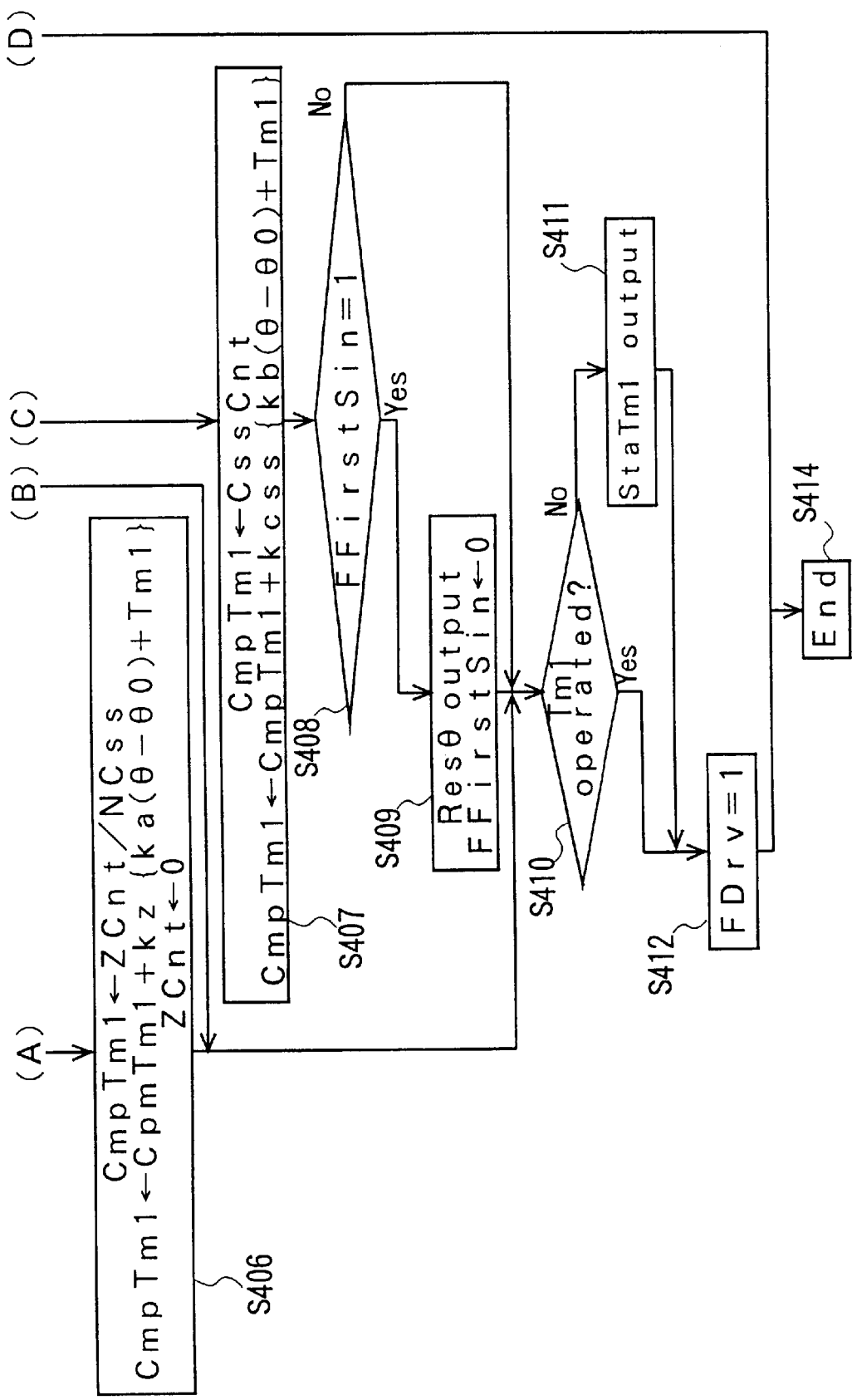
FIG. 11 is a flowchart showing the operation of the timer comparison value production means in embodiment 1.

FIGS. 10 and 11 are flowcharts showing the operation of the timer comparison value production means 40 of the estimated rotational angle control means 8 according to embodiment 1. The timer comparison value production means 40 is activated by the rotational position signal interrupt signal IntCss and performs the operation of FIGS. 10 and 11.

As shown in FIG. 3, the timer comparison value production means 40 is supplied with the time interval CssCnt, the driving method switching rotational speed ωdrv, the estimation method switching rotational speed ωest, the correction coefficient storage value StrCor and the absolute angle storage value StrθCss. Based on these values, the timer comparison value production means 40 produces and outputs the time interval storage value StrCss output to the time interval storage means 61 and used by the correction coefficient production means 51 on the one hand and the driving method switching signal FDrv for controlling the current command production means 20 on the other hand.

Also, the timer comparison value production means 40 outputs a timer comparison value CmpTm1 for controlling the first timer 70, a first start interrupt signal StaTm1 and a first stop interrupt signal Stp1Tm1. Also, the timer comparison value production means 40 produces and outputs a rotational angle update reset interrupt signal Resθ for controlling the rotational angle update means 71 and an absolute rotational angle θ0.

Next, the operation of the timer comparison value production means 40 in embodiment 1 will be explained with reference to the flowcharts of FIGS. 10 and 11.

In step S401, the time comparison value production means 40 is activated by the interruption of the rotational position signal interrupt signal IntCss.

In step S402, i+1 is set to i, and the remainder after dividing i by the one rotation interrupt number NCss is substituted into i. In this step, as shown by i under the waveform of the rotational position interrupt signal IntCss in FIG. 7, the count is incremented each time the rotational position signal interrupt signal IntCss is input, and reset to zero upon one rotation in mechanical angle. In other words, i changes from 0, 1 up to NCss−1, and when i=NCss, the count is reset to zero.

The number of magnetic poles of the brushless motor in embodiment 1 is 4. Therefore, as described above, the one rotation interrupt number NCss is 12. In embodiment 1, i changes from 0 to 1 up to 11, and the count is reset to zero when i=12. In the process, i is initialized to zero when the rotational position signal interrupt signal IntCss is input with the rise of the first rotational position signal CSU.

Also, in step S402, the current time interval CssCnt is set as the i-th time interval storage value StrCss[i].

Further, in step S402, the sum of the time interval total ZCnt and the time interval CssCnt is set as the time interval total ZCnt. The time interval total ZCnt, which is for calculating the total of the time interval CssCnt per rotation in mechanical angle, is used as a total of the time intervals in step S406 described later (CmpTm1←ZCnt/NCss) and is reset to zero later (ZCnt←0).

Further, in step S402, the product of the time interval CssCnt and the i-th correction coefficient storage value StrCor[i] is set as the time interval CssCnt. At the same time, the inaccuracy of the time interval CssCnt due to the inaccuracy of the rotational position signals CSU, CSV, CSW is corrected by the correction coefficient storage value StrCor. The correction coefficient StrCor is produced by the correction coefficient production means 51 described later.

In step S402, the i-th absolute angle storage value StrθCss [i] is set as the absolute rotational angle θ0. The i-th absolute angle storage value StrθCss[i] is produced by the correction coefficient production means 51 described later and is stored as the absolute rotational angle when the interrupt of the i-th rotational position signal interrupt signal IntCss is input.

In step S403, the time interval CssCnt and the driving method switching time interval CssCntDrv are compared with each other. The driving method switching time interval CssCntDrv is a time interval for the rotational speed of the brushless motor equal to the driving method switching rotational speed ωdrv and is calculated from the driving method switching rotational speed ωdrv. When the time interval CssCnt is smaller than the driving method switching time interval CssCntDrv in step S403, the process proceeds to step S404. In the case where the time interval CssCnt is not smaller than the driving method switching time interval CssCntDrv, on the other hand, the process proceeds to step S413.

In this way, the operation of step S404 and subsequent steps in the flowchart is performed when the rotational speed of the brushless motor is larger than the driving method switching rotational speed ωdrv, and the motor is driven with a sinusoidal wave based on the estimated rotational angle θ. The operation of steps including and subsequent to step 413, on the other hand, is performed when the rotational speed of the brushless motor is smaller than the driving method switching rotational speed ωdrv, and the motor is driven with a 120-degree conduction type rectangular wave based on the rotational position signals CSU, CSV, CSW.

In step S404, the time interval CssCnt is compared with the estimation method switching time interval CssCntEst. The estimation method switching time interval CssCntEst is a time interval associated with the case where the rotational speed of the brushless motor is equal to the estimation method switching rotational speed ωest and is calculated from the estimation method switching rotational speed ωest. When the time interval CssCnt is smaller than the estimation method switching time interval CssCntEst in step S404, the process proceeds to step S405. When the time interval CssCnt is not smaller than the estimation method switching time interval CssCntEst, on the other hand, the process proceeds to step S407 in FIG. 11.

Thus, the operation including and subsequent to step S405 is performed when the rotational speed of the brushless motor is larger than the estimation method switching rotational speed ωest for producing the timer comparison value CmpTm1 for each rotation in mechanical angle. The operation including and subsequent to step S407, on the other hand, is performed when the rotational speed of the brushless motor is smaller than the estimation method switching rotational speed ωest, and the timer comparison value CmpTm1 is produced for each rotational position signal interrupt IntCss.

In step S405, i and 0 are compared with each other and if they are equal to each other, the process proceeds to step S406 in FIG. 11. If i and 0 are not equal to each other, on the other hand, the process proceeds to step S410 in FIG. 11.

Thus, the operation of S406 is performed only with one specific rise of the rotational position signal CSU once per rotation in mechanical angle.

In step S406, the time interval total ZCnt is divided by the one rotation interrupt number NCss, and the resulting value is set as the timer comparison value CmpTm1. The time interval total ZCnt divided by the one rotation interrupt number NCss is the average time interval during one rotation in mechanical angle, and the average time interval is used instead of substituting the individual time intervals CssCnt.

In step S406, the timer comparison value CmpTm1 is corrected in the manner shown in equation (9) below.

$$CmpTm1 \leftarrow CmpTm1 + kz \times \{ka \times (\theta - \theta 0) + Tm1\} \tag{9}$$

In equation (9), Tm1 designates a timer value on the first timer 70, and ka (average value of CsCnt)/θstep. θ step is a constant used in step S712 in the rotational angle update means 71 described later and corresponds to the resolution of the multiplied signal described above in [Brief description of the operation of embodiment 1] assuming a value of θstep=60 degree/(fck1/fck2).

By this correction process, the deviation can be corrected. In equation (9), kz designates a deviation correction gain for producing the timer comparison value CmpTm1 once per rotation in mechanical angle, and ka×(θ−θ0)+Tm1 a deviation corresponding to α of equation (1) explained in [Brief description of the operation of embodiment 1] above.

In step S406, 0 is substituted into the time interval total ZCnt and the time interval total ZCnt is reset to zero.

In step S407, the time interval CssCnt is substituted into the timer comparison value CmpTm1.

The timer comparison value CmpTm1 is corrected according to equation (10) below.

$$CmpTm1 \leftarrow CmpTm1 + kcss \times \{kb \times (\theta - \theta 0) + Tm1\} \quad (10)$$

In equation (10), Tm1 is a timer value on the first timer 70, and kb is CssCnt/θstep. By this correction process, the deviation can be corrected.

In equation (10), kcss is a deviation correction gain for producing the timer comparison value CmpTm1 each time the rotational position interrupt IntCss is input, and kb×(θ−θ0)+Tm1 represents a deviation corresponding to α in [Brief description of the operation of embodiment 1] described above.

In step S408, a sinusoidal wave drive decision flag FFirstSin is compared with 1. When the sinusoidal wave drive decision flag FFirstSin is equal to 1, the process proceeds to step S409. When the sinusoidal wave drive decision flag FFirstSin is not equal to 1, on the other hand, the process proceeds to step S410.

In step S409, a rotational angle update reset interrupt signal Resθ is output, and 0 is substituted into the sinusoidal wave drive decision flag FFirstSin.

When the drive with a rectangular wave is switched to a drive with a sinusoidal wave, the estimated rotational angle θ is not determined. At the time of switch from the drive with a rectangular to sinusoidal wave, therefore, the estimated rotational angle θ is required to be set to a correct value. In view of this, step S408, step S409 and step S413 decide whether the drive with a rectangular wave has switched or not to the drive with a sinusoidal wave using the sinusoidal wave decision flag FFirstSin, and outputs the rotational angle update reset interrupt signal Resθ to the rotational angle update means 71. And the estimated rotational angle θ is reset to the absolute value (θ0=StrθCss[i]) at the time of interrupt input of the rotational position signal interrupt signal IntCss.

In step S410, the operation of the first timer 70 is checked, and when the first timer 70 is in operation, the process proceeds to step S412. If the first timer 70 is not in operation, on the other hand, the process proceeds to step S411.

In step S411, in order to activate the first timer 70 not in operation, the timer start interrupt signal StaTm1 is output.

In step S412, 1 is substituted into the driving method switching signal FDrv. The driving method switching signal FDrv is set to 1 (high level), and the current command production means 20 is notified of the drive with a sinusoidal wave using the estimated rotational angle θ.

In step S413, the first timer stop interrupt signal Stp1Tm1 is output. The first timer 70 is stopped and the production of the estimated rotational angle θ is canceled.

In step S413 of FIG. 10, on the other hand, 0 is substituted into the driving method switching signal FDrv. The driving method switching signal FDrv is set to zero (low level), and the command production means 20 is notified of the drive with 120-degree conduction type rectangular wave using the rotational position signals CSU, CSV, CSW.

And, 1 is substituted into the sinusoidal wave drive decision flag "FFirstSin".

In step S414, the operation of the timer comparison value production means 40 is terminated.

Figure 12:
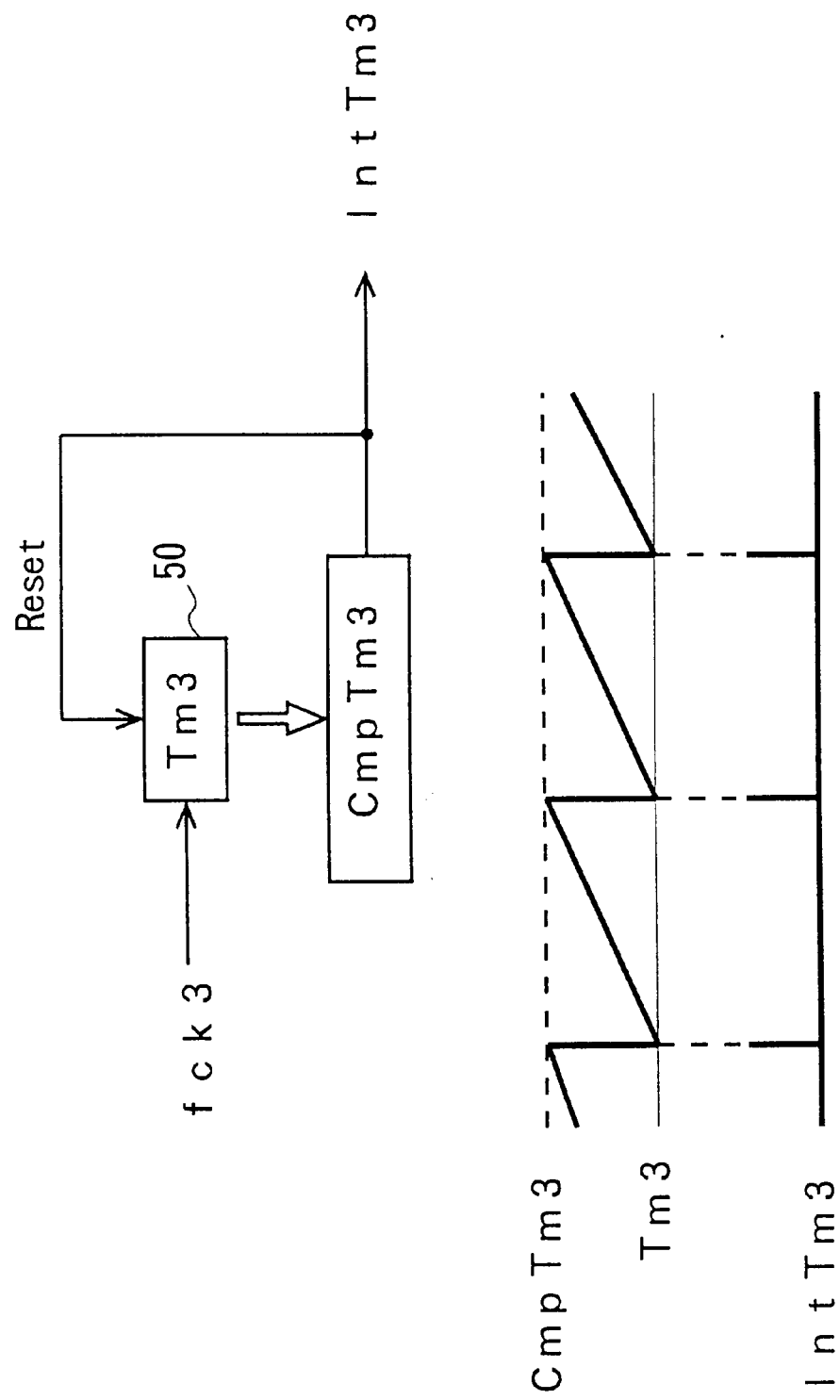
FIG. 12 is a schematic diagram showing the operation of the third timer in embodiment 1.

FIG. 12 is a diagram for explaining the operation of the third timer 50 (FIG. 3) of the estimated rotational angle control means 8 in embodiment 1.

As shown in FIG. 12, the third timer 50 counts up at the frequency fck3. When the timer value Tm3 becomes equal to a set value CmpTm3, the third timer 50 outputs the third timer interrupt signal IntTm3, resets the timer value Tm3 to zero and counts up again.

Figure 13:
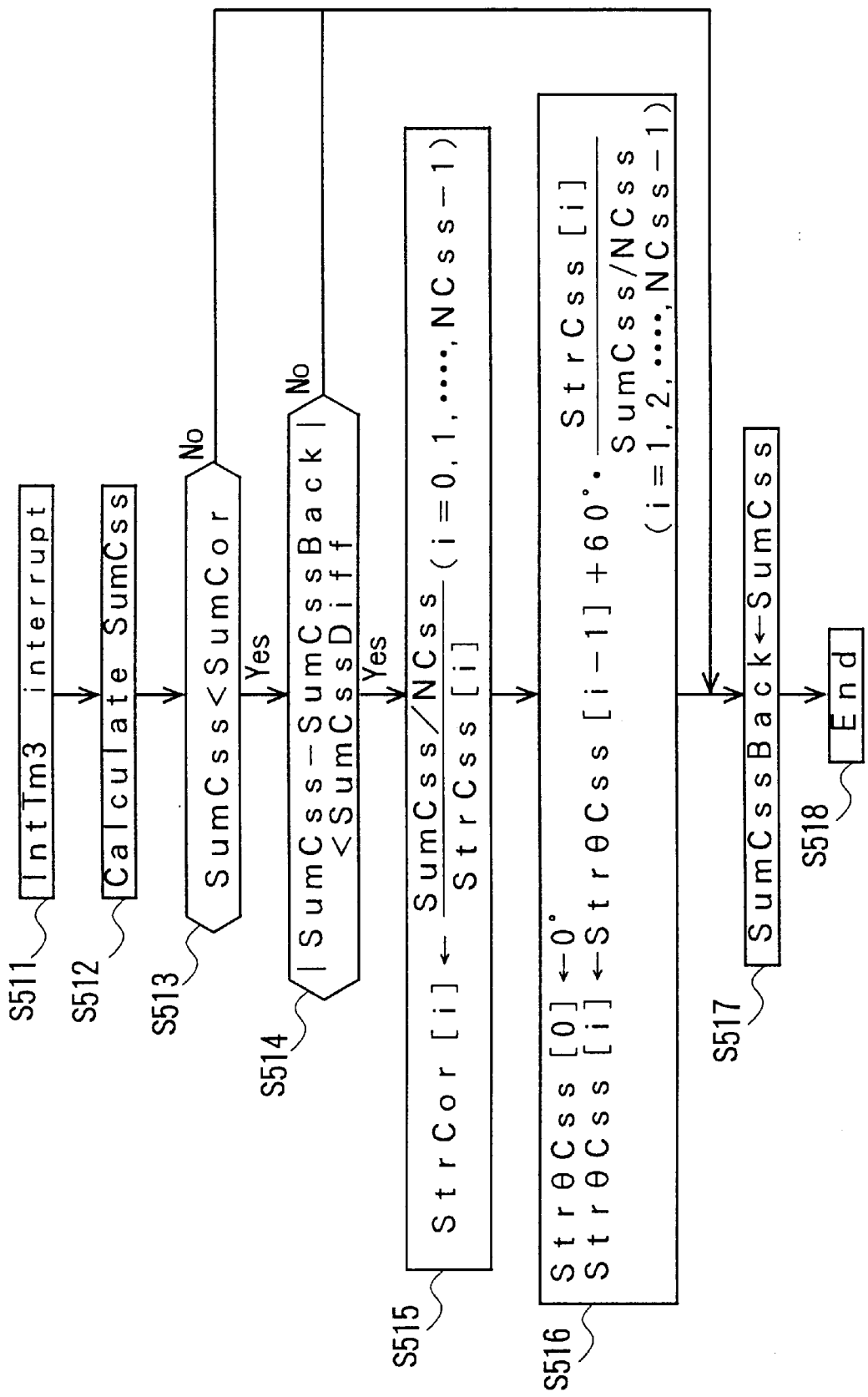
FIG. 13 is a flowchart showing the operation of the correction coefficient production means in embodiment 1.

FIG. 13 is a flowchart showing the operation of the correction coefficient production means 51 (FIG. 3) of the estimated rotational angle control means 8 in embodiment 1.

The correction coefficient production means 51 of the estimated rotational angle control means 8 is activated by the third timer interrupt signal IntTm3 of the third timer 50 and performs the operation shown in the flowchart of FIG. 13. The correction coefficient production means 51 produces the correction coefficient storage value StrCor and the absolute angle StrθCss based on the time interval storage value StrCss when the rotational speed is somewhat high and small in fluctuation.

Hereinafter, the detailed operation of the correction coefficient production means 51 will be explained.

In step S511, the correction coefficient production means 51 is activated by the third timer interrupt signal IntTm3.

In step S512, the time interval sum SumCss is calculated. The total of the zero-th to (NCss−1)-th time interval storage values (StrCss[0] to StrCss[NCss−1]) is used as the time interval sum SumCss.

In step S513, the time interval sum SumCss is compared with a set value SumCor. When the time interval sum SumCss is smaller than the set value SumCor, the process proceeds to step S514. When the time interval sum SumCss is not smaller than the set value SumCor, on the other hand, the process proceeds to step S517. By this operation, the correction coefficient is produced only when the rotational speed of the brushless motor assumes a certain high value.

In step S514, the absolute value of the difference between the time interval sum SumCss and the preceding time interval sum SumCssBack is compared with a set value SumCssDiff. In the case where the absolute value is smaller than the set value SumCssDiff, the process proceeds to step S515. If the absolute value is not smaller than the set value SumCssDiff, on the other hand, the process proceeds to step S517. By this operation, the correction coefficient is produced only when the fluctuation of the rotational speed of the brushless motor is small.

In step S515, the average value of the time interval CssCnt is expressed as SumCss/NCss. The ratio between this average value and the time interval storage value StrCss[i] is set as the i-th correction coefficient storage value StrCor[i]. In this case, i is changed from 0 to NCss−1.

In step S516, 0 degree is substituted into the zero-th absolute angle storage value StrθCss[0]. Also, the ratio between the i-th time interval storage value StrCss[i] and the average value SumCss/NCss of the time interval CssCnt, multiplied by 60 degree, plus the (i−1)th absolute angle storage value StrθCss[i−1], is set as the i-th absolute angle storage value StrθCss[i]. In the process, i is changed from 1 to NCss−1.

In step S517, the present time interval sum SumCss is substituted into the preceding time interval sum SumCssBack in order to use it for the next processing.

In step S518, the operation of the correction coefficient production means 51 is terminated.

Figure 14:
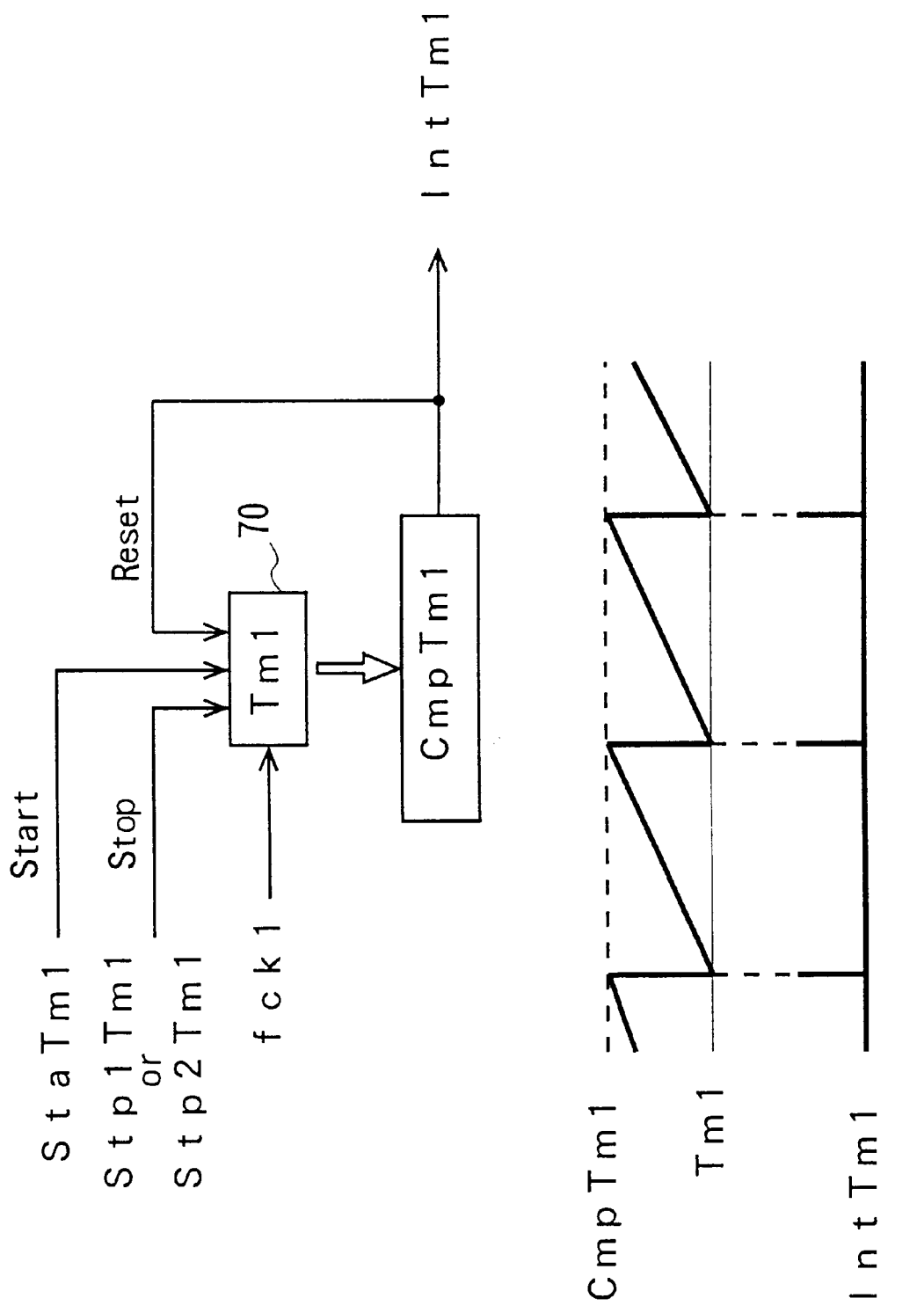
FIG. 14 is a schematic diagram showing the operation of the first timer in embodiment 1.

FIG. 14 is a diagram for explaining the operation of the first timer 70 (FIG. 3) of the estimated rotational angle control means 8 in embodiment 1.

As shown in FIG. 14, the first timer 70 counts up at the frequency fck1. When the timer value Tm1 becomes equal to the timer comparison value CmpTm1, the first timer 70 outputs the first timer interrupt signal IntTm1, resets the timer value Tm1 to zero, and counts up again.

By the way, the first timer 70 begins to operate with the first start interrupt signal StaTm1, and stops operating with the first stop interrupt signal Stp1Tm1 or the second stop interrupt signal Stp2Tm1.

Figure 15:
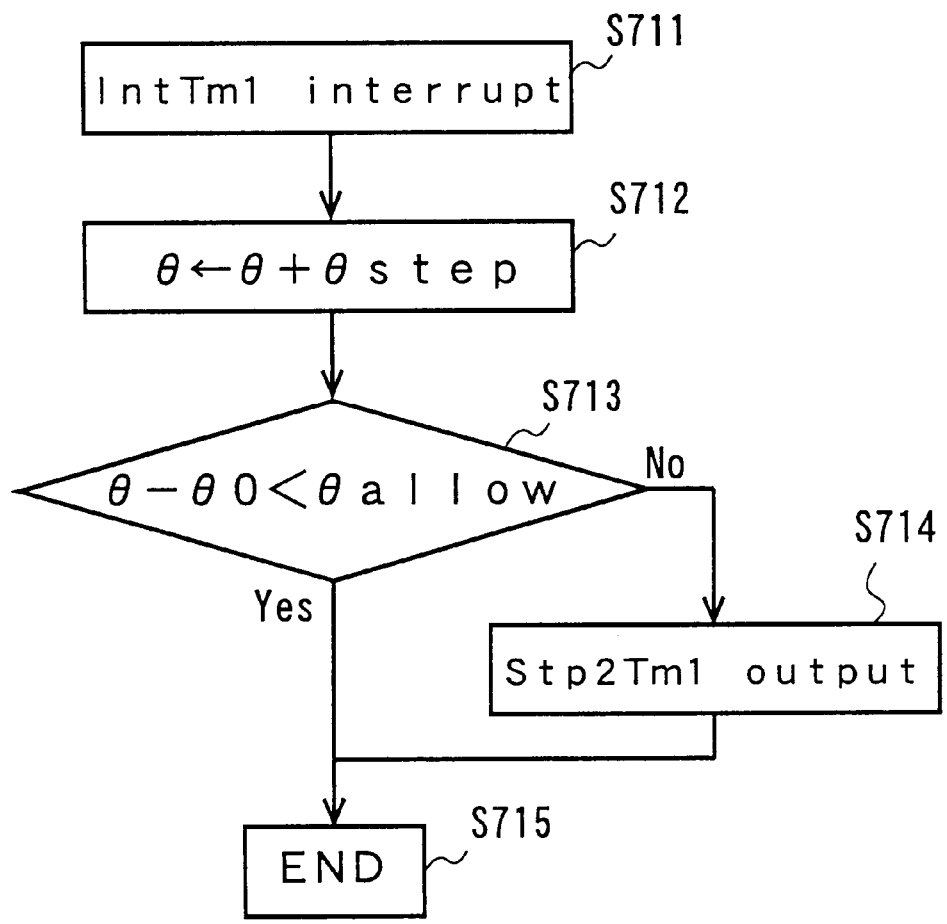
FIG. 15 is a flowchart showing the operation of the rotational angle update means activated by the first timer interrupt in embodiment 1.

FIG. 15 is a flowchart showing the operation of the rotational angle update means 71 (FIG. 3) of the estimated rotational angle control means 8 in embodiment 1.

The rotational angle update means 71 is activated by the first timer interrupt signal IntTm1, and performs the operation shown in the flowchart of FIG. 15. Each time the first timer interrupt signal IntTm1 is input, the estimated rotational angle θ is advanced, and when it is advanced abnormally, the second stop interrupt signal Stp2Tm1 is output and the first timer 70 is stopped.

Hereinafter, a detailed explanation will be given of the operation of the rotational angle update means 71 (FIG. 3) of the estimated rotational angle control means 8.

In step S711 of FIG. 15, the first timer interrupt signal IntTm1 is input, whereby the rotational angle update means 71 is activated.

In step S712, the sum of the estimated rotational angle θ and the rotational angle step θstep is substituted into the estimated rotational angle θ. As explained in the aforementioned [Brief description of the operation of embodiment 1], the rotational position signal interrupt signal IntCss is multiplied by the ratio between the frequency fck1 of the first timer 70 and the frequency fck2 of the second timer 31, and therefore the rotational angle step is given as θstep=60 degree/(fck1/fck2).

In step S713, the difference between the estimated rotational angle θ and the absolute rotational angle θ0 is compared with a value θallow set in advance. When the difference between the estimated rotational angle θ and the absolute rotational angle θ0 is smaller than the set value θallow, the process proceeds to step S715. In the case where the difference between the estimated rotational angle θ and the absolute rotational angle θ0 is not smaller than the set value θallow, on the other hand, the process proceeds to step S714.

In step S714, the rotational angle update means 71 outputs the second stop interrupt signal Stp2Tm1 to the first timer 70.

In the case where the estimated rotational angle θ is advanced excessively in steps S713 and S714, the second stop interrupt signal Stp2Tm1 is output, so that the first timer 70 is stopped and thus a further advance of the estimated rotational angle θ is inhibited.

By the way, in order to restart the first timer 70 that has been stopped in steps S410 and S411 of the timer comparison value production means 40 shown in FIG. 11, the inhibition mentioned above is canceled by the rotational position signal interrupt signal IntCss, thereby making it possible to advance the estimated rotational angle θ again.

In step S715, the operation of the rotational angle update means 71 is completed.

Figure 16:
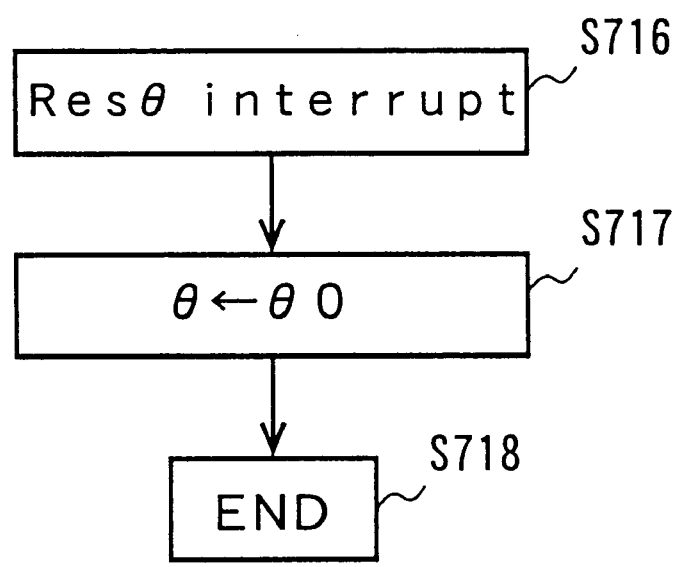
FIG. 16 is a flowchart showing the operation of the rotational angle update means activated by the rotational angle update reset interrupt in embodiment 1.

Also, the rotational angle update means 71 of the estimated rotational angle control means 8 is activated by the rotational angle update reset interrupt signal Resθ, and the operation of the flowchart shown in FIG. 16 is performed.

FIG. 16 is a flowchart showing the operation of the rotational angle update means 71 activated by the rotational angle update reset interrupt signal Resθ in embodiment 1. When the rotational angle update means 71 is supplied with the rotational angle update reset interrupt signal Resθ generated when the timer comparison value production means 40 switches from the drive with a rectangular wave to the drive with a sinusoidal wave, the rotational angle update means 71 sets the estimated rotational angle θ to the absolute rotational angle θ0.

The operation of the rotational angle update means 71 will be explained below in detail with reference to FIG. 16.

In step S716, the rotational angle update means 71 is activated by the rotational angle update reset interrupt signal Resθ.

In step S717, the absolute rotational angle θ0 is substituted into the estimated rotational angle θ.

In step S718, the operation of the rotational angle update means 71 is completed.

[Effects of the Embodiment 1]

Now, an explanation will be given of the effects realized by the motor controller according to embodiment 1.

In the conventional motor controller, the 120-degree conduction type drive with a rectangular wave using the rotational position signals CSU, CSV, CSW poses the problem of distorting the stator currents iu, iv, iw, increasing the variations in the output torque and increasing the vibration and noise of the motor.

In view of this, in the motor controller according to embodiment 1, the second timer 31 of frequency fck2 counts up, and the time interval CssCnt obtained by the count-up is used as the timer comparison value CmpTm1 thereby to activate the first timer 70 of frequency fck1. As a result of operation of the first timer 70, a signal is produced which is multiplied by fck1/fck2.

As a result, the stator current commands iu*, iv*, iw* of sinusoidal waveform are produced, and the stator currents iu, iv, iw of sinusoidal waveform are supplied to the stator windings. Consequently, according to embodiment 1, a motor controller can be realized in which the output torque fluctuates less, and the vibration and the noise of the motor are reduced.

Also, the conventional motor controller poses the problem that the torque cannot be output according to the torque command T* if the actual rotational angle and the estimated rotational angle are not coincident with each other.

In view of this, the deviation is corrected in step S406 and step S407 of the timer comparison value production means 40 shown in FIGS. 10 and 11, thereby eliminating the deviation of the actual rotational angle from the estimated rotational angle θ. Then, the stator current commands iu*, iv*, iw* of sinusoidal waveform based on the actual rotational angle are produced thereby to supply the stator currents iu, iv, iw of sinusoidal waveform based on the actual rotational angle. As a result, according to embodiment 1, the output torque conforming with the torque command T* is realized, thereby making it possible to realize a motor controller which has a small fluctuation of output torque and small vibration and noise of the motor.

Also, in the conventional motor controller, when the brushless motor is stationary, the rotational position signal interrupt signal IntCss is not input. Therefore, the rotational angle cannot be estimated. Further, the problem is that when the rotational speed is small, the second timer 31 may overflow, thereby making it impossible to estimate the rotational angle.

In view of this, in the motor controller according to embodiment 1 of the present invention, step S403 in the time comparison value production means 40 is activated, so that when the rotational speed of the brushless motor is lower than the driving method switching rotational speed ωdrv, the 120-degree conduction type drive with a rectangular wave is performed, and the drive with a sinusoidal wave is used when the rotational speed is higher. Thus, a motor controller of embodiment 1 can surely start the brushless motor. As a result, according to embodiment 1, a motor controller is be realized in which the torque is output accurately even at a low rotational speed.

Also, in the conventional motor controller, with the increase in the rotational speed of the brushless motor, the calculation load of the timer comparison value production means 40 increases. As a result, the next rotational position signal interrupt signal IntCss is input before complete calculation, thereby posing the problem that the rotational angle cannot be estimated.

In view of this, step S404 is activated in the timer comparison value production means 40, and when the rotational speed of the brushless motor is lower than the estimation method switching rotational speed ωest, the timer comparison value CmpTm1 is produced for each rotational position signal interrupt signal IntCss, while when the rotational speed is higher, the timer comparison value CmpTm1 is produced for each rotation in mechanical angle. As a result, in embodiment 1, even when the rotational speed is high, the estimated rotational angle θ is produced, the stator current commands iu*, iv*, iw* of sinusoidal waveform are produced, and the stator currents iu, iv, iw of sinusoidal waveform are supplied. Thus, a motor controller is realized which has a small fluctuation in output torque and low in vibration and noise.

As described in [Brief description of the operation of embodiment 1] above, in the conventional motor controller, the rotational position signals CSU, CSV, CSW may develop inaccuracy due to the variations of the output signals or the mounting error of the rotational position signal generators 3U, 3V, 3W (FIG. 1) of Hall ICs or the variation in magnetization of the rotational position detection disk 4. As a result, the time interval CssCnt fluctuates and so does the estimated rotational angle θ, thus posing the problem of a torque ripple generated.

In view of this, in the correction coefficient production means 51 in embodiment 1 of the present invention, the correction coefficient storage value StrCor and the absolute angle storage value StrθCss are produced, the time interval CssCnt is corrected in step S402 in the timer comparison value production means 40, and the absolute angle storage value StrθCss is used as the absolute rotational angle θ0 in step S406 and step S407. In this way, the estimated rotational angle θ free of fluctuation is produced. As a result, according to embodiment 1 described above, it is possible to realize a motor controller for controlling the brushless motor without any torque ripple.

Also, in the conventional motor controller, when the rotational speed of the brushless motor is sharply reduced, the estimated rotational angle θ is advanced excessively and the output torque may be reduced.

In view of this, in step S713 and step S714 in the rotational angle update means 71 shown in FIG. 15, when the estimated rotational angle θ is advanced excessively, the second stop interrupt signal Stp2Tm1 is output and the first timer 70 is stopped thereby to prevent the excessive advance of the estimated rotational angle θ. As a result, according to embodiment 1, a motor control can be realized, in which the brushless motor can accurately output the torque.

<<Embodiment 2>>

Now, embodiment 2 of the motor controller according to the present invention will be explained with reference to the accompanying drawings.

Embodiment 1 described above referred to the case in which current commands are produced. In a motor controller according to embodiment 2, on the other hand, a three-phase four-pole brushless motor is controlled using voltage commands. Embodiment 2 refers to a motor controller in which a voltage expressed by a voltage command is applied to the stator windings. As compared with embodiment 1, the motor controller according to embodiment 2 reduces the cost by eliminating the current sensors 2U, 2V, 2W.

[General Configuration of Embodiment 2]

First, the general configuration of a motor controller according to embodiment 2 will be explained.

Figure 17:
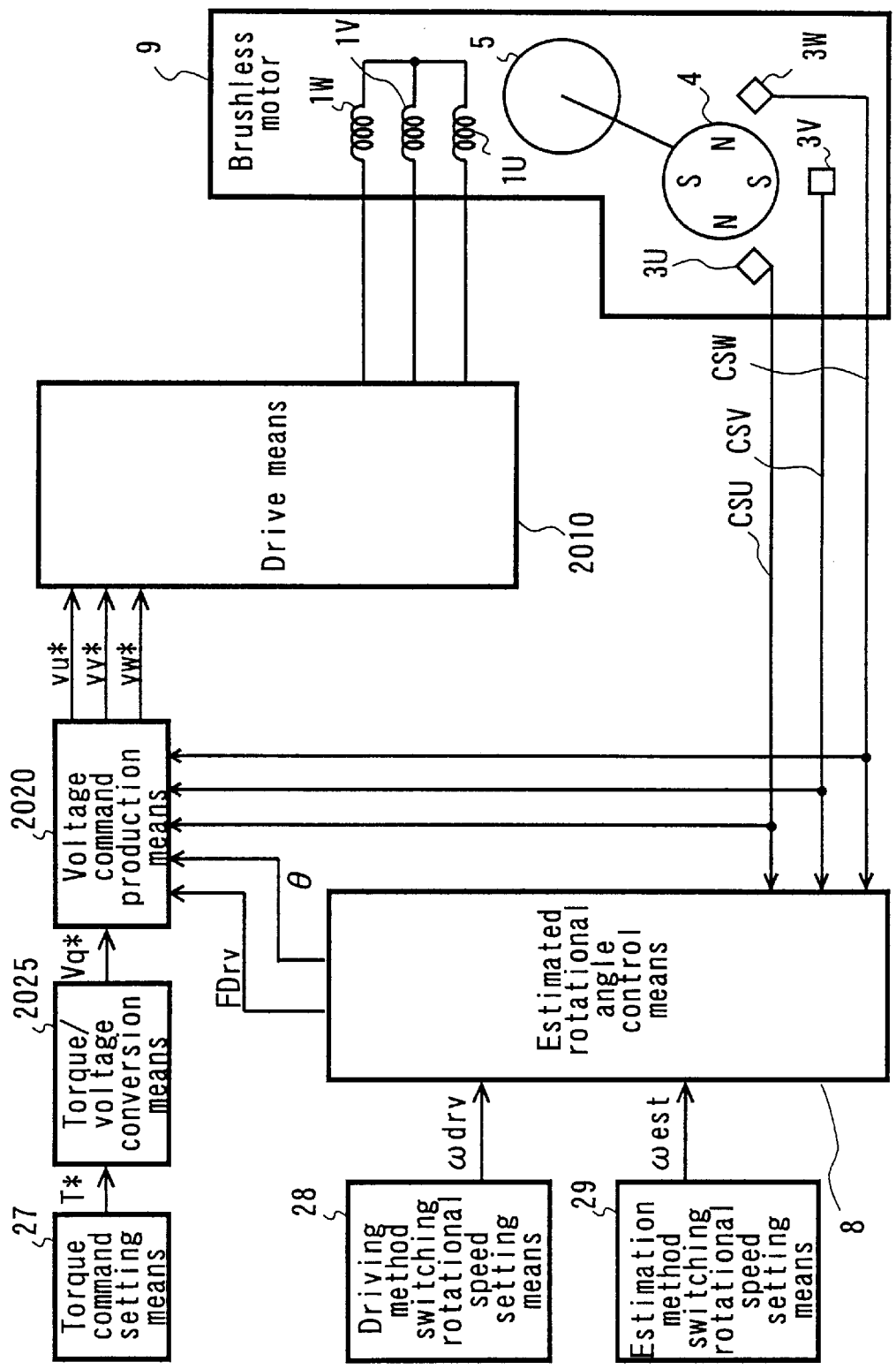
FIG. 17 is a block diagram showing a configuration of the motor controller in embodiment 2 of the present invention.

FIG. 17 is a block diagram showing a configuration of a motor controller according to embodiment 2. In FIG. 17, the configuration of the brushless motor 9 according to embodiment 2 is the same as that of the brushless motor of embodiment 1 described above, and will not be described. Also, in embodiment 2, the component parts having the same function and the same configuration as the corresponding ones in FIGS. 1, 2 and 3 showing embodiment 1 are designated by the same reference numerals, respectively, and will not be explained, for which the description in embodiment 1 should be referred to.

The motor controller according to embodiment 2 comprises three setting means including torque command setting means 27 for outputting a torque command T*, driving method switching rotational speed setting means 28 for outputting the driving method switching rotational speed ωdrv and estimation method switching rotational speed setting means 29 for outputting the estimation method switching rotational speed ωest.

Also, the motor controller according to embodiment 2 comprises estimated rotational angle control means 8, drive means 2010, voltage command production means 2020 and torque/voltage conversion means 2025.

As shown in FIG. 17, the estimated rotational angle control means 8 is configured to be supplied with rotational position signals CSU, CSV, CSW, a driving method switching rotational speed ωdrv and an estimation method switching rotational speed ωest and to output a driving method switching signal FDrv and an estimated rotational angle θ.

The torque/voltage conversion means 2025 is supplied with the torque command T* from the torque command setting means 27 and outputs the q-axis voltage command Vq* to the voltage command production means 2020.

The voltage command production means 2020 is supplied with the rotational position signals CSU, CSV, CSW, the driving method switching signal FDrv and the q-axis voltage command Vq* and the estimated rotational angle θ from the estimated rotational angle control means 8, and outputs the stator voltage commands vu*, vv*, vw* to the drive means 2010.

The drive means 2010 is supplied with the stator voltage commands vu*, vv*, vw* and connected with the stator windings 1U, 1V, 1W.

FIG. 18 is a diagram showing a circuit configuration of the drive means 2010 for the motor controller according to embodiment 2.

As shown in FIG. 18, the drive means 2010 includes drive device control means 2011, a power supply 12, a capacitor 13 constituting an electrolytic capacitor connected in parallel to the power supply 12, upper IGBTs 14U, 14V, 14W, upper diodes 15U, 15V, 15W, lower IGBTs 16U, 16V, 16W and lower diodes 17U, 17V, 17W.

The drive device control means 2011 is supplied with the stator voltage commands vu*, vv*, vw* and controls the energization and deenergization of the upper IGBTs 14U, 14V, 14W and the lower IGBTs 16U, 16V, 16W in the manner described later.

Each collector of the upper IGBTs 14U, 14V, 14W is connected to the positive terminal of the power supply 12, and the collectors of the lower IGBTs 16U, 16V, 16W is connected to the emitters of the upper IGBTs 14U, 14V, 14W and the stator windings 1U, 1V, 1W, respectively. Also, the emitters of the lower IGBTs 16U, 16V, 16W are connected to the negative terminal of the power supply 12.

The upper diodes 15U, 15V, 15W are connected in reverse parallel to the upper IGBTs 14U, 14V, 14W, respectively. The lower diodes 17U, 17V, 17W are connected in reverse parallel to the lower IGBTs 16U, 16V, 16W, respectively.

The configuration of the estimated rotational angle control means 8 according to embodiment 2 is the same as that of the estimated rotational angle control means 8 shown in FIG. 3 according to embodiment 1 described above, and will not be described again.

[General Operation of Embodiment 2]

Now, an explanation will be given of the general operation of the motor controller according to embodiment 2.

In the motor controller according to embodiment 2, the brushless motor 9, the driving method switching rotational speed setting means 28, the estimation method switching rotational speed setting means 29, the estimated rotational angle control means 8 and the torque command setting means 27 are the same as the corresponding parts, respectively, of embodiment 1 described above and therefore will not be explained any more.

The torque/voltage conversion means 2025, as shown in equation (11), produces the q-axis voltage command Vq* from the torque command T*. In equation (11), K12 is an arbitrarily set constant.

$$Vq^* \leftarrow K12 \times T^* \tag{11}$$

The voltage command production means 2020 produces the stator voltage commands vu*, vv*, vw* of rectangular waveform when the driving method switching signal FDrv of the estimated rotational angle control means 8 is at low level (FDrv=0), and produces the stator voltage commands vu*, vv*, vw* of sinusoidal waveform when the driving method switching signal FDrv is at high level (FDrv=1).

Now, the operation of the voltage command production means 2020 will be explained in detail.

Figure 19:
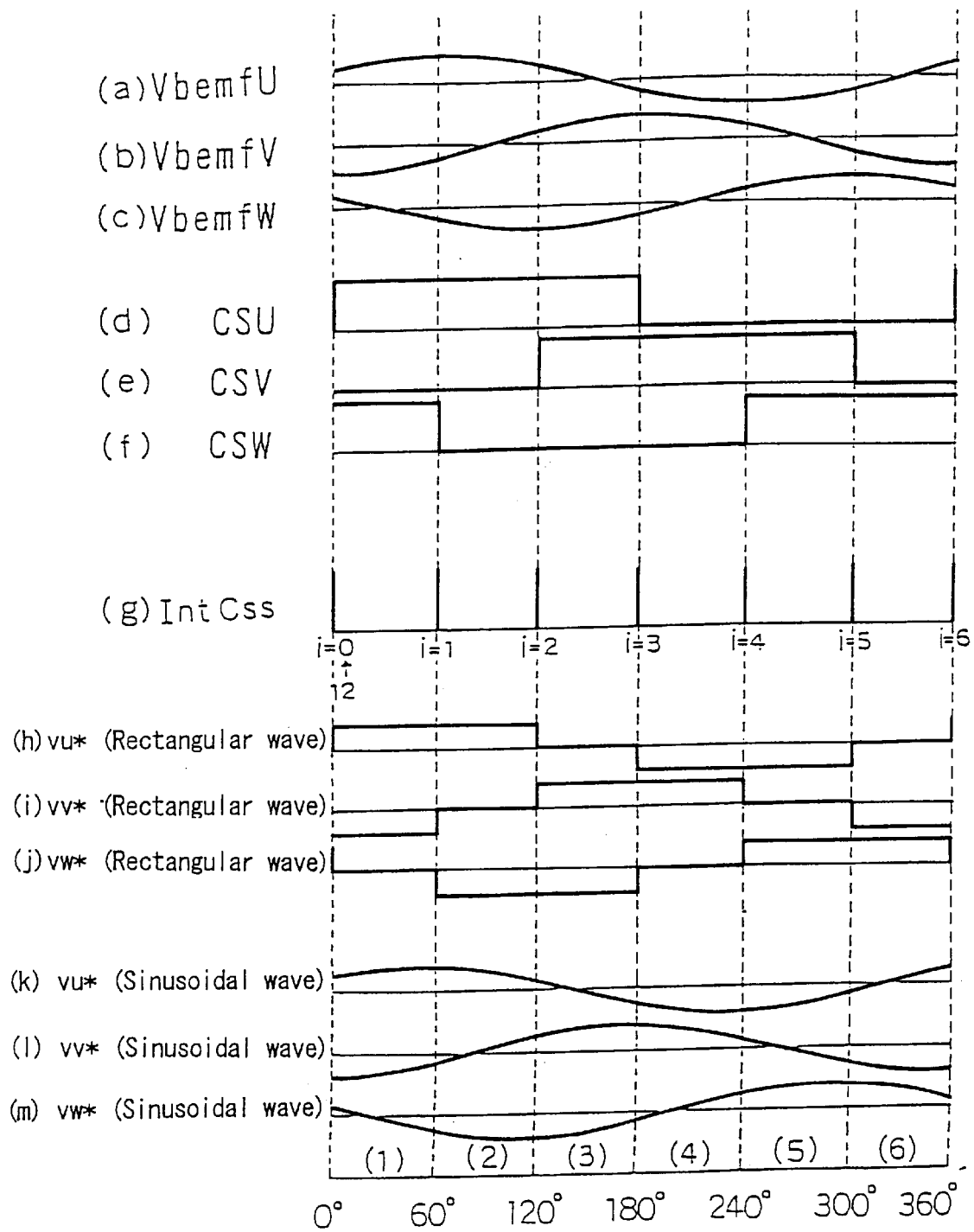
FIG. 19 is a waveform diagram showing the relation between the induced voltage induced in the stator windings, the rotational position signal, the rotational position signal interrupt signal, the stator voltage command for drive with a rectangular wave and the stator voltage command for drive with a sinusoidal wave in embodiment 2.

FIG. 19 is a waveform diagram showing the relation between the induced voltages VbemfU, VbemfV, VbemfW induced in the stator windings 1U, 1V, 1W, the rotational position signals CSU, CSV, CSW, the rotational position signal interrupt signal IntCss, the stator voltage commands vu*, vv*, vw* for drive with rectangular wave and the stator voltage commands vu*, vv*, vw* for drive with sinusoidal wave in embodiment 2.

When the driving method switching signal FDrv is 0, the voltage command production means 2020 produces the stator voltage commands vu*, vv*, vw* of rectangular waveform ((h), (i), (j) of FIG. 19) to be applied to the stator windings 1U, 1V, 1W, respectively, based on the rotational position signals 3U, 3V, 3W and the q-axis voltage command Vq*. The stator voltage commands vu*, vv*, vw* have a conduction section of 120 degree and a crest value equal to the q-axis voltage command Vq*. The stator voltage commands vu*, vv*, vw* are related to the induced voltages VbemfU, VbemfV, VbemfW induced in the stator windings 1U, 1V, 1W as shown in FIG. 19.

Specifically, as shown in FIG. 19, the stator voltage commands are set to (vu*, vv*, vw*)=(Vq*, −Vq*, 0) for the rotational position signals (CSU, CSV, CSW=1, 0, 1) in section (1). Also, when the rotational position signals (CSU, CSV, CSW)=(1, 0, 0) in section (2), the stator voltage commands are set to (vu*, vv*, vw*)=(Vq*, 0, −Vq*). For sections including and subsequent to section (3), see FIG. 19. This conduction method is called the 120-degree conduction-type rectangular wave drive.

When the driving method switching signal FDrv=1, the voltage command production means 2020 produces the stator voltage commands vu*, vv*, vw* ((k), (l), (m) of FIG. 19) of sinusoidal waveform to be applied to the stator windings 1U, 1V, 1W, respectively, based on the estimated rotational angle θ and the q-axis voltage command Vq*. The stator voltage commands vu*, vv*, vw* are sinusoidal in waveform, and have the phase thereof advanced by a predetermined angle θad from the induced voltages VbemfU, VbemfV, VbemfW induced in the stator windings 1U, 1V, 1W, with a crest value equal to the q-axis voltage command Vq*. Specifically, the stator voltage commands vu*, vv*, vw* are calculated from equations (12), (13) and (14) below.

$$vu^* \leftarrow Vq^* \times \sin(\theta + 30 \text{ degree} + \theta ad) \tag{12}$$

$$vv^* \leftarrow Vq^* \times \sin(\theta - 90 \text{ degree} + \theta ad) \tag{13}$$

$$vw^* \leftarrow Vq^* \times \sin(\theta - 210 \text{ degree} + \theta ad) \tag{14}$$

The drive means 2010 shown in FIG. 18 applies voltages expressed as the stator voltage commands vu*, vv*, vw* to the stator windings 1U, 1V, 1W.

Now, the operation of the drive means 2010 will be described in detail.

The power supply 12 is a power source for the drive means 2010 and the capacitor 13 smoothes the power supply 12.

Figure 20:
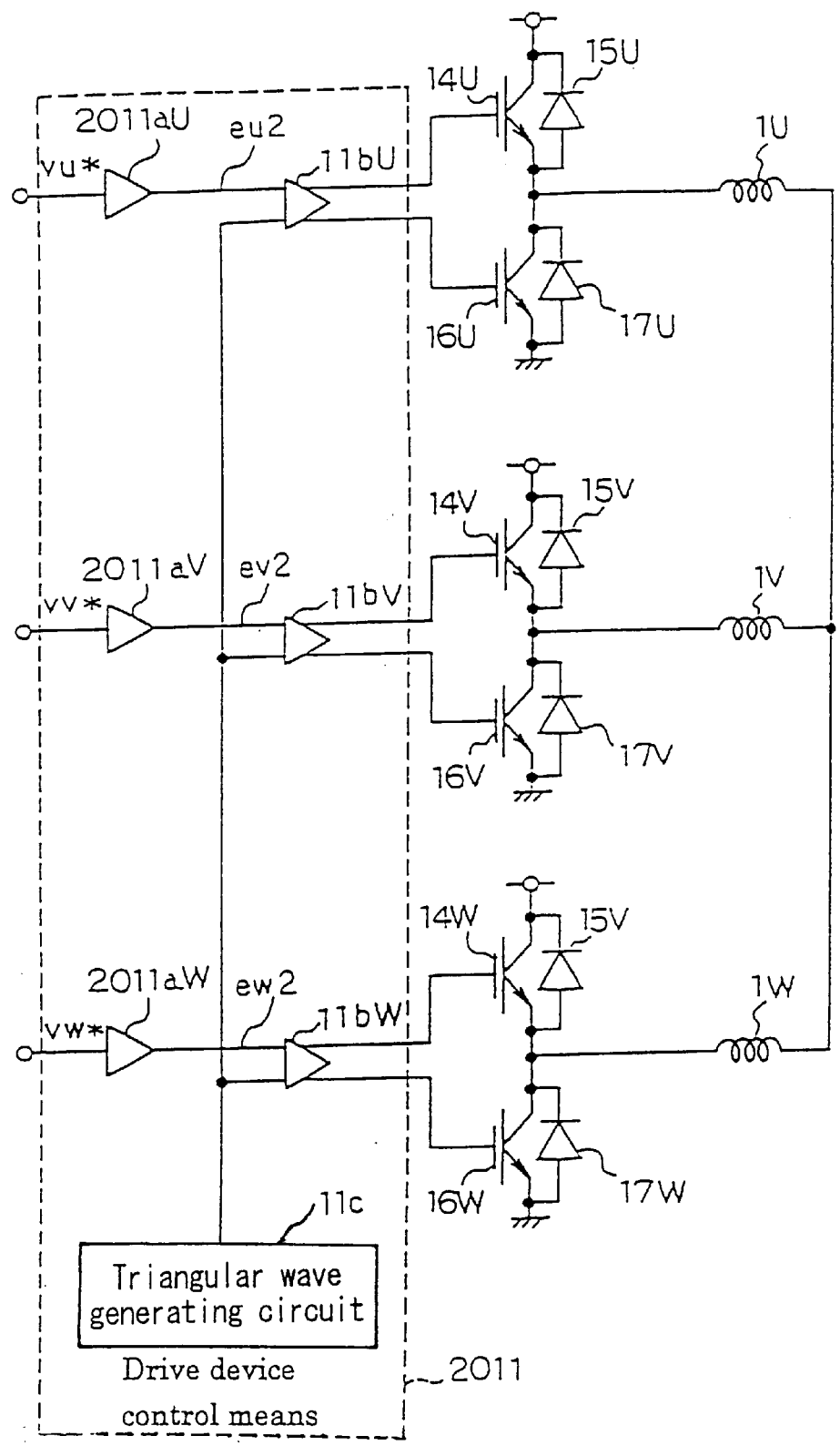
FIG. 20 is a diagram showing a circuit configuration of the drive device control means in embodiment 2.

FIG. 20 is a diagram showing a circuit configuration of the drive device control means 2011, etc. of the drive means 2010 in embodiment 2. The drive element control means 2011 includes amplifiers 2011aU, 2011aV, 2011aW, comparators 11bU, 11bV, 11bW and a triangular wave generating circuit 11c.

The amplifiers 2011aU, 2011aV, 2011bW, as seen from equations (15), (16), (17) below, produce the product of the stator voltage commands vu*, vv*, vw* and a set constant Ke2 as the PWM voltages eu2, ev2, ew2, respectively.

$$eu2 \leftarrow Ke2 \times vu^* \tag{15}$$

$$ev2 \leftarrow Ke2 \times vv^* \tag{16}$$

$$ew2 \leftarrow Ke2 \times vw^* \tag{17}$$

In equations (15), (16), (17), only the proportional operation is performed. As an alternative, however, the proportional integral operation, or the proportional plus integral plus derivative operation can be performed. Especially, in the case where the resolution of the stator voltage commands vu*, vv* vw* is so low that the waveform is stepped, the inclusion of the integral operation has the same effect as if smoothing the waveform of the stator voltage commands vu*, vv*, vw*.

The triangular wave generating circuit 11c generates a triangular wave (several kHz to several tens of kHz). The comparator 11bU compares the PWM voltage eu2 with the triangular wave. In the case where the PWM voltage eu2 is larger, the upper IGBT14U is energized and the lower IBGT16U is deenergized. In the case where the PWM voltage eu2 is smaller, on the other hand, the upper IBGT14U is deenergized and the lower IBGT16U is energized.

In the transition of the conduction state of both the upper IGBTs and the lower IGBTs, both the upper IGBTs and the lower IGBTs are deenergized, and a short transfer time (dead time) is provided for preventing the shorting of the drive power supply 12. A similar operation is performed for the remaining phases, too.

The operations of the estimated rotational angle control means 8, etc. of embodiment 2 are similar to those of the corresponding part in embodiment 1 described above and will not be described.

[Effects of Embodiment 2]

The above-mentioned embodiment 1 has such a configuration that the stator current commands iu*, iv*, iw* are supplied to the drive means 10. However, even in the case where the motor controller according to embodiment 2 is so configured that the stator voltage commands vu*, vv*, vw* are applied to the drive means 2010, the motor controller according to embodiment 2 has a similar effect to embodiment 1.

<<Embodiment 3>>

Next, a motor controller according to embodiment 3 of the present invention will be explained with reference to the accompanying drawings.

The embodiment 1 and the embodiment 2 described above refer to the case in which when the motor controller controls and rotates the brushless motor, the correction coefficient production means 51 is activated, and when the rotational speed of the brushless motor is comparatively high and the rotational speed is subjected to small fluctuations, the correction coefficient storage value StrCor and the absolute angle storage value StrθCss are produced.

In the motor controller according to embodiment 3, the brushless motor is rotated from outside, an interrupt signal (IntCor) for activating the correction coefficient production means 3051 is applied from an external source, and the correction coefficient storage value StrCor and the absolute angle storage value StrθCss are produced and stored in a nonvolatile memory. In the motor controller according to embodiment 3, even when restarted, an estimated rotational angle θ free of fluctuations is produced using the correction coefficient storage value StrCor and the absolute angle storage value StrθCss from the beginning, thus controlling the brushless motor without any torque ripple.

[General Configuration of Embodiment 3]

First, a general configuration of a motor controller according to embodiment 3 will be explained.

Figure 21:
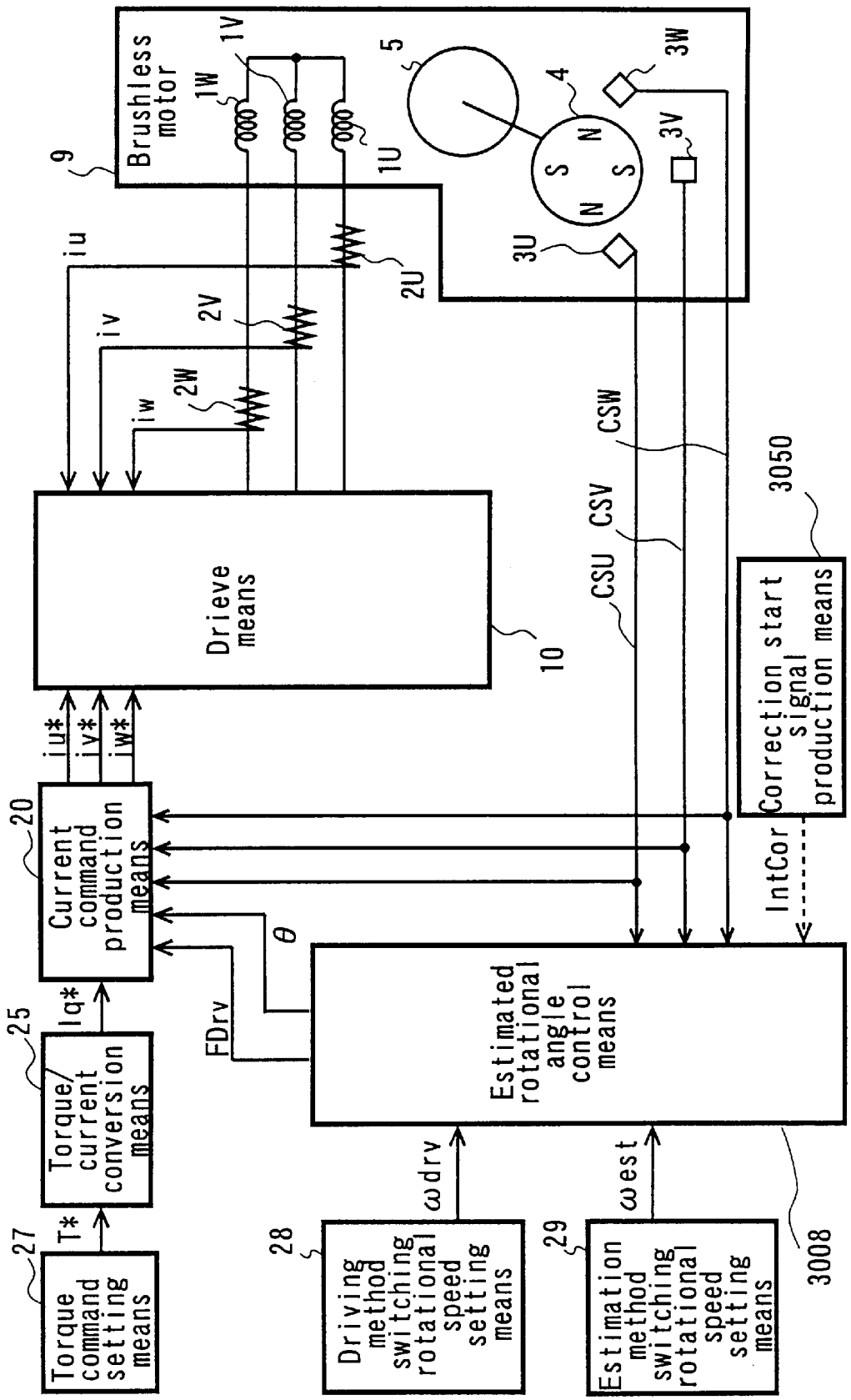
FIG. 21 is a block diagram showing a configuration of the motor controller in embodiment 3 of the present invention.
Figure 22:
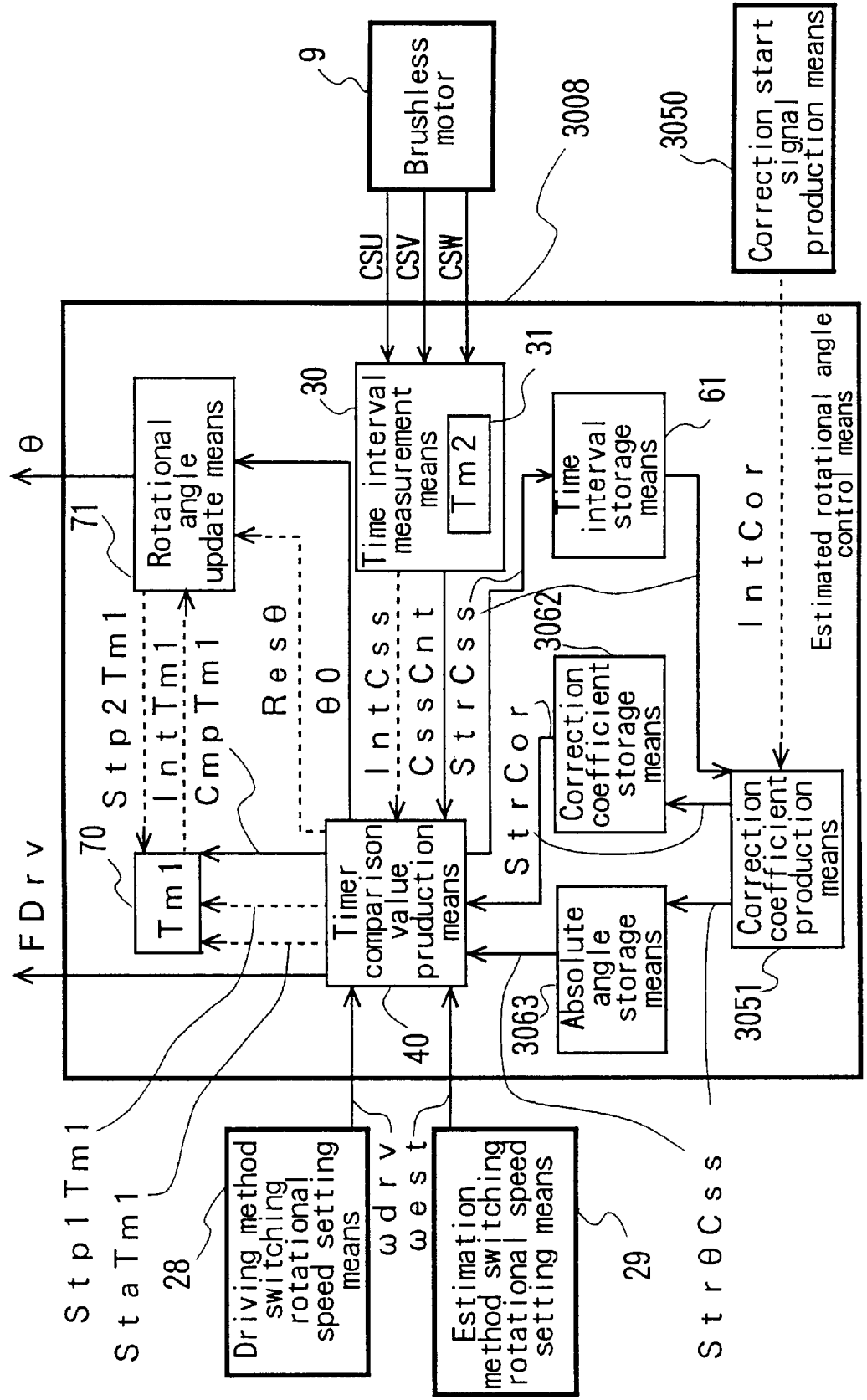
FIG. 22 is a block diagram showing a configuration of the estimated rotational angle control means of the motor controller in embodiment 3.

FIG. 21 is a block diagram showing a configuration of the motor controller according to embodiment 3. FIG. 22 is a block diagram showing a configuration of estimated rotational angle control means 3008, etc. of embodiment 3. In embodiment 3, the component parts having the same function and configuration as the corresponding ones in embodiment 1 described above will be designated by the same reference numerals, respectively, and will not be described.

The motor controller according to embodiment 3 has eliminated the third timer 50 for generating the third timer interrupt signal IntTm3 for activating the correction coefficient production means 51 of the estimated rotational angle control means 8 (FIG. 3), and instead, comprises correction start signal production means 3050 external to the estimated rotational angle control means 3008, wherein the correction start signal production means 3050 is configured to output a correction start interrupt signal IntCor to the correction coefficient production means 3051 in the estimated rotational angle control means 3008.

Also, the correction coefficient storage means 62 and the absolute angle storage means 63 in embodiment 1 use a RAM area. In the motor controller according to embodiment 3, however, the correction coefficient storage means 3062 and the absolute angle storage means 3063 of the estimated rotational angle control means 3008 (FIG. 22) use an area of a nonvolatile memory such as a flash memory or a PROM. Also, the motor controller according to embodiment 3 requires no initialization of the correction coefficient storage value StrCor and the absolute angle storage value StrθCss.

Further, in embodiment 1, the number NCss of interruptions per rotation is the number of interruptions of the rotational position signal interrupt signal IntCss per rotation in mechanical angle, and in the case of four magnetic poles, the number of interruptions per rotation is 12. In embodiment 3, in contrast, the number NCss of interruptions per rotation is the number of interruptions of the rotational position signal interrupt signal IntCss per rotation in electrical angle and 6.

The other configuration of embodiment 3 is similar to the corresponding configuration of embodiment 1 and will not be described.

[Operation of Embodiment 3]

Next, the operation of the motor controller according to embodiment 3 will be explained.

At the time of inspection before shipment, the brushless motor 9 is rotated by an external source. After the lapse of a sufficiently long time when the rotational speed of the brushless motor 9 becomes constant, the correction start signal production means 3050 outputs the correction start interrupt signal IntCor to the correction coefficient production means 3051. Thus, the correction coefficient production means 3051 is activated.

The correction coefficient production means 3051 is activated by the correction start interrupt signal IntCor, and produces the correction coefficient storage value StrCor and the absolute angle storage value StrθCss based on the time interval storage value StrCss.

In the embodiment 1 described above, the rotational speed and the fluctuation of the rotational speed of the brushless motor 9 are monitored. In embodiment 3, however, they are not monitored.

Figure 23:
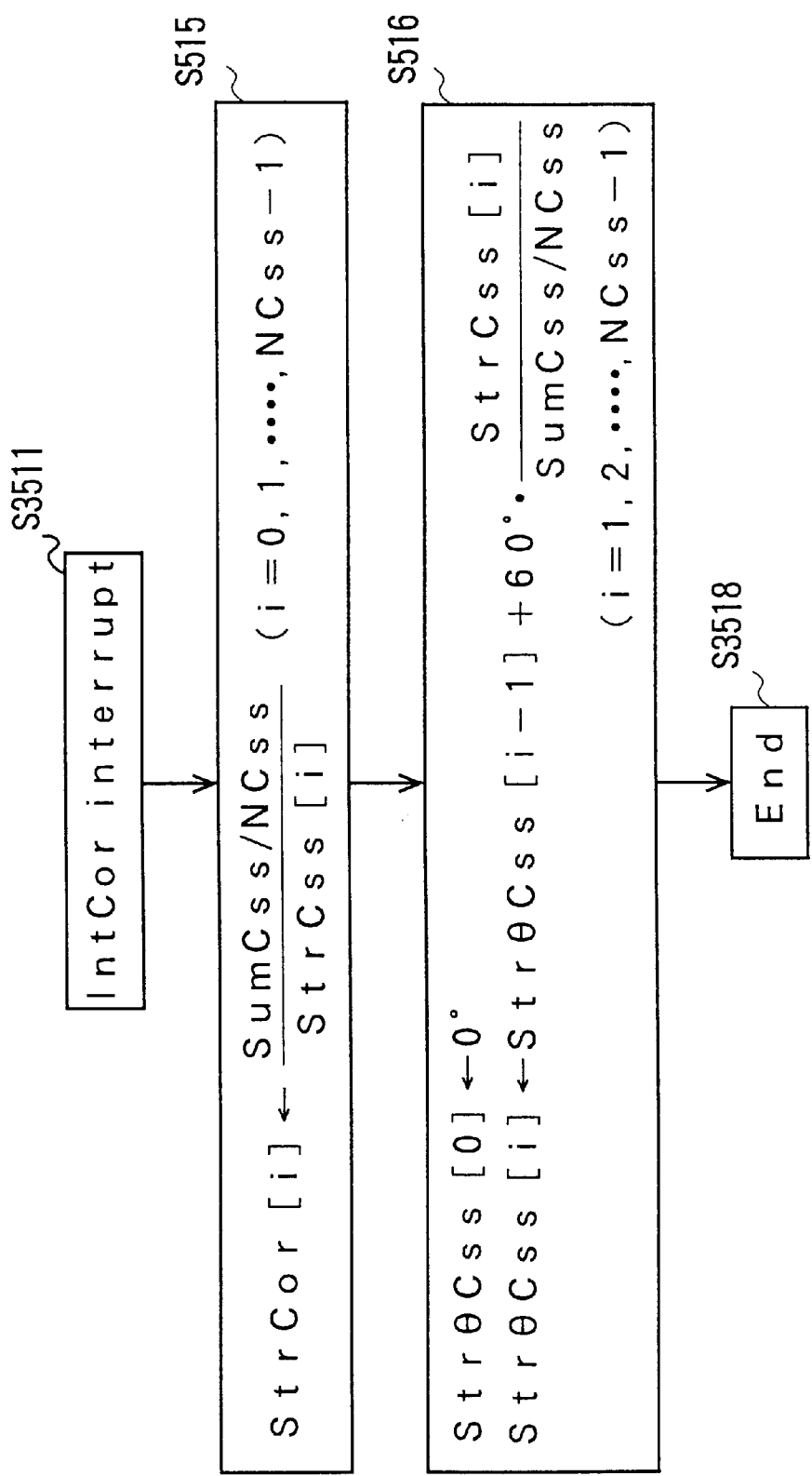
FIG. 23 is a flowchart showing the operation of the correction coefficient production means in embodiment 3.

Hereinafter, the operation of the correction coefficient production means 3051 will be explained in detail with reference to FIG. 23. FIG. 23 is a flowchart showing the operation of the correction coefficient production means 3051 in embodiment 3.

In step S3511, the correction coefficient production means 3051 is activated by the correction start interrupt signal IntCor.

In steps S515 and S516, the same operation is performed as that in steps S515 and S516 of the correction coefficient production means 51 shown in FIG. 13 of embodiment 1. Therefore, the operation of steps S515 and S516 will not be explained.

In step S3518, the operation of the correction coefficient production means S3051 is terminated.

The correction coefficient storage value StrCor and the absolute angle storage value StrθCss, which are stored in an area of a nonvolatile memory, are held also when the motor controller is not in operation. Thus, from the time of starting, the inaccuracy of the rotational position signals CSU, CSV, CSW can be corrected using the correction coefficient storage value StrCor and the absolute angle storage value StrθCss.

The remaining operation of embodiment 3 is similar to the corresponding operation of embodiment 1 described above and will not be described.

[Effects of Embodiment 3]

Next, the effects realized by the motor controller according to embodiment 3 will be explained.

The cause of the inaccuracy of the rotational position signals CSU, CSV, CSW is traced to the variations of the offset voltage and the mounting errors of the Hall ICs constituting the rotational position signal generators 3U, 3V, 3W and the variations in magnetization of the rotational position detecting disk 4. The variations attributable to the rotational position signal generators 3U, 3V, 3W constitute the drifts between the rotational position signals CSU and CSV, for example, or inaccuracy between the rotational position signals CSU, CSV, CSW. The drifts occur in each rotation in electrical angle.

The variations attributable to the rotational position detecting disk 4, on the other hand, constitute the inaccuracy of the rotational position signals CSU, CSV, CSW themselves such as the inaccuracy of the rotational position signal CSU. This inaccuracy occurs in each rotation in mechanical angle. In the case where the inaccuracy due to the rotational position signal generators 3U, 3V, 3W are larger than the inaccuracy due to the rotational position detecting disk 4, most components of the inaccuracy occur in one rotation in electrical angle. Therefore, a considerable effect is obtained by correcting each rotation in electrical angle instead of in mechanical angle.

In the case where the number of magnetic poles is four, the rotational position signal CSU rises twice per rotation in mechanical angle. When the motor controller is restarted, therefore, a specific rise cannot be recognized. As a result, even information on the inaccuracy per rotation in mechanical angle are stored, one-to-one correspondence wit rotational position is impossible.

In the case where the inaccuracy per rotation in electrical angle is considerable, however, the inaccuracy of the rotational position signals CSU, CSV, CSW can be corrected from the beginning of restarting, if the correction coefficient storage value StrCor and the absolute angle StrθCss are determined and stored in an area of a nonvolatile memory as in embodiment 3.

As described above, the correction coefficient production means 3051 produces the correction coefficient storage value StrCor and the absolute angle storage value StrθCss and stores them in a nonvolatile memory. As in embodiment 1 shown in FIGS. 10 and 11, the time interval CssCnt is corrected in step S402 of the timer comparison value production means 40, and the absolute angle storage value StrθCss is used as the absolute rotational angle θ0 in steps S406 and S407. In this way, the estimated rotational angle θ free of fluctuation is produced. As a result, according to embodiment 3, a motor controller capable of controlling the drive of the brushless motor with high accuracy without torque ripples can be realized.

It is also possible to produce a motor controller by combining the configurations of embodiments 1 and 3 described above. Also, a motor controller can be obtained by combining the configurations of embodiments 2 and 3. By configuring a motor controller in this way, the time interval of the motor controller can be corrected before shipment of the product. Also, a motor controller using current commands or voltage commands of high accuracy can be obtained, in which during the operation of the product, an output torque is generated while being constantly corrected.

<<Embodiment 4>>

Now, a motor controller according to embodiment 4 of the present invention will be explained with reference to the accompanying drawings.

In the motor controller according to embodiments 1, 2 and 3 described above, the current commands iu*, iv*, iw* of sinusoidal waveform or the voltage commands vu*, vv*, vw* of sinusoidal waveform are produced so that the stator currents iu, iv, iw of sinusoidal waveform flow in the stator windings 1U, 1V, 1W.

In embodiment 4, the current is controlled on a d-q axis providing a rotational coordinate system to realize stator currents iu, iv, iw of sinusoidal waveform. In the process, the d axis is the one representing a current component generating magnetic fluxes in the same direction as the magnetic fluxes generated from the permanent magnet of the rotor 4. The q axis, on the other hand, is the one crossing at right angles to the d axis.

In the embodiments 1, 2 and 3 described above, the frequency fck1 of the first timer 70 is multiplied by an integer multiple of the frequency fck2 of the second timer 31, and the estimated rotational angle θ is updated by θstep each time.

In embodiment 4, in contrast, the estimated rotational angle θ is determined by calculation for each current control period. The lead Δθ is calculated each time the rotational position interrupt signal IntCss is input, and the estimated rotational angle θ is advanced by the lead Δθ for each current control period.

Hereinafter, a motor controller according to embodiment 4 will be explained in detail

[General Configuration of Embodiment 4]

First, a general configuration of a motor controller according to embodiment 4 will be explained.

FIG. 24 is a block diagram showing a configuration of a motor controller according to embodiment 4. In FIG. 24, a brushless motor 9 according to embodiment 4 has the same configuration as that of embodiment 1 described above. Therefore, those component parts which are included in both embodiments will not be described below but should be referred to the description of embodiment 1.

The motor controller according to embodiment 4 comprises three setting means including torque command setting means 27 for outputting a torque command T*, driving method switching rotational speed setting means 28 for outputting a driving method switching rotational speed ωdrv and estimation method switching rotational speed setting means 29 for outputting an estimation method switching rotational speed ωest. Also, the motor controller according to embodiment 4 further comprises torque/dq-axis current conversion means 4025, current control means 4020, drive means 2010, estimated rotational angle lead production means 4008, and current sensors 2U, 2V for detecting the currents flowing in the stator windings 1U, 1V and outputting the stator current value signals iu, iv to the current control means 4020.

The estimated rotational angle lead production means 4008 is supplied with the rotational position signals CSU, CSV, CSW, the driving method switching rotational speed ωdrv, the estimation method switching rotational speed ωest the estimated rotational angle θ, and the timer value Tm4 on the fourth timer 4210 (FIG. 25), and outputs the driving method switching signal FDrv, the lead Δθ and the estimated rotational angle θ.

The torque/dq-axis current conversion means 4025 is supplied with the torque command T* of the torque command setting means 27 and outputs the d-axis current command Id* and the q-axis current command Iq*.

The current control means 4020, which is supplied with the rotational position signals CSU, CSV, CSW, the d-axis current command Id*, the q-axis current command Iq*, the driving method switching signal FDrv, the lead Δθ and the estimated rotational angle θ, outputs the stator voltage commands vu*, vv*, vw* to the drive means 2010 on the one hand and the estimated rotational angle θ and the timer value Tm4 on the timer 4210 (FIG. 25) to the estimated rotational angle lead production means 4008 on the other hand.

The drive means 2010 according to embodiment 4 is similar to the corresponding means of embodiment 2 and will not be described again.

Figure 25:
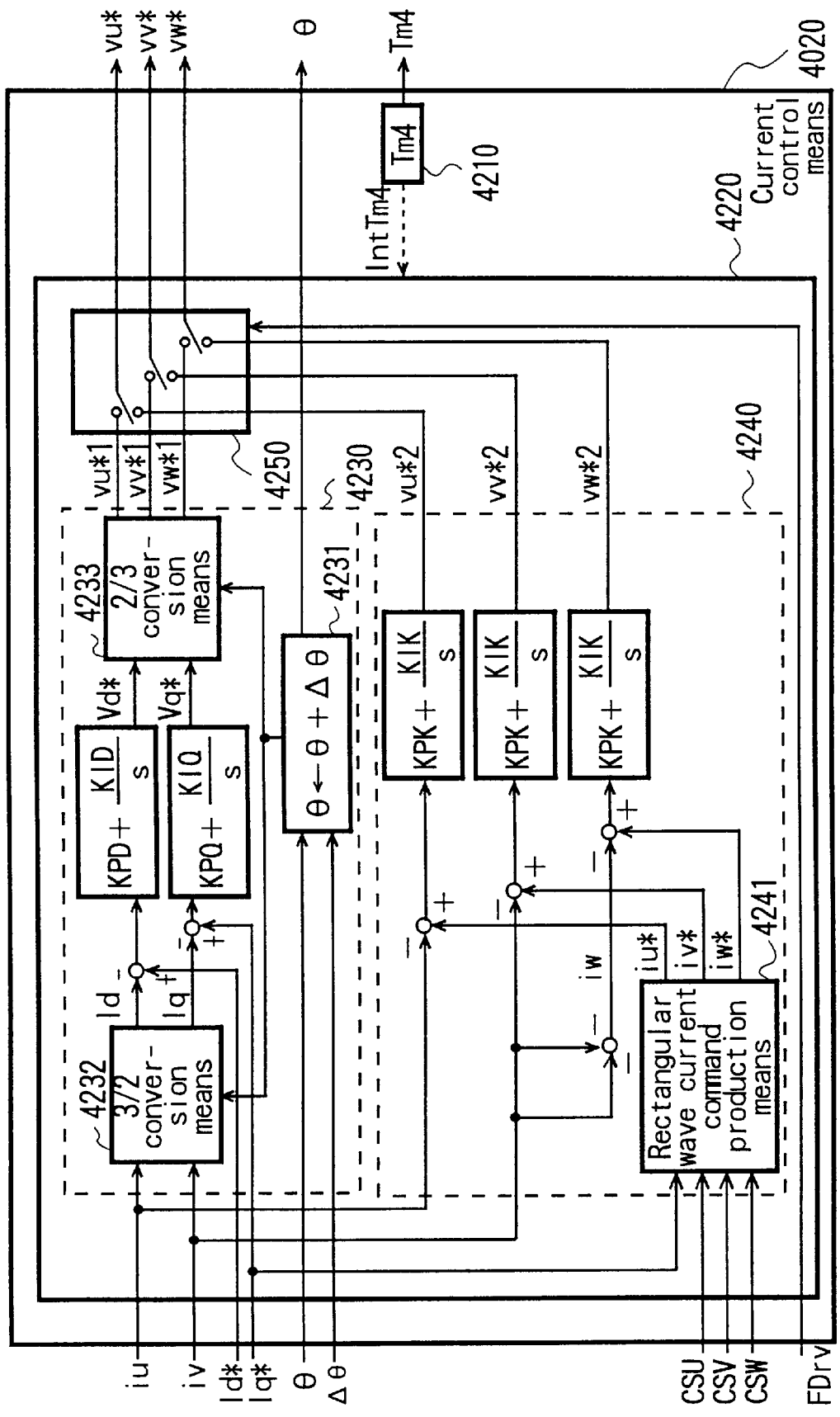
FIG. 25 is a block diagram showing a configuration of the current control means of the motor controller according to embodiment 4.

FIG. 25 is a block diagram showing a configuration of the current control means 4020 of the motor controller according to embodiment 4.

In FIG. 25, the current control means 4020 is comprised of a fourth timer 4210 and stator voltage command production means 4220.

The fourth timer 4210 outputs the fourth timer interrupt signal IntTm4 to the stator voltage command production means 4220 at arbitrarily set time intervals. Also, the fourth timer 4210 outputs the timer value Tm4 to the estimated rotational angle lead production means 4008.

The stator voltage command production means 4220 is activated by the fourth timer interrupt signal IntTm4, supplied the stator current values iu, iv, the d-axis current command Id*, the q-axis current command Iq*, the estimated rotational angle θ, the lead Δ74 , the rotational position signals CSU, CSV, CSW and the driving method switching signal FDrv, and outputs the stator voltage commands vu*, vv*, vw* and the estimated rotational angle θ. This stator voltage command production means 4220 includes sinusoidal wave-driven stator voltage command production means 4230, rectangular wave-driven stator voltage command production means 4240 and stator voltage command select means 4250.

The sinusoidal wave-driven stator voltage command production means 4230 is supplied with the stator current values iu, iv, the d-axis current command Id*, the q-axis current command Iq*, the estimated rotational angle θ and the lead Δθ, and outputs the sinusoidal wave-driven stator voltage commands vu*1, vv*1, vw*1 to the stator voltage command select means 4250, and the estimated rotational angle θ to the estimated rotational angle lead production means 4008.

The rectangular wave-driven stator voltage command production means 4240 is supplied with the stator current values iu, iv, the rotational position signals CSU, CSV, CSW and the q-axis current command Iq*, and outputs the rectangular wave-driven stator voltage commands vu*2, vv*2, vw*2 to the stator voltage command select means 4250.

The stator voltage command select means 4250 is supplied with the driving method switching signal FDrv, the sinusoidal wave-driven stator voltage commands vu*1, vv*1, vw*1 and the rectangular wave-driven stator voltage commands vu*2, vv*2, vw*2, and outputs the stator voltage commands vu*, vv*, vw* to the drive means 2010.

Figure 26:
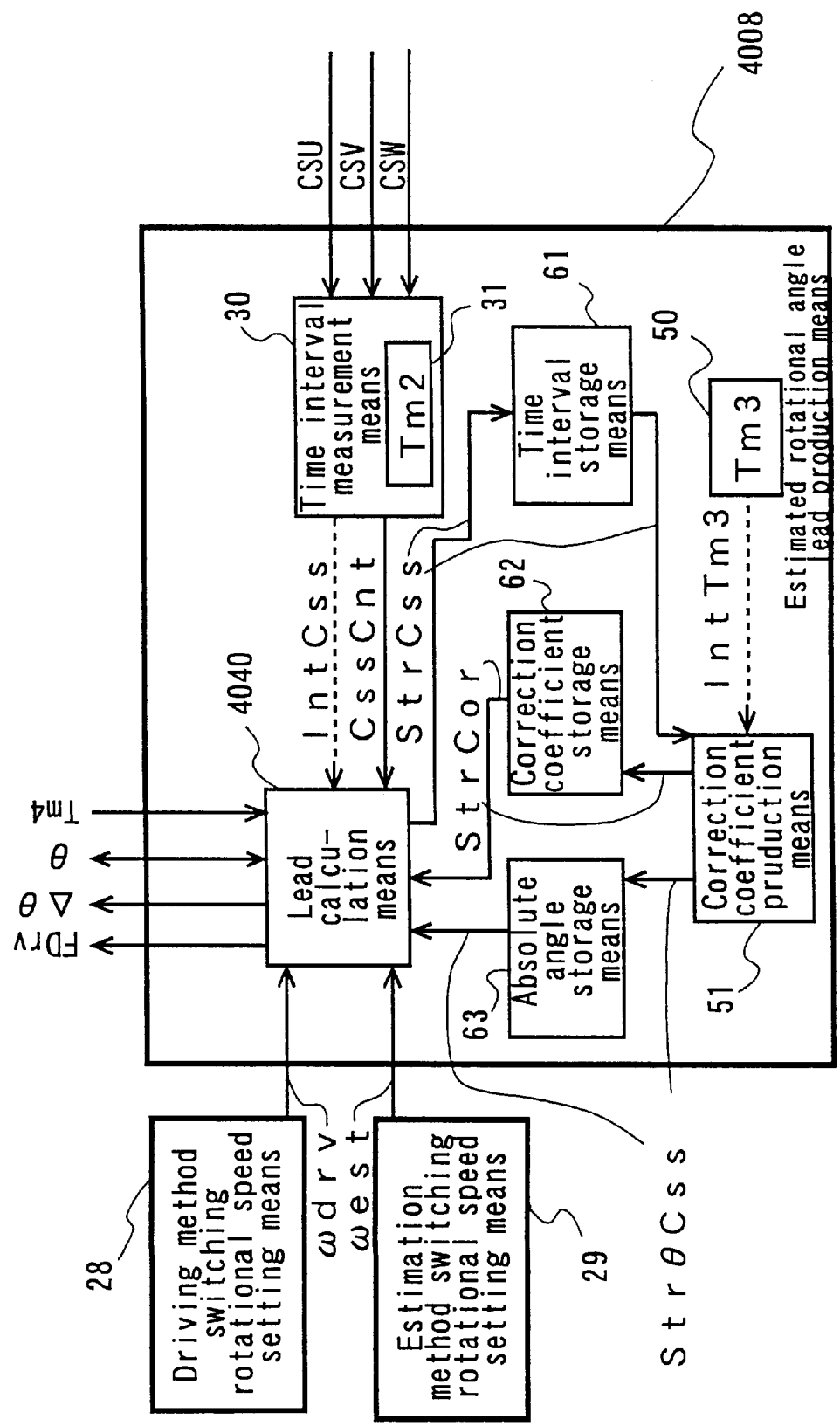
FIG. 26 is a block diagram showing a configuration of the estimated rotational angle lead production means for the motor controller in embodiment 4.

FIG. 26 is a block diagram showing a configuration of the estimated rotational angle lead production means 4008 of the motor controller according to embodiment 4.

In FIG. 26, the time interval measuring means 30 of the estimated rotational angle lead production means 4008, which includes the second timer 31, is supplied with the rotational position signals CSU, CSV, CSW and outputs the rotational position signal interrupt signal IntCss and the time interval CssCnt to the lead calculation means 4040.

The time interval storage means 61 stores the time interval storage value StrCss from the lead calculation means 4040. The third timer 50 outputs the third timer interrupt signal IntTm3 to the correction coefficient production means 51 at arbitrarily set time intervals. The correction coefficient production means 51, which is activated by the third timer interrupt signal IntTm3 of the third timer 50, is supplied with the time interval storage value StrCss and outputs the correction coefficient storage value StrCor and the absolute angle storage value StrθCss. The correction coefficient storage means 62 stores the correction coefficient storage value StrCor, and the absolute angle storage means 63 stores the absolute angle storage value StrθCss.

The lead calculation means 4040, which is activated by the rotational position signal interrupt signal IntCss, is supplied with the driving method switching rotational speed ωdrv, the estimation method switching rotational speed ωest the time interval CssCnt, the correction coefficient storage value StrCor, the absolute angle storage value StrθCss, the estimated rotational angle θ and the timer value Tm4 of the fourth timer 4210. The lead calculation means 4040 outputs the driving method switching signal FDrv, the lead Δθ, the estimated rotational angle θ and the time interval storage value StrCss.

[Detailed Operation of Embodiment 4]

Next, the general operation of the motor controller according to embodiment 4 will be explained.

With the rotation of the rotor 5, the rotational position detecting disk 4 connected to the rotor 5 rotates, and the magnetic fluxes interlinking with the rotational position signal generators 3U, 3V, 3W undergo a change. The rotational position signal generators 3U, 3V, 3W which are Hall ICs have the magnetic flux amount thereof amplified, and output the rotational position signals CSU, CSV, CSW, respectively, as shown in FIG. 7. In FIG. 7, the angle is the electrical angle and the rise point of the rotational position signal CSU is assumed to be 0 degree for convenience sake.

The brushless motor of embodiment 4 has four poles. Therefore, the mechanical angle of 180 degree corresponds to the electrical angle of 360 degree. (electrical angle= mechanical angle×(number of magnetic poles/2) In embodiment 4, the rotational position signal generators 3U, 3V, 3W are arranged 120 degree electrical angle apart from each other, and therefore the rotational position signals CSU, CSV, CSW are shifted by 120 degree electrical angle respectively. Also, the rotational position signal generators 3U, 3V, 3W are arranged in such a manner that the zero-crossing points of the rotational position signals CSU, CSV, CSW lag 30 degree behind the induced voltages VbemfU, VbemfV, VbemfW, respectively, induced in the stator windings 1U, 1V, 1W.

The driving method switching rotational speed setting means 28 sets the driving method switching rotational speed ωdrv, and outputs the driving method switching rotational speed ωdrv to the estimated rotational angle lead production means 4008.

The estimation method switching rotational speed setting means 29 sets the estimation method switching rotational speed ωest and outputs the estimation method switching rotational speed ωest to the estimated rotational angle lead production means 4008.

The estimated rotational angle lead production means 4008 outputs the driving method switching signal FDrv, the lead Δθ, the estimated rotational angle θ and the time interval storage value StrCss based on the rotational position signals CSU, CSV, CSW, the driving method switching rotational speed ωdrv, the estimation method switching rotational speed ωest, the correction coefficient storage value StrCor, the absolute angle storage value StrθCss, the estimated rotational angle θ and the timer value Tm4 of the fourth timer 4210, by the method described later.

The torque command setting means 27 sets the torque command T*, and outputs it to the torque/dq-axis current conversion means 4025.

The torque/dq-axis current conversion means 4025 sets the d-axis current command Id* to zero, as shown in equation (18) below. Also, as in equation (2) of embodiment 1 described above, the q-axis current command Iq* is produced based on the torque command T*.

$$Id^* \leftarrow 0 \tag{18}$$

Next, an explanation will be given of the operation of the current control means 4020 shown in FIG. 25.

The current control means 4020 controls the stator voltage commands vu*, vv*, vw* to supply a predetermined current to the stator windings 1U, 1V, 1W. When the driving method switching signal FDrv is at low level (FDrv=0), the stator current commands iu*, iv*, iw* of rectangular waveform are produced, and a current of rectangular waveform is supplied to the stator windings 1U, 1V, 1W. When the driving method switching signal FDrv is at high level (FDrv=1), on the other hand, the d-axis current Id and the q-axis current are controlled to become the d-axis current command Id* and the q-axis current command Iq*, respectively, and a current of sinusoidal waveform is supplied to the stator windings 1U, 1V, 1W, respectively.

Hereinafter, an explanation will be given of the detailed operation of the current control means 4020 according to embodiment 4.

Figure 27:
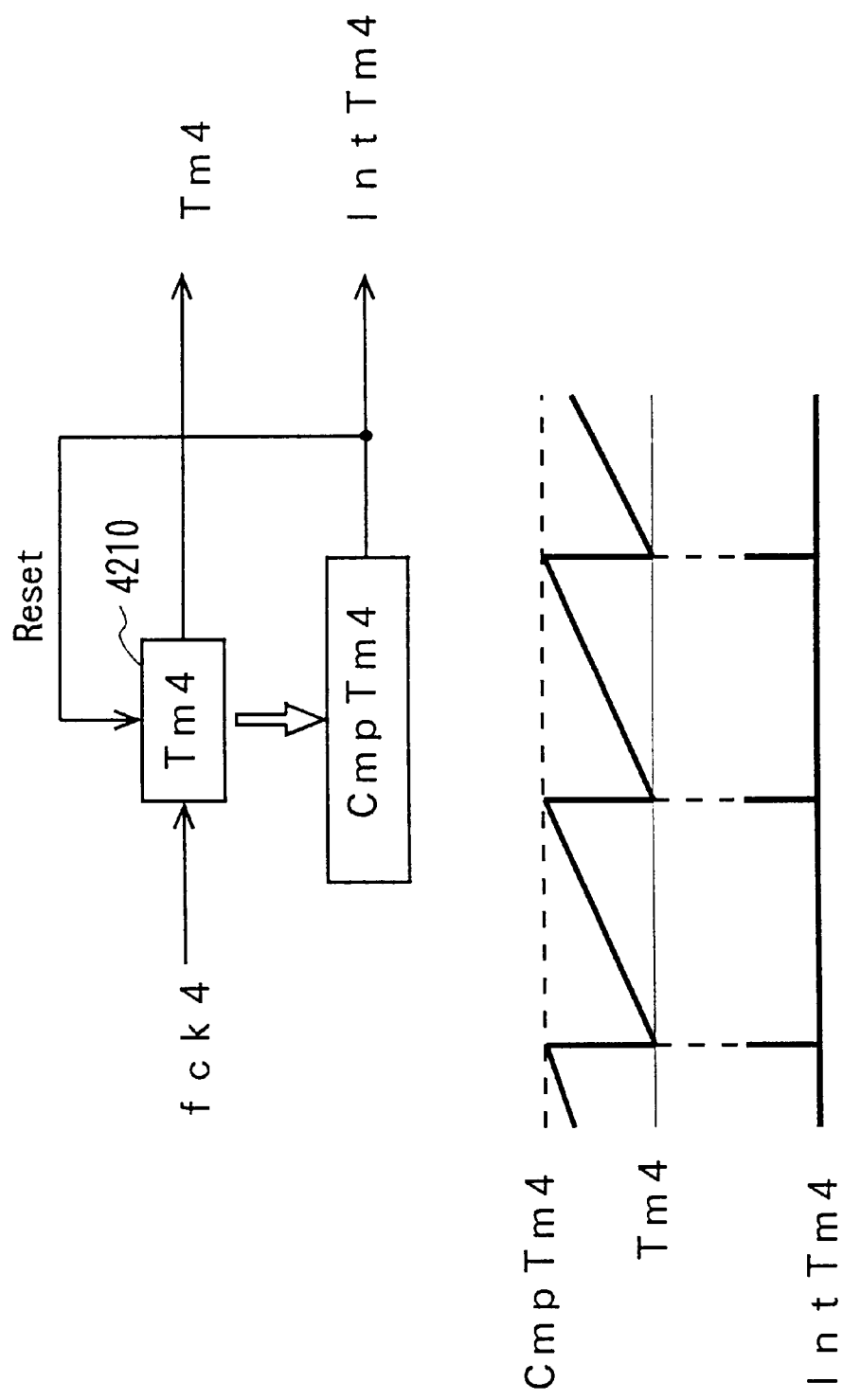
FIG. 27 is a schematic diagram showing the operation of a fourth timer in embodiment 4.

FIG. 27 is a diagram for explaining the operation of the fourth timer 4210 of the current control means 4020 in embodiment 4.

As shown in FIG. 27, the fourth timer 4210 counts up at the frequency fck4. When the timer value Tm4 becomes equal to an arbitrarily set value CmpTm4, the fourth timer 4210 outputs the fourth timer interrupt signal IntTm4, resets the timer value Tm4 to zero and counts up again.

The stator voltage command production means 4220 is activated by the fourth timer interrupt signal IntTm4.

The rectangular wave-driven stator voltage command production means 4240 produces the stator voltage commands (rectangular wave-driven stator voltage commands) vu*2, vv*2, vw*2 used for drive with a rectangular wave. This will be explained in detail.

The rectangular wave current command production means 4241 produces the stator current commands iu*, iv*, iw* of rectangular waveform shown in (h), (i) and (j) of FIG. 7 based on the rotational position signals CSU, CSV, CSW and the q-axis current command Iq*. The stator current commands iu*, iv*, iw* of rectangular waveform, which have a conduction section of 120 degree and a crest value equal to the q-axis current command Iq*, are related to the induced voltages VbemfU, VbemfV, VbemfW induced in the stator windings 1U, 1V, 1W as shown in FIG. 7.

As shown in FIG. 7, when the rotational position signals (CSU, CSV, CSW)=(1, 0, 1) in section (1), assume that the stator current commands of rectangular waveform (iu*, iv*, iw*)=(Iq*, −Iq*, 0). Also, when the rotational position signals (CSU, CSV, CSW)=(1, 0, 0) in section (2), assume that the stator current commands of rectangular waveform (iu*, iv*, iw*)=(Iq*, 0, −Iq*). The situation for the sections including and subsequent to section (3) is as shown in FIG. 7. This conduction method is called the 120 degree conduction type rectangular wave drive.

As shown in equation (19) below, the stator current command iu* less the stator current iu, subjected to proportional integral operation with a proportionality gain of KPK and an integration gain of KIK, is assumed to be a rectangular wave-driven stator current command vu*2. Also for V phase, equation (20) shown below applies similarly. For W phase, on the other hand, as shown by equation (21) below, the sum of the stator currents iu and iv is changed in sign, and used as the stator current iw for W phase.

$$vu^*2 \leftarrow (KPK+KIK/s) \times (iu^*-iu) \tag{19}$$

$$vv^*2 \leftarrow (KPK+KIK/s) \times (iv^*-iv) \tag{20}$$

$$vw^*2 \leftarrow (KPK+KIK/s) \times (iw^*-\{-(iu+iv)\}) \tag{21}$$

In embodiment 4, s is the Laplace operator, and 1/s indicates integration.

The sinusoidal wave-driven stator voltage command production means 4230 produces the stator voltage commands (sinusoidal wave-driven stator voltage commands) vu*1, vv*1, vw*1 used for drive with a sinusoidal wave.

Hereinafter, the sinusoidal wave-driven stator voltage command production means 4230 in embodiment 4 will be explained in detail.

The estimated rotational angle control means 4231 adds the lead Δθ to the estimated rotational angle θ as a new estimated rotational angle θ.

The 3/2 conversion means 4232, as shown in equations (22), (23) below, produces the d-axis current Id and the q-axis current Iq based on the stator currents iu, iv and the estimated rotational angle θ. In the process, the q-axis current Iq is a component of the currents flowing in the stator windings 1U, 1V, 1W which is in phase with the counter electromotive voltages VbemfU, VbemfV, VbemfW. Also, the d-axis current Id is defined as a component 90 degree lagging in phase behind the q-axis current.

$$Id \leftarrow \{iu \times \sin(\theta-90 \text{ degree})-iv \times \sin(\theta+30 \text{ degree})\} \times 2/\sqrt{\sqrt{3}} \tag{22}$$

$$Iq \leftarrow \{iv \times \cos(\theta-90 \text{ degree})-iv \times \cos(\theta+30 \text{ degree})\} \times 2/\sqrt{\sqrt{3}} \tag{23}$$

As shown in equation (24) below, the d-axis current command Id* less the d-axis current Id, subjected to proportional integral operation with a the proportionality gain KPD and a integral gain KID, is assumed to be the d-axis voltage command Vd*. Similarly, the q-axis current command Iq* less the q-axis current Iq, subjected to proportional integral operation with a proportionality gain KPQ and an integral gain KIQ, is assumed to be the q-axis voltage command Vq*.

$$Vd^* \leftarrow (KPD+KID/s) \times (Id^*-Id) \tag{24}$$

$$Vq^* \leftarrow (KPQ+KIQ/s) \times (Iq^*-Iq) \tag{25}$$

The 2/3 conversion means 4233, as shown in equations (26), (27), (28) below, produces the sinusoidal wave-driven stator voltage commands vu*, vv*, vw* based on the d-axis voltage command Vd*, the q-axis voltage command Vq* and the estimated rotational angle θ.

$$vu^* \leftarrow -Vd^* \times \cos(\theta+30 \text{ degree})+Vq^* \times \sin(\theta+30 \text{ degree}) \tag{26}$$

$$vv^* \leftarrow -Vd^* \times \cos(\theta-90 \text{ degree})+Vq^* \times \sin(\theta-90 \text{ degree}) \tag{27}$$

$$vw^* \leftarrow -Vd^* \times \cos(\theta-210 \text{ degree})+Vq^* \times \sin(\theta-210 \text{ degree}) \tag{28}$$

For the drive with a rectangular wave with the drive switching signal FDrv=0, the stator voltage command select means 4250 sets the rectangular wave-driven stator voltage commands vu*2, vv*2, vw*2 as the stator voltage commands vu*, vv*, vw*, respectively. For the drive with a sinusoidal wave with the drive switching signal FDrv=1, on the other hand, the sinusoidal wave-driven stator voltage commands vu*1, vv*1, vw*1 are set as the stator voltage commands vu*, vv*, vw*, respectively.

The drive means 2010 for supplying appropriate power to the stator windings 1U, 1V, 1W in embodiment 4 is similar to the corresponding part of embodiment 2 described above and therefore will not be explained again.

[Operation of Estimated Rotational Angle Lead Production Means 4008]

Next, an explanation will be given of the operation of the estimated rotational angle lead production means 4008 shown in FIG. 26.

The operation of the time interval measuring means 30, the third timer 50, the correction coefficient production means 51, the time interval storage means 61, the correction coefficient storage means 62 and the absolute angle storage means 63 are similar to those of the corresponding parts of embodiment 1 described above and therefore will not be described again.

Figure 28:
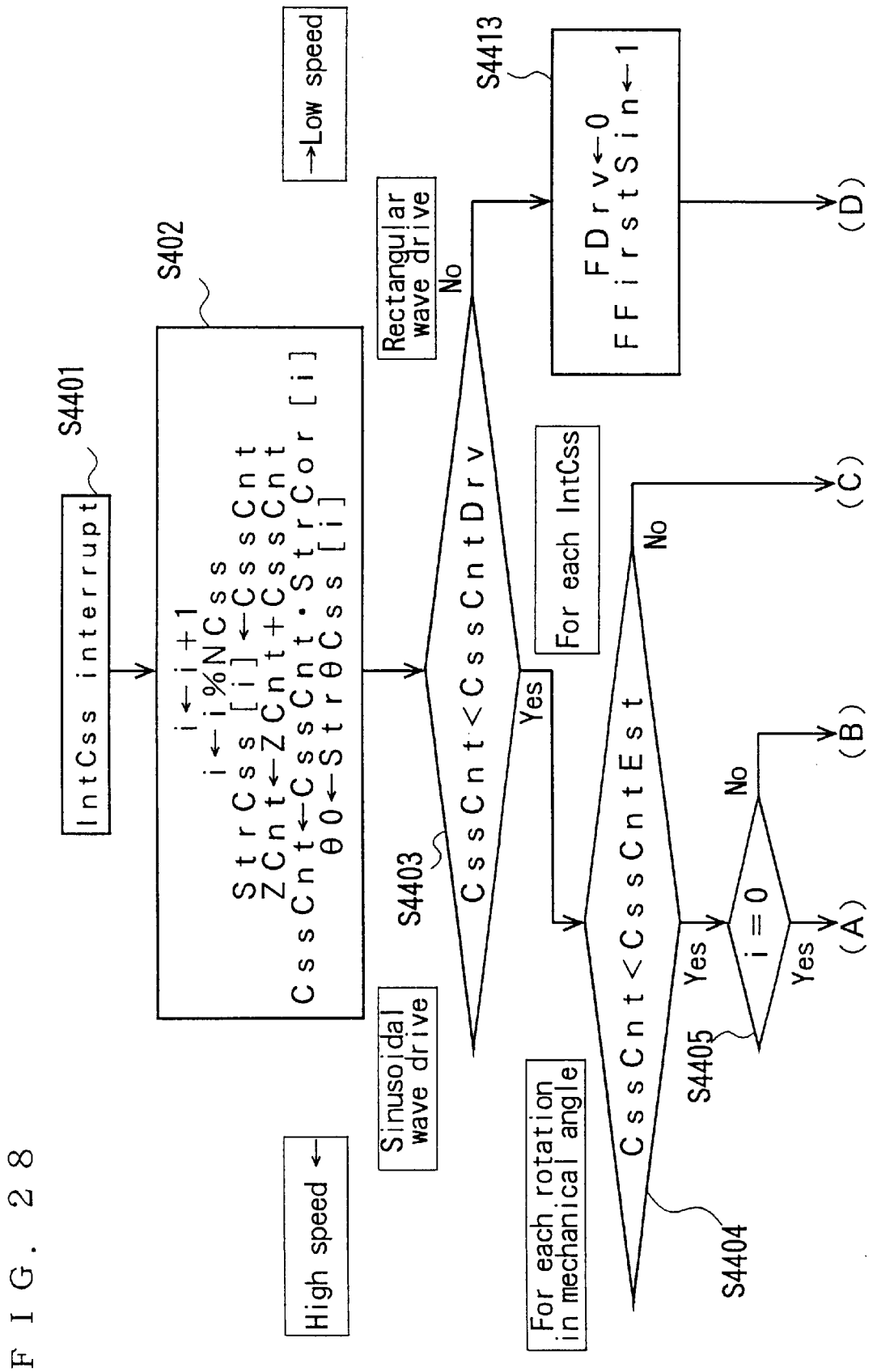
FIG. 28 is a flowchart showing the operation of the lead calculation means in embodiment 4.
Figure 29:
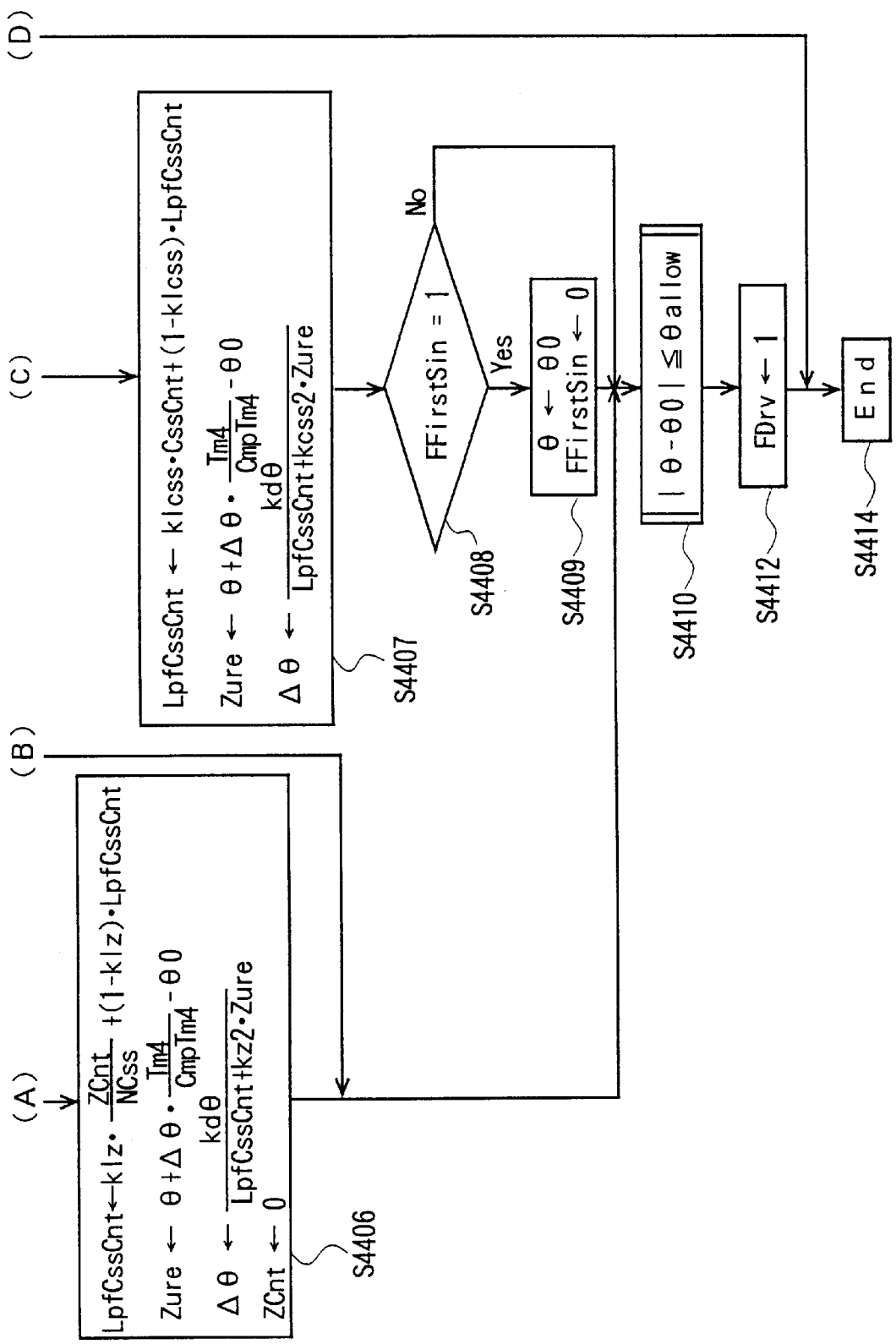
FIG. 29 is a flowchart showing the operation of the lead calculation means in embodiment 4.

FIGS. 28 and 29 are flowcharts showing the operation of the lead calculation means 4040 of the estimated rotational angle lead production means 4008 according to embodiment 4. The lead calculation means 4040 is activated by the rotational position signal interrupt signal IntCss and performs the operation as shown in FIGS. 28 and 29.

As shown in FIG. 26, the lead calculation means 4040 is supplied with the time interval CssCnt, the driving method switching rotational speed ωdrv, the estimation method switching rotational speed ωest, the correction coefficient storage value StrCor, the absolute angle storage value StrθCss, the estimated rotational angle θ and the timer value Tm4 on the fourth timer 4210. Based on these values, the lead calculation means 4040 outputs the time interval storage value StrCss stored in the time interval storage means 61 and used in the correction coefficient production means 51. Also, the lead calculation means 4040 produces and outputs the driving method switching signal FDrv, the lead Δθ and the estimated rotational angle θ for controlling the current control means 4020.

Next, the operation of the lead calculation means 4040 of embodiment 4 will be explained with reference to the flowcharts of FIGS. 28 and 29.

In step S4401, the lead calculation means 4040 is activated by the interruption of the rotational position signal interrupt signal IntCss.

The operation of step S402 is similar to that of embodiment 1 and will not be described.

In step S4403, the time interval CssCnt and the driving method switching time interval CssCntDrv are compared with each other. The driving method switching time interval CssCntDrv is the time interval for the rotational speed of the brushless motor equal to the driving method switching rotational speed ωdrv, and is calculated from the driving method switching rotational speed ωdrv. In the case where the time interval CssCnt is smaller than the driving method switching time interval CssCntDrv in step S4403, the process proceeds to step S4404. In the case where the time interval CssCnt is not smaller than the driving method switching time interval CssCntDrv, on the other hand, the process proceeds to step S4413.

The operation of step S4404 and subsequent steps in the flowcharts, therefore, is performed when the rotational speed of the brushless motor is higher than the driving method switching rotational speed ωdrv as a drive with a sinusoidal wave according to the estimated rotational angle θ. The operation of step S4413 and subsequent steps, on the other hand, is performed when the rotational speed of the brushless motor is smaller than the driving method switching rotational speed ωdrv as a 120-degree conduction type rectangular wave drive based on the rotational position signals CSU, CSV, CSW.

In step S4404, the time interval CssCnt is compared with the estimation method switching time interval CssCntEst. The estimation method switching time interval CssCntEst is the time interval associated with the rotational speed of the brushless motor equal to the estimation method switching rotational speed of ωest and is calculated from the estimation method switching rotational speed ωest. In the case where the time interval CssCnt is smaller than the estimation method switching time interval CssCntEst in step 4404, the process proceeds to step S4405. In the case where the time interval CssCnt is not smaller than the estimation method switching time interval CssCntEst, on the other hand, the process proceeds to step S4407 in FIG. 29.

The operation of step S4405 and subsequent steps, therefore, is performed when the rotational speed of the brushless motor is higher than the estimation method switching rotational speed ωest, in which case the lead Δθ is produced for each rotation in mechanical angle. The operation of step S4407 and subsequent steps, on the other hand, is performed when the rotational speed of the brushless motor is smaller than the estimation method switching rotational speed ωest, in which case the lead Δθ is produced for each rotational position interrupt IntCss.

In step S4405, i and 0 are compared with each other, and when they are equal to each other, the process proceeds to step S4406 in FIG. 29. In the case where i and 0 are not equal to each other, on the other hand, the process proceeds to step S4410 in FIG. 29.

When the operation of step S4406 is performed, therefore, at a specific one of the rises of the rotational position signal CSU and is performed only once per rotation in mechanical angle.

In step S4406, as shown in equation (30) below, the time interval total ZCnt is divided by the number NCss of interrupts per rotation, and the resulting value is applied through a first order digital LPF (low-pass filter) to produce a post-LPF time interval LpfCssCnt.

In the process, klz designates a coefficient of the low-pass filter set to a given value between 0 and 1. The smaller the value klz, the larger the effect of LPF. Also, the time interval total ZCnt divided by the number NCss of interrupts per rotation is the mean of the time intervals per rotation in mechanical angle, which uses the average value of the time interval instead of applying individual time intervals CssCnt through the LPF.

$$LpfCssCnt \leftarrow klz \cdot Zcnt/NCss + (1-klz) \cdot LpfCssCnt \quad (30)$$

In step S4406, the deviation Zure is calculated in the manner shown in equation (31) below. In the estimated rotational angle control means 4231 of the current control means 4020 (FIG. 25), the estimated rotational angle θ is advanced by the lead Δθ for each current control period (each time the fourth timer interrupt signal IntTm4 is generated). Due to the lapse of time from the last time of current control (the time when the last fourth timer interrupt signal IntTm4 is input) to the time when the rotational position signal interrupt signal IntCss is input and the lead calculation means 4040 (FIG. 26) is activated, the use of the estimated rotational angle θ as it is would cause an error in the evaluation of the deviation Zure.

For this reason, the product of the ratio between the timer value Tm4 of the fourth timer 4210 and the setting CmpTm4 times the lead Δθ, plus the estimated rotational angle θ (θ+Δθ·Tm4/CmpTm4) constitutes the rotational angle estimated at the particular time point. Therefore, the deviation Zure is this sum less the absolute rotational angle θ0. The lead Δθ used in equation (31) is determined when the preceding rotational position signal interrupt signal IntCss is inputted.

$$Zure \leftarrow \theta + \Delta\theta \cdot Tm4/CmpTm4 - \theta 0 \qquad (31)$$

In step S4406, the lead Δθ is calculated in the manner shown in equation (32) below.

Consider the case in which the rotational position signal interrupt signal IntCss is input ideally at intervals of 60 degree. The time required for the rotor 5 to advance by 60 degree in electrical angle is the time interval CssCnt divided by the frequency fck2 (CssCnt/fck2). On the other hand, the current control period (the period at which the fourth timer interrupt signal IntTm4 is input) is the setting CmpTm4 divided by the frequency fck4 (CmpTm4/fck4).

Therefore, the lead Δθ is the ratio of the latter time to the former time, multiplied by 60 degree (60 degree·CmpTm4/fck4)/(CssCnt/fck1)). If 60 degree·CmpTm4·fck1/fck4 is defined as kdθ, the lead Δθ is expressed as Δθ=kdθ/CssCnt.

In embodiment 4, the deviation correction kz2·Zure is added to the time interval CssCnt to correct the deviation. When the estimated rotational angle θ leads the absolute rotational angle θ0, the deviation Zure becomes positive. In such a case, the lead Δθ is corrected downward. In the case where the estimated rotational angle θ lags behind the absolute rotational angle θ0, on the other hand, the deviation Zure is negative. In such a case, the lead Δθ is corrected upward. In this case, kz2 designates a deviation correction gain for producing the lead Δθ once per rotation in mechanical angle. Also, the deviation Zure is proportional to α in equation (1) described in [Brief description of the operation of embodiment 1].

Further, in embodiment 4, the time interval CssCnt is not used as it is, but applied through the first order digital LPF (low-pass filter) and used as the post-LPF time interval LpfCssCnt.

$$\Delta\theta \leftarrow kd\theta/(LpfCssCnt + kz2 \cdot Zure) \qquad (32)$$

In step S4406, 0 is substituted into the time interval total ZCnt and the time interval total Zcnt is reset to 0.

In step S4407, as shown in equation (33) below, the time interval CssCnt applied through a first order digital LPF (low-pass filter) is used as a post-LPF time interval LpfCssCnt. In this equation, klcss is a coefficient of the low-pass filter set to an arbitrary value set between 0 and 1.

$$LpfCssCnt \leftarrow klcss \cdot CssCnt + (1 - klcss) \cdot LpfCssCnt \qquad (33)$$

In step S4407, as shown in equation (31), the deviation Zure is calculated.

In step S4407, as shown in equation (34) below, the lead Δθ is calculated.

In embodiment 4, the deviation is corrected by adding kcss2·Zure to the time interval CssCnt. When the estimated rotational angle θ leads the absolute rotational angle θ0, the deviation Zure is positive. In such a case, the lead Δθ is corrected downward. In the case where the estimated rotational angle θ lags behind the absolute rotational angle θ0, on the other hand, the deviation Zure is negative. In such a case, the lead Δθ is corrected upward. kcss2 designates a deviation correction gain for producing the lead Δθ each time of application of the rotational position interrupt signal IntCss, and the deviation Zure is proportional to α in equation (1) described in [Brief description of the operation of embodiment 1].

Further, in embodiment 4, the time interval CssCnt is not used as it is, but applied through the primary digital LPF and used as the post-LPF time interval LpfCssCnt.

$$\Delta\theta \leftarrow kd\theta/(LpfCssCnt + kcss2 \cdot Zure) \qquad (34)$$

In step S4408, the sinusoidal wave drive decision flag FFirstSin is compared with 1. When the sinusoidal wave drive decision flag FFirstSin is equal to 1, the process proceeds to step S4409. In the case where the sinusoidal wave drive decision flag FFirstSin is not equal to 1, on the other hand, the process proceeds to step S4410. In step S4409, the absolute rotational angle θ0 is substituted into the estimated rotational angle θ, and 0 is substituted into the sinusoidal wave drive decision flag FFirstSin.

When the drive with a rectangular wave switches to the drive with a sinusoidal wave, the estimated rotational angle θ is not determined. As a result, when the drive with a rectangular wave switches to the drive with a sinusoidal wave, it is necessary to set the estimated rotational angle θ to a correct value. For this purpose, steps S4408, S4409 and S4413 decide that the rectangular wave drive has switched to the sinusoidal wave drive using the sinusoidal wave decision flag FFirstSin, and substitutes the absolute rotational angle θ0 into the estimated rotational angle θ.

In step S4410, the estimated rotational angle θ is limited as shown in equations (34) to (36) below. In the case where the estimated rotational angle θ less the absolute rotational angle θ0 is smaller than −θallow as shown in equation (34), the absolute rotational angle 0 less θallow is used as the estimated rotational angle θ.

When the estimated rotational angle θ less the absolute rotational angle θ0 is larger than θallow as shown in equation (36), on the other hand, the sum of the absolute rotational angle θ0 and θallow is used as the estimated rotational angle θ. Under other than the above-mentioned conditions, the estimated rotational angle θ is not limited (equation (35)). In these equations, θallow is a setting of an arbitrary value representing a limit margin.

$$\theta = \theta 0 - \theta allow \quad (\text{when } (\theta - \theta 0) < -\theta allow) \qquad (34)$$

$$\theta = \theta \quad (\text{when } -\theta allow \leq (\theta - \theta 0) < \theta allow) \qquad (35)$$

$$\theta = \theta 0 + \theta allow \quad (\text{when } (\theta - \theta 0) \geq \theta allow) \qquad (36)$$

In step S4412, 1 is substituted into the drive method switching signal FDrv. The driving method switching signal FDrv is set to 1 (high level), and the drive with a sinusoidal wave using the estimated rotational angle θ is notified to the current control means 4020.

In step S4413, on the other hand, 0 is substituted into the driving method switching signal FDrv. The driving method switching signal FDrv is set to 0 (low level), and the 120-degree conduction type rectangular wave drive using the rotational position signals CSU, CSV, CSW is notified to the current control means 4020. Then, 1 is substituted into the sinusoidal wave drive decision flag FFirstSin.

In step S4414, the operation of the lead production means 4040 is completed.

[Effects of Embodiment 4]

Next, the effects realized by the motor controller according to embodiment 4 will be explained.

In the conventional motor controller, the problem caused by the 120-degree conduction type rectangular wave drive using the rotational position signals CSU, CSV, CSW is that the stator currents iu, iv, iw are distorted, the fluctuation of the output torque is increased, and the vibrations and noises of the motor are increased.

In view of this, in the motor controller according to embodiment 4, the lead Δθ is produced each time the rotational position signal interrupt signal IntCss is inputted and the estimated rotational angle θ is advanced by the lead Δθ for each current control period (each period in which the fourth timer interrupt signal IntTm4 is inputted) thereby to control the current on the dq axis. In this way, the stator currents iu, iv, iw of sinusoidal waveform are supplied to the stator windings. As a result, according to embodiment 4, a motor controller is realized in which the output torque fluctuation is small and the vibrations and noises of the motor are reduced.

Another problem of the conventional motor controller is that the torque cannot be output in response to the torque command T* if the actual rotational angle and the estimated rotational angle θ are different.

In view of this, the deviation is corrected in steps S4406 and S4407 of the lead calculation means 4040 in embodiment 4 shown in FIGS. 28 and 29, thereby eliminating the deviation of the actual rotational angle from the estimated rotational angle θ. Also, the current is controlled on the dq axis, and the stator currents iu, iv, iw of sinusoidal waveform are supplied based on the actual rotational angle. As a result, according to embodiment 4, the output torque conforming with the torque command T* is realized, so that a motor controller can be realized with small output torque fluctuations and small vibrations and noises.

Also, in the conventional motor controller, when the brushless motor is stationary, the rotational position signal interrupt signal IntCss is not inputted, and therefore, the rotational angle cannot be estimated. Further, when the rotational speed is low, the second timer 31 may overflow, thereby posing the problem that the rotational angle cannot be estimated.

For this reason, in the motor controller according to embodiment 4 of the present invention, step S4403 in the lead calculation means 4040 is activated, so that the 120-degree conduction type rectangular drive is effected when the rotational speed of the brushless motor is lower than the driving method switching rotational speed ωdrv, and the drive with a sinusoidal wave is carried out when the rotational speed of the brushless motor is higher than the driving method switching rotational speed ωdrv. The motor controller thus can positively activate the brushless motor. As a result, according to embodiment 4, a motor controller can be realized which outputs a torque positively even at a low rotational speed.

Also, in the conventional motor controller, with the increase in the rotational speed of the brushless motor, the calculation load on the lead calculation means 4040 increases. Thus, before the calculation is complete, the next rotational position signal interrupt signal IntCss is inputted, thereby making it impossible to estimate the rotational angle.

In view of this, the lead calculation means 4040 of embodiment 4 performs the operation of step S4404. Thus, when the rotational speed of the brushless motor is lower than the estimation method switching rotational speed ωest, the lead Δθ is produced for each rotational position signal interrupt signal IntCss, while when the rotational speed is higher, the lead Δθ is produced for each rotation in mechanical angle. As a result, according to embodiment 4, a motor controller with small output torque fluctuations and small vibrations and noises of the motor is realized by producing the estimated rotational angle θ even at a high rotational speed, controlling the current on the dq axis and supplying the stator currents iu, iv, iw of sinusoidal waveform.

Also, as explained in [Brief description of the operation of embodiment 1] above, in the conventional motor controller, the inaccuracy of the rotational position signals CSU, CSV, CSW may occur due to the variations of the output signals and the mounting error of the rotational position signal generators 3U, 3V, 3W (FIG. 1) constituting Hall ICs or the variations in the magnetization of the rotational position detecting disk 4. As a result, the time interval CssCnt develop inaccuracy and the estimated rotational angle θ fluctuates, thus leading to the problem of torque ripple.

In view of this, in the correction coefficient production means 51 of embodiment 4 according to the present invention, the correction coefficient storage value StrCor and the absolute angle storage value StrθCss are produced, the time interval CssCnt is corrected in step S402 of the lead calculation means 4040, and the absolute angle storage value StrθCss is used as the absolute rotational angle θ0 in steps S4406 and S4407, thereby producing an estimated rotational angle θ free of fluctuations. As a result, according to embodiment 4 described above, it is possible to realize a motor controller for controlling the brushless motor without torque ripple.

Also, in the conventional motor controller, if the rotational speed of the brushless motor drops suddenly, the estimated rotational angle θ may advance excessively and the output torque may be reduced.

In view of this, the estimated rotational angle θ is limited in step S4410 of the lead calculation means 4040, thereby preventing the estimated rotational angle θ from deviating considerably. As a result, according to embodiment 4, a motor controller can be realized in which the torque can be accurately output to the brushless motor.

Also, in embodiments 1, 2 and 3 described above, the rotational position signal interrupt signal IntCss is multiplied and the estimated rotational angle θ is advanced at intervals of θstep. Therefore, the resolution of the estimated rotational angle θ was θstep. To improve the resolution, therefore, the number of multiples is required to be increased. Since the first timer interrupt signal IntTm1 would increase excessively with an increased load on the CPU, however, the number of multiples cannot be increased beyond some level. Thus, the resolution of the estimated rotational angle θ has its own limit.

The lead Δθ is produced in the lead calculation means 4040 in embodiment 4, and the estimated rotational angle θ is advanced by the lead Δθ in the estimated rotational angle control means 4231 of the current control means 4020 thereby to improve the resolution. In this way, a motor controller for controlling the brushless motor is realized, in which the stator currents iu, iv, iw of more beautiful sinusoidal waveform are realized and further the torque ripple is reduced.

Also, in embodiments 1, 2 and 3 described above, the time interval CssCnt is used as it is. When noises are carried in the rotational position signals CSU, CSV, CSW, therefore, the estimated rotational angle θ considerably deviates with the occasional result that the output torque suddenly changes.

In the lead calculation means 4040 of embodiment 4, the lead Δθ is determined using the time interval CssCnt after application through a low-pass filter, (namely, the post-LPF time interval LpfCssCnt) thereby reducing the effect of noises. Thus, a motor controller can be realized, which outputs a stable torque even when the noises are carried in the rotational position signals CSU, CSV, CSW.

Also, in embodiments 1, 2 and 3 described above, until the correction coefficient storage value StrCor and the absolute angle storage value StrθCss converge, the inaccuracy of the rotational position signals CSU, CSV, CSW may cause the variations of the estimated rotational angle θ and generate a torque ripple.

For this reason, when the lead Δθ is determined in the lead calculation means 4040 in embodiment 4, the time interval CssCnt is applied through a low-pass filter, and the lead Δθ is corrected by determining the deviation Zure thereby to change the estimated rotational angle θ continuously. Thus, a motor controller for controlling the brushless motor is realized, in which the torque ripple can be reduced before the correction coefficient storage value StrCor and the absolute angle storage value StrθCss converge.

It is also possible to produce a motor controller by combining the configurations of embodiments 3 and 4. By configuring the motor controller in this way, the time interval or the like of the motor controller can be corrected before product shipment. At the same time, a motor controller is obtained, in which a high-accuracy current command is used which is capable of generating an output constantly corrected and stable also at the time of product operation.

<<Embodiment 5>>

Next, the motor controller according to embodiment 5 of the invention will be explained with reference to the accompanying drawings.

The aforementioned embodiment 4 refers to an example of a motor controller for controlling the current at intervals of a predetermined period. In the motor controller according to embodiment 5, on the other hand, the voltage is controlled at intervals of a predetermined period. The motor controller according to embodiment 5 uses the voltage control means 5020 of a simple configuration and is reduced in cost by eliminating the current sensors 2U, 2V used in embodiment 4.

[Configuration and Operation of Embodiment 5]

First, an explanation will be given of the general configuration of a motor controller according to embodiment 5.

Figure 30:
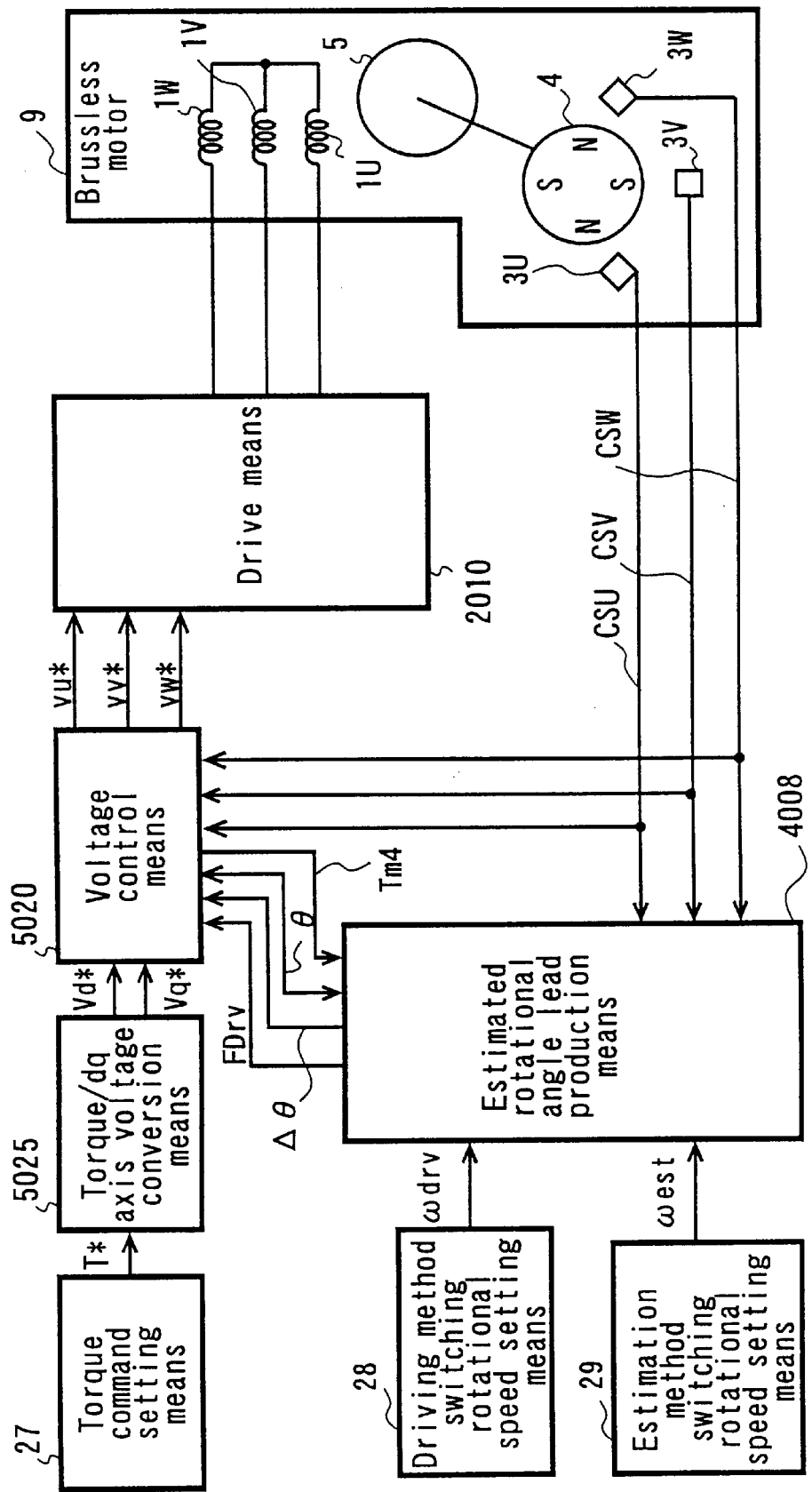
FIG. 30 is a block diagram showing a configuration of the motor controller in embodiment 5 of the present invention.

FIG. 30 is a block diagram showing a configuration of the motor controller according to embodiment 5. In FIG. 30, the brushless motor 9, the estimated rotational angle lead production means 4008, the torque command setting means 27, the driving method switching rotational speed setting means 28 and the estimation method switching rotational speed setting means 29 are similar to the corresponding parts in embodiment 4 described above, and included in the description of embodiment 4. Therefore, these component parts will not be described again.

Also, according to embodiment 5, as compared with embodiment 4, the torque/dq axis current command conversion means 4025 and the current control means 4020 are replaced by the torque/dq axis voltage conversion means 5025 and the voltage control means 5020, respectively.

The torque/dq axis voltage conversion means 5025 is supplied with the torque command T* from the torque command setting means 27. The torque/dq axis voltage conversion means 5025 sets the d-axis voltage command Vd* to 0 as shown in equation (37) below. As shown in equation (11) of embodiment 2 described above, the q-axis voltage command Vq* is produced based on the torque command T*. The d-axis voltage command Vd* and the q-axis voltage command Vq* are thus applied to the voltage control means 5020.

$$Vd^* \leftarrow 0 \qquad (37)$$

The voltage control means 5020 is supplied with the rotational position signals CSU, CSV, CSW, the d-axis voltage command Vd*, the q-axis voltage command Vq*, the driving method switching signal FDrv, the lead Δθ and the estimated rotational angle θ. The voltage control means 5020 outputs the stator voltage commands vu*, vv*, vw* to the drive means 2010, and also outputs the estimated rotational angle θ and the timer value Tm4 on the fourth timer 4210 (FIG. 25) to the estimated rotational angle lead production means 4008.

Figure 31:
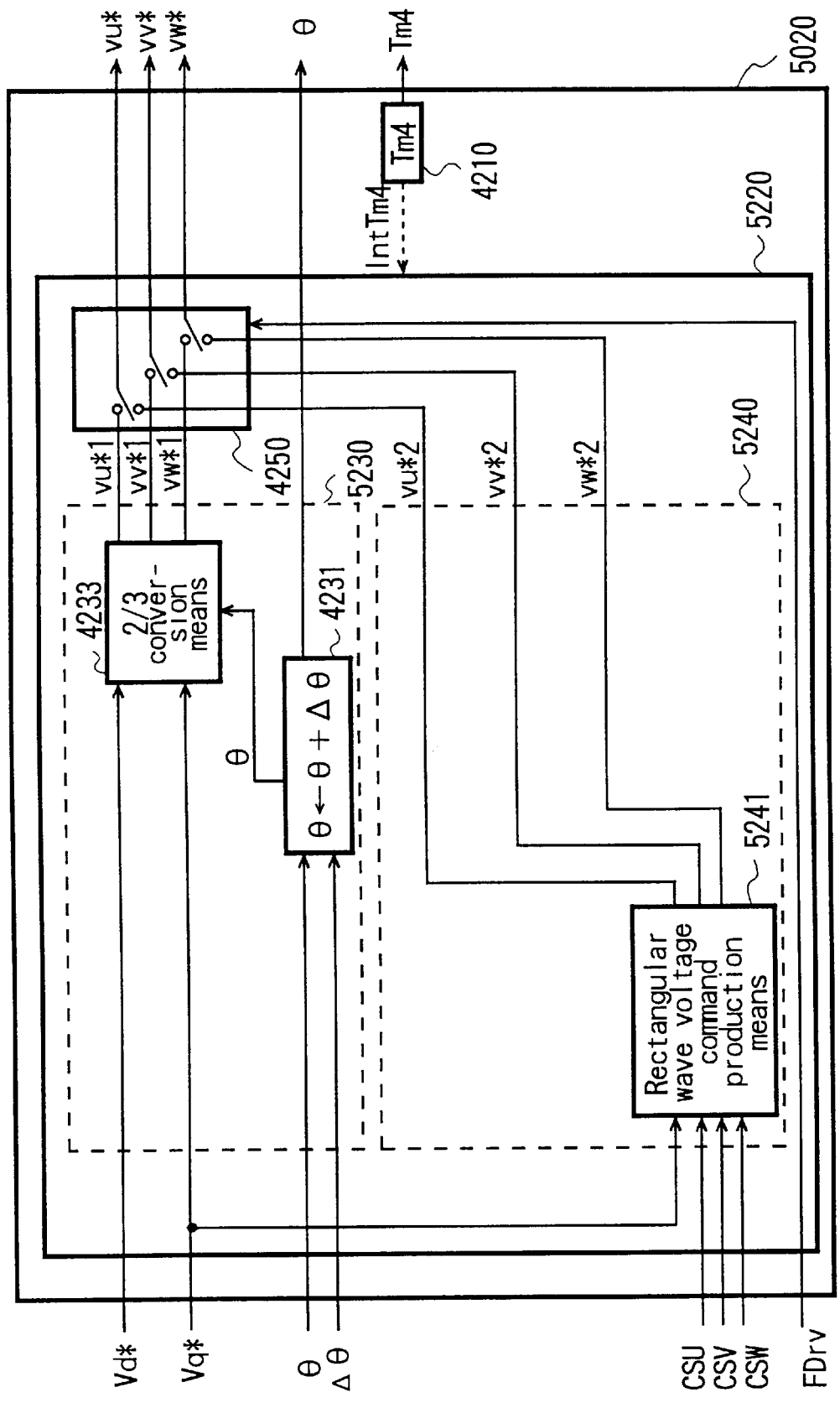
FIG. 31 is a block diagram showing a configuration of the voltage control means of the motor controller in embodiment 5.
Figure 32:
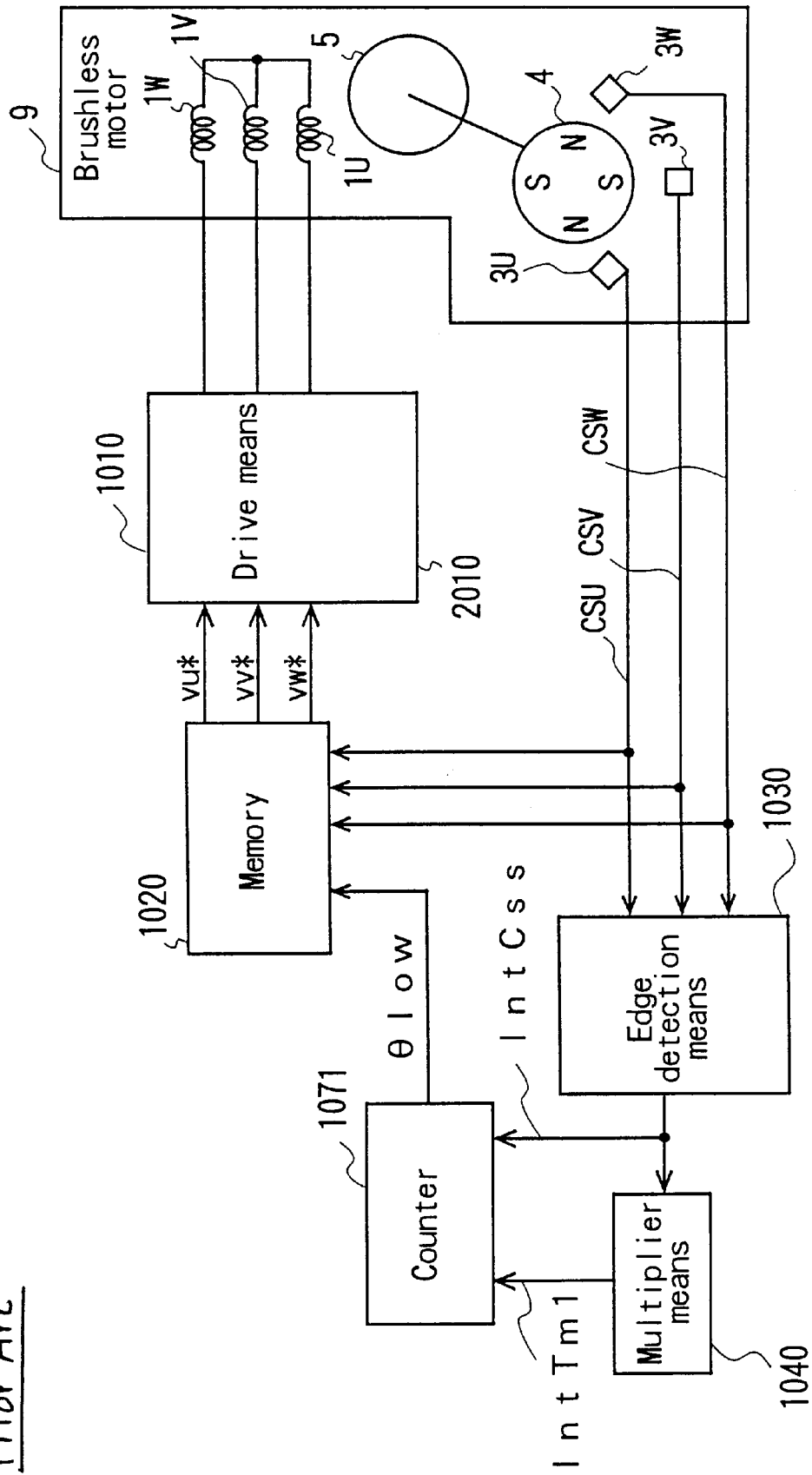
FIG. 32 is a block diagram showing a configuration of the motor controller according to the prior art.
Figure 33:
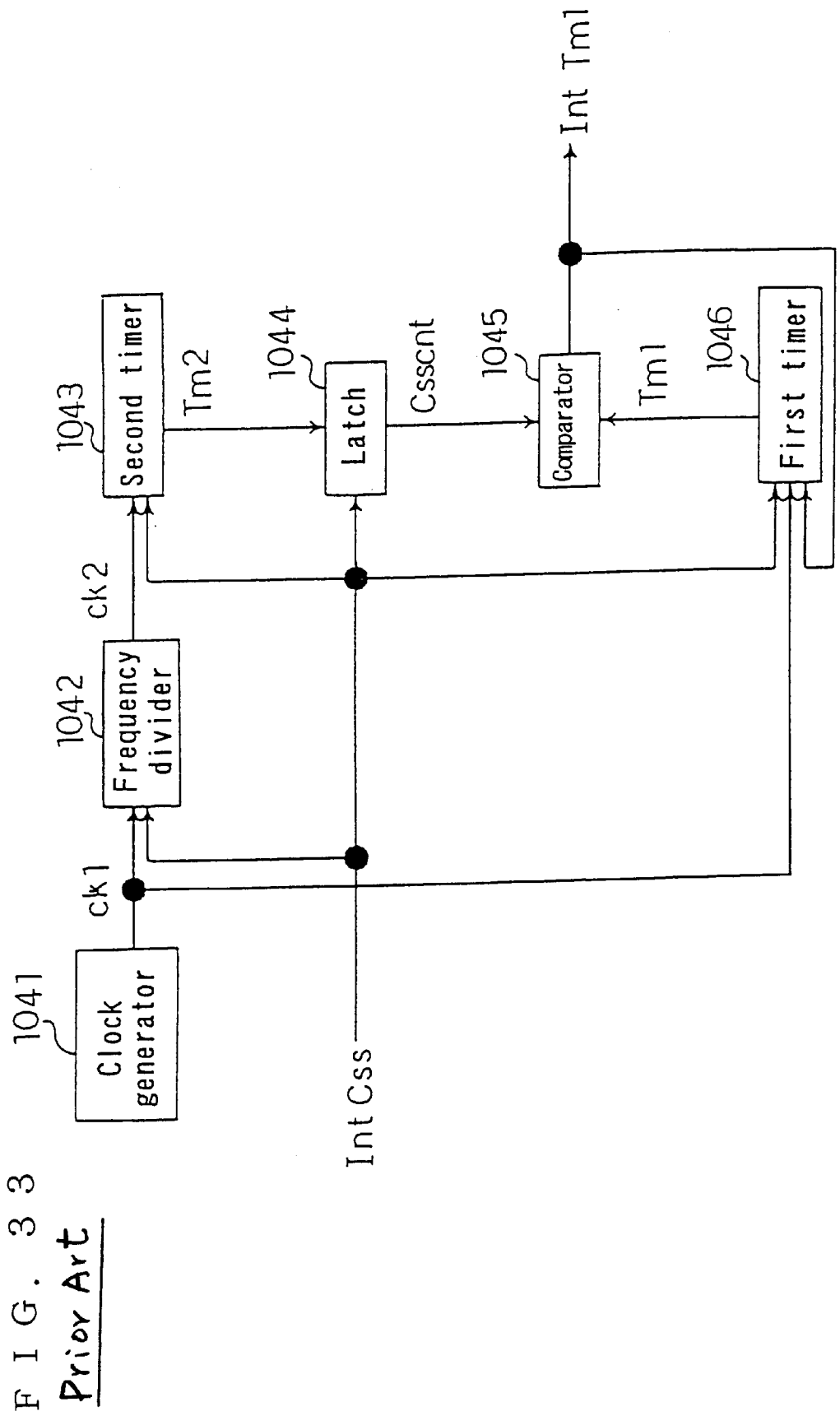
FIG. 33 is a diagram showing a configuration of the multiplier means in the prior art.

FIG. 31 is a block diagram showing a configuration of the voltage control means 5020 in the motor controller according to embodiment 5.

In FIG. 31, the voltage control means 5020 includes the fourth timer 4210 and the stator voltage command production means 5220.

The fourth timer 4210 is the same as the corresponding part in embodiment 4 and will not be explained again as it is included in the description of embodiment 4.

The stator voltage command production means 5220 is activated by the fourth timer interrupt signal IntTm4, and is supplied with the d-axis voltage command Vd*, the q-axis voltage command Vq*, the estimated rotational angle θ, the lead Δθ, the rotational position signals CSU, CSV, CSW and the driving method switching signal FDrv. The stator voltage command production means 5220 outputs the stator voltage commands vu*, vv*, vw* and the estimated rotational angle θ. The stator voltage command production means 5220 includes sinusoidal wave-driven stator voltage command production means 5230, the rectangular wave-driven stator voltage command production means 5240 and the stator voltage command select means 4250.

The rectangular wave-driven stator voltage command production means 5240 is supplied with the rotational position signals CSU, CSV, CSW and the q-axis voltage command Vq* and produces the stator voltage commands (rectangular wave-driven stator voltage commands) vu*2, vv*2, vw*2 used for drive with a rectangular wave. The rectangular wave-driven stator voltage commands vu*2, vv*2, vw*2 are similar to the stator voltage commands vu*, vv*, vw* produced at the time of drive with a rectangular wave in embodiment 2 described above. Therefore, the rectangular wave-driven stator voltage commands vu*2, vv*2, vw*2 will not be explained any more.

The sinusoidal wave-driven stator voltage command production means 5230 includes the 2/3 conversion means 4233 and the estimated rotational angle control means 4231 of the sinusoidal wave-driven stator voltage command production means 4230 in embodiment 4 described above. Also, embodiment 5 is configured the same way as embodiment 4 described above, except that the d-axis voltage command Vd* and the q-axis voltage command Vq* produced in the torque/dq axis voltage conversion means 5025 are applied directly to the 2/3 conversion means 4233. Therefore, the sinusoidal wave-driven stator voltage command production means 5230 will not be described again.

The stator voltage command select means 4250 is similar to the corresponding part in embodiment 4 and therefore will not be described again.

[Effects of Embodiment 5]

Also in embodiment 5, the lead Δθ is calculated for each rotational position signal interrupt signal IntCss, and the estimated rotational angle θ is advanced for each voltage control period (each time the fourth timer interrupt signal IntTm4 is input) in the voltage control means 5040, thus realizing a similar effect to the embodiment 4.

A motor controller can be obtained also by combining the configurations of embodiments 3 and 5 described above. With this configuration of the motor controller, the time interval for the motor controller before product shipment can be corrected, and at the same time, an always-corrected stable output torque can be generated during product operation.

Also, in embodiments 4 and 5, the inaccuracy of the rotational position signals CSU, CSV, CSW was corrected for correcting the time interval CssCnt in step S402 shown in FIG. 28. An operation, if any, of correcting the time interval CssCnt essentially is included in the present invention. In step S4407 of FIG. 29, for example, Kdθ can be corrected.

In the above-described embodiments 1 to 5, the motor is controlled using both the correction coefficient storage value StrCor and the absolute position storage value StrθCss. Nevertheless, in the motor controller according to the present invention, only one of them can be stored and the other can be determined by calculation as required in operation. Calculation of both of them produces the effect of shortening the calculation time, while storing one of them produces the effect of reducing the storage area.

As described above, at least one of the ratio of the rotational angles (correction coefficient storage value StrCor) and the rotational position itself (the absolute position storage value StrθCss) can be used as a correction coefficient. The motor controller according to the present invention, therefore, can be so configured that at least one of them is stored.

In embodiments 1 to 5 described above, the time between all edges of the rotational position signals CSU, CSV, CSW are measured as a time interval and the processing is performed at each time of edge occurrence. The present invention, however, is not limited to such a scheme, but the time interval can be measured and the processing can be performed at every other edge or only at the leading edge. By doing so, the calculation processing time can be shortened, and the control operation can be performed even with a CPU having a low operating speed.

In embodiments 1 to 5 described above, the estimation method is switched by the estimation method switching rotational speed ωest in steps S404, S4404 after the driving method is switched by the driving method switching rotational speed ωdrv in steps S403, S4403 in the timer comparison value production means 40 shown in FIGS. 10 and 11 or the lead calculation means 4040 shown in FIGS. 28 and 29. The order of processing can be replaced between steps S403, S4403 and steps S404, S4404. Processing this way reduces the number of decision steps and therefore is effective especially when the rotational speed is high.

In embodiments 1, 2, 4 and 5 described above, the correction coefficient storage value StrCor and the absolute angle storage value StrθCss are produced when the rotational speed is somewhat high in step S513 of the correction coefficient production means 51 shown in FIG. 13. As an alternative, the correction coefficient storage value StrCor and the absolute angle storage value StrθCss can be produced when the rotational speed is within a certain range. Especially, in the case where the resonance occurs at a specified rotational speed, the particular rotational speed range can be effectively avoided.

Also, in step S514, the correction coefficient storage value StrCor and the absolute angle storage value StrθCss are produced when the rotational speed variations are small, using the preceding and present time intervals. A more accurate correction can be realized, however, if the time intervals before the preceding time intervals are also stored so that the correction coefficient storage value StrCor and the absolute angle storage value StrθCss are produced in the absence of a plurality of rotational speed changes.

Embodiments 1 to 3 described above refer to the case in which the frequency fck1 of the first timer 70 is an integer multiple of the frequency fck2 of the second timer 31. In the motor controller according to the present invention, however, it is also possible that the frequency fck1 of the first timer 70 is equalized to the frequency fck2 of the second timer 31, so that the time interval CssCnt is measured by the second timer 31, the time interval CssCnt divided by a multiple in the timer comparison value production means 40 is used as a timer comparison value CmpTm1, and the first timer 70 is counted up to the timer comparison value CmptTm1 for multiplication.

In embodiments 1 to 5, the 120-degree conduction type rectangular wave drive is effected based on the rotational position signal when the rotational speed of the brushless motor is lower than the conduction method switching rotational speed ωdrv, and the sinusoidal wave drive is effected based on the estimated rotational angle when the rotational speed is higher than the conduction method switching rotational speed ωdrv. Alternatively, however, a hysteresis is provided in the conduction method switching rotational speed ωdrv, the 120-degree conduction type rectangular wave drive is switched to the sinusoidal drive at the first conduction method switching rotational speed ωdrv1, the sinusoidal drive is switched to the 120-degree conduction type rectangular wave drive at the second conduction method switching rotational speed ωdrv2, and in this way the conduction method switching rotational speed ωdrv1 can be increased beyond the second conduction method switching rotational speed ωdrv2.

With this configuration, in the motor controller according to the present invention, the driving method is prevented from being frequently switched, and the control becomes stable especially when the rotational speed of the brushless motor is in the neighborhood of the driving method switching rotational speed ωdrv.

Also, the same can be said of the estimation method switching rotational speed ωest of the estimation method switching rotational speed setting means 29. Specifically, in embodiments 1 to 5, the timer comparison value CmpTm1 and the lead Δθ are produced each time the rotational position signal interrupt signal IntCss is inputted when the rotational speed of the brushless motor is lower than the estimation method switching rotational speed ωest, whereas the timer comparison value CmpTm1 and the lead Δθ are produced for each rotation in rotational angle when the rotational speed is higher than the estimation method switching rotational speed ωest.

In the motor controller according to the present invention, however, a hysteresis is provided in the estimation method rotational speed ωest, so that the production of the timer comparison value CmpTm1 and the lead Δθ for each input of the rotational position signal interrupt IntCss is switched to the production of the timer comparison value CmpTm1 and the lead Δθ for each rotation in rotational angle at the first estimation method switching rotational speed ωest1, while the production of the timer comparison value CmpTm1 and the lead Δθ for each rotation in rotational angle is switched to the production of the timer comparison value CmpTm1 and the lead Δθ for each input of the rotational position signal interrupt signal IntCss at the second estimation method switching rotational speed ωest2. The first estimation method switching rotational speed ωest1 can be rendered larger than the second estimation method switching rotational speed ωest2.

With this configuration, in the motor controller according to the present invention, the estimation method is prevented from being switched frequently and the control operation is stabilized, especially when the rotational speed of the brushless motor is in the neighborhood of the estimation method switching rotational speed ωest.

In the above-mentioned embodiments, in the case where the crest value of the stator current commands iu*, iv*, iw* or the stator voltage commands vu*, vv*, vw* is equal between the 120-degree conduction type rectangular wave drive and the sinusoidal wave drive, the root-mean-square value is larger at the time of the 120-degree conduction type rectangular wave drive and the mean output torque is larger at the time of the 120-degree conduction type rectangular wave drive. In the motor controller according to the present invention, therefore, in order to equalize the mean output torque before and after the switching, the crest value at the time of the 120-degree conduction type rectangular wave drive can be corrected downward.

In embodiments 1 to 5 described above, a configuration is shown for the 120-degree conduction type rectangular wave drive when the rotational speed is low. In the motor controller according to the present invention, however, a similar effect is obtained to the embodiments described above even with a configuration in which the sinusoidal wave drive is employed also for a low rotational speed. This configuration is possible in the case where the starting torque is not required so much. In such a case, the rotational angle at the time of stationary state is set to the intermediate rotational angle expressed by a combination of the rotational position signals CSU, CSV, CSW.

Embodiments 1, 2, 4 and 5 described above refer to the case in which the timer comparison value CmpTm1 and the lead Δθ are updated for each rotation in mechanical angle at the time of high rotational speed, and embodiment 3 refers to the case in which the timer comparison value CmpTm1 is updated for each rotation in electrical angle at the time of high rotational speed and the timer comparison value CmpTm1 and the lead Δθ are updated for each rotational position signal interrupt signal IntCss at the time of a low rotational speed. In the motor controller according to the present invention, however, a configuration in which the timer comparison value CmpTm1 and the lead Δθ are updated for each rotational position signal interrupt IntCss also at the time of a high rotational speed has a similar effect to the embodiments described above. Such a configuration is possible when using a high-speed CPU.

In embodiments 1 to 3 described above, if the acceleration is calculated from the time interval storage value StrCss and the timer comparison value CmpTm1 is corrected downward when the acceleration is positive while the timer comparison value CmpTm1 is corrected upward when the acceleration is negative, then an output torque can be generated with higher accuracy.

Also, in embodiments 4 and 5, if the acceleration is calculated from the time interval storage value StrCss and the lead Δθ is corrected upward when the acceleration is positive while the lead Δθ is corrected downward when the acceleration is negative, then an output torque can be generated with higher accuracy.

In embodiments 1 to 3 described above, if the timer comparison value CmpTm1 is corrected downward when the torque command T* increases, while the timer comparison value CmpTm1 is corrected upward when the torque command T* decreases, then an output torque can be generated with higher stability.

In embodiments 4 and 5, if the lead Δθ is corrected upward when the torque command T* increases and the lead Δθ is corrected downward when the torque command T* decreases, then an output torque can be generated with higher stability.

In embodiment 4 described above, the simple proportional integral control is employed in order that the stator currents iu, iv, iw follow the current commands iu*, iv*, iw* at the time of rectangular wave drive. This leads to the problem that the output torque decreases when the brushless motor increases in rotational speed.

In view of this, the motor controller according to embodiment 4 is so configured that the integral term is succeeded to when the rotational position signal interrupt signal IntCss is input and the stator current command undergoes a change. When i=2 in FIG. 7, for example, the u-phase integral term (KIK·(iu*−iu)/s) is substituted into the v-phase integral term (KIK·(iv*−iv)/s). Thus, the output torque of the brushless motor is not reduced even at high rotational speed.

Also, assume that embodiment 4 is configured in such a manner that the integral term is succeeded to at the time of switching between rectangular wave drive and sinusoidal wave drive. Then, if the rectangular wave drive is switched to the sinusoidal wave drive when i=2 in FIG. 7, for example, the integral term (KIK·(iu*−iu)/s) for rectangular wave drive is substituted into the q-axis integral term (KIQ·(iq*−iq)/s) for sinusoidal wave drive, or otherwise, the decrease of the output torque at the time of switching can be reduced.

In embodiments 1 to 5 described above, when the rotational speed is controlled, a given set value is divided by the time interval CssCnt corrected by the correction coefficient storage value StrCor in step S402 shown in FIG. 10, and used as the rotational speed. Also, in embodiments 4 and 5 described above, when the rotational speed is controlled, a given set value is divided by he post-LPF time interval LpfCssCnt and can alternatively be used as the rotational speed.

In embodiments 4 and 5 described above, the current control means 4020 and the voltage control means 5020 control the current or voltage at a given set constant period. However, the control period can be variable according to rotational speed or the like.

Also, in each of the embodiments described above, the current phase is fixed for control using only the q-axis current command Iq* or the q-axis voltage command Vq*. The use of the d-axis current command Id* or the d-axis voltage command Vd*, however, has a similar effect to the embodiments described above. Also, in the motor controller according to the present invention, a similar effect to the embodiments described above is obtained also when the current phase is changed based on rotational speed or the like.

The present invention is also effective if used for increasing the output torque by advancing the current phase in the embedded magnet-type motor. Further, the present invention is effective if used at the time of field weakening control in which the brushless motor is rotated at high speed. It is also effective if used for phase compensation due to control delay.

In embodiments 1 to 3 described above, the three-phase stator current was measured. A similar effect to the embodiments described above can be exhibited also when two phases are measured and the remaining phase is determined based on the other two phases.

The drive device of the motor controller according to the present invention is not limited to IGBT but other drive device such as MOS-FET or the bipolar transistor can also be used.

Also, in the motor controller according to the present invention, the rotational position signal generators 3U, 3V, 3W are not limited to the Hall Ic, but can be the Hall element, the MR element, the inductance element or the like. Further, the rotational position signal generators 3U, 3V, 3W may not be mounted on the motor. For example, the voltage between a neutral point or a pseudo-neutral point and each phase is applied through a LPF and shaped in waveform to make rotational position signals CSU, CSV, CSW. In this way, the rotational position signals CSU, CSV, CSW, if they indicate the rotational position of the rotor 5, are included in the motor controller of the invention.

The motor controller according to the present invention does not necessarily use the sinusoidal wave for the stator current command or the stator voltage command generated at the time of sinusoidal wave drive, but can alternatively use a trapezoidal waveform or a waveform containing high harmonics. Especially, when high harmonics are contained in the induced voltage, the torque ripple can be effectively reduced by containing the high harmonics in the stator current command.

The motor controller according to each embodiment described above is shown as a configuration for controlling the three-phase four-pole brushless motor. The present invention, however, is not limited to it but is applicable to a multi-phase motor, such as a motor having two magnetic poles or six or more magnetic poles.

Also, the present invention is not limited to the control of the brushless motor but is applicable to the control of other motors such as a synchronous reluctance motor.

Further, the brushless motor according to the present invention is not limited to the surface magnet-type motor but is usable for an embedded magnet-type motor.

As described above, according to the present invention, a motor controller having a small fluctuation of the output torque and small vibrations and noises of the brushless motor can be realized by supplying the stator currents iu, iv, iw of sinusoidal waveform based on the actual rotational angle.

Also, according to the present invention, when stationary or low in rotational speed, the 120-degree conduction type rectangular wave drive is effected, while the sinusoidal wave drive is carried out when the rotational speed is high. By doing so, a motor controller can be realized which can be surely started and outputs a stable torque surely even at the time of low rotational speed operation.

Further, according to the present invention, the timer comparison value is updated for each rotation in rotational angle at the time of high-speed operation, whereby the stator currents iu, iv, iw of sinusoidal waveform are supplied even at the time of high-speed operation. In this way, a motor controller can be realized, in which the fluctuation in output torque is small and the vibrations and noises of the motor are small.

Also, according to the present invention, even when the rotational position signals CSU, CSV, CSW are inaccurate, the correction coefficient storage value StrCor and the absolute angle storage value StrθCss are produced and the timer time interval CssCnt is corrected, and by doing so, the estimated rotational angle θ free of fluctuations is produced. Thus, a motor controller can be realized, in which the brushless motor can be drive-controlled with high accuracy without any torque ripple.

Furthermore, according to the present invention, the resolution of the lead Δθ is increased so that the estimated rotational angle can be produced with a high resolution. Further, a motor controller can be realized, by which the brushless motor can be drive-controlled without any torque ripple.

Also, according to the present invention, when the lead Δθ is determined, the time interval CssCnt is applied through a low-pass filter and thus the deviation Zure is determined thereby to correct the lead Δθ. In this way, a motor controller can be realized, in which even before the correction coefficient storage value StrCor and the absolute angle storage value StrθCss are converged, the brushless motor is controlled with small torque ripples.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor controller comprising:

time interval measuring means for measuring the time interval of a rotational position signal, the position signal indicating the rotational position of a rotor of the motor;

correction coefficient storage means for storing a correction coefficient indicating the inaccuracy of said rotational position signal;

estimated rotational angle production means for extrapolating a rotational angle based on said time interval and said correction coefficient and producing an estimated rotational angle representing an estimated value of the rotational angle;

command production means for producing a current command supplied to the stator windings of the motor or a voltage command applied to said stator windings based on said estimated rotational angle; and drive means for supplying power to said stator windings based on said current command or said voltage command.

2. A motor controller according to claim 1, characterized by further comprising correction coefficient production means for producing said correction coefficient and correction coefficient activation means for activating said correction coefficient production means.

3. A motor controller according to claim 1, further comprising driving method switching rotational speed setting means for setting the driving method switching rotational speed providing a threshold value for switching the driving method, characterized in that said command production means is configured to produce said current command or said voltage command based on said rotational position signal when the rotational speed of said rotor is lower than said driving method switching rotational speed and to produce said current command or said voltage command based on said estimated rotational angle when the rotational speed of said rotor is higher than said driving method switching rotational speed.

4. A motor controller comprising:

time interval measuring means for measuring the time interval of a rotational position signal, the position signal indicating the rotational position of a rotor of the motor;

rotation time interval measuring means for measuring the rotation time interval, defined as the time required per rotation of the rotor based on said rotational position signal;

estimation method switching rotational speed setting means for setting an estimation method switching speed to provide a threshold value for switching the estimation method for the rotational angle;

estimated rotational angle production means for producing an estimated rotational angle providing an estimated value of the rotational angle by extrapolating the rotational angle based on said time interval when said rotor rotational speed is lower than said estimation method switching rotational speed, and producing said estimated rotational angle by extrapolating the rotational angle based on said rotation time interval when said rotor rotational speed is higher than said estimation method switching rotational speed;

command production means for producing a current command supplied to the stator windings of the motor or a voltage command applied to said stator windings based on said estimated rotational angle; and drive means for supplying power to said stator windings based on said current command or said voltage command.

5. A motor controller according to claim 4, characterized in that said rotation time interval measuring means is configured to measure the time required for one rotation of said rotor in mechanical angle as said rotation time interval.

6. A motor controller according to claim 4, characterized in that said rotation time interval measuring means is configured to measure the time required for one rotation of said rotor in electrical angle as said rotation time interval.

7. A motor controller for advancing an estimated rotational angle during a control period comprising:

time interval measuring means for measuring the time interval of a rotational position signal, the position signal indicating the rotational position of a rotor of the motor;

lead production means for producing a lead indicating the degree to which the estimated rotational angle is to be advanced, based on said time interval;

estimated rotational angle production means responsive to said lead for producing an estimated rotational angle based on said lead for each control period; and control means for defining the control period and controlling the current supplied to the stator windings of the motor or the voltage applied to said stator windings based on said estimated rotational angle for each control period.

8. A motor controller according to claim 7, further comprising correction coefficient storage means for storing a correction coefficient indicating the inaccuracy of said rotational position signal;

characterized in that said lead production means is configured to produce said lead based on said correction coefficient.

9. A motor controller according to claim 7, further comprising:

rotation time interval measuring means for measuring the rotation time interval providing the time required for one rotation of said rotor based on said rotational position signal; and estimation method switching rotational speed setting means for setting the estimation method switching rotational speed providing a threshold value for switching the estimation method for the rotational angle;

characterized in that said lead production means is configured to produce said lead based on said time interval when the rotational speed of said rotor is lower than said estimation method switching rotational speed and to produce said lead based on said rotation time interval when the rotational speed of said rotor is higher than said estimation method switching rotational speed.

10. A motor controller according to claim 9, characterized in that said rotation time interval measuring means is configured to measure the time required for one rotation of said rotor in mechanical angle as said rotation time interval.

11. A motor controller according to claim 9, characterized in that said rotation time interval measuring means is configured to measure the time required for one rotation of said rotor in electrical angle as said rotation time interval.

12. A motor controller according to claim 7, further comprising driving method switching rotational speed setting means for setting the driving method switching rotational speed providing a threshold value for switching the driving method, characterized in that said control means is configured to control said current or said voltage based on said rotational position signal when the rotational speed of said rotor is lower than said driving method switching rotational speed and to control said current or said voltage based on said estimated rotational angle when the rotational speed of said rotor is higher than said driving method switching rotational speed.

13. A motor controller for advancing an estimated rotational angle during a control period comprising:

rotation time interval measuring means for measuring the rotation time interval, defined as the time required for one rotation of a rotor of the motor based on a rotational position signal;

lead production means for producing a lead indicating the degree to which, the estimated rotational angle is to be advanced, based on said rotation time interval;

estimated rotational angle production means responsive to said lead for producing an estimated rotational angle based on said lead for each control period; and control means for defining the control period and controlling the current supplied to the stator windings of the motor or the voltage applied to said stator windings based on said estimated rotational angle for each control period.

14. A motor controller comprising:

time interval measuring means for measuring the time interval of a rotational position signal, the position signal indicating the rotational position of a rotor of the motor;

deviation calculation means for calculating the deviation of an estimated rotational angle, defined as an estimated value of the rotational angle from the actual rotational angle;

estimated rotational angle production means for producing said estimated rotational angle based on said time interval applied through a low pass filter and said deviation; and control means for controlling the current supplied to the stator windings of the motor or the voltage applied to said stator windings based on said estimated rotational angle.

15. A motor controller according to claim 14, further comprising correction coefficient storage means for storing a correction coefficient indicating the inaccuracy of said rotational position signal, characterized in that said estimated rotational angle production means is configured to produce said estimated rotational angle based on said correction coefficient.

16. A motor controller according to claim 14, further comprising;
- rotation time interval measuring means for measuring the rotation time interval providing the time required for one rotation of said rotor based on said rotational position signal, and
- estimation method switching rotational speed setting means for setting the estimation method switching rotational speed providing a threshold value for switching the estimation method for the rotational angle;
- characterized in that said estimated rotational angle production means is configured to produce said estimated rotational angle based on said time interval applied through a low-pass filter and said deviation when the rotational speed of said rotor is lower than said estimation method switching rotational speed, and to produce said estimated rotational angle based on said rotation time interval applied through a low-pass filter and said deviation when the rotational speed of said rotor is higher than said estimation method switching rotational speed.

17. A motor controller according to claim 16, characterized in that said rotation time interval measuring means is configured to measure the time required for one rotation of said rotor in mechanical angle as said rotation time interval.

18. A motor controller according to claim 16, characterized in that said rotation time interval measuring means is configured to measure the time required for one rotation of said rotor in electrical angle as said rotation time interval.

19. A motor controller according to claim 14, characterized in that said estimated rotational angle production means is configured to produce said estimated rotational angle in such a manner as to reduce said deviation gradually.

20. A motor controller according to claim 14, further comprising driving method switching rotational speed setting means for setting the driving method switching rotational speed providing a threshold value for switching the driving method,
- characterized in that said control means is configured to control said current or said voltage based on said rotational position signal when the rotational speed of said rotor is lower than said driving method switching rotational speed and to control said current or said voltage based on said estimated rotational angle when the rotational speed of said rotor is higher than said driving method switching rotational speed.

21. A motor controller comprising:
- rotation time interval measuring means for measuring the rotation time interval, defined as the time required for one rotation of a rotor of the motor based on a rotational position signal indicating the rotational position of said rotor;
- deviation calculation means for calculating the deviation of an estimated rotational angle providing an estimated value of the rotational angle from the actual rotational angle;
- estimated rotational angle production means for producing said estimated rotational angle based on said rotation time interval applied through a low-pass filter and said deviation; and
- control means for controlling the current supplied to the stator windings of the motor or the voltage applied to said stator windings based on said estimated rotational angle.

* * * * *